US012229993B2

(12) United States Patent
Claessen et al.

(10) Patent No.: US 12,229,993 B2
(45) Date of Patent: Feb. 18, 2025

(54) AUTOMATED DETERMINATION OF A CANONICAL POSE OF A 3D OBJECTS AND SUPERIMPOSITION OF 3D OBJECTS USING DEEP LEARNING

(71) Applicant: Promaton Holding B.V., Amsterdam (NL)

(72) Inventors: Frank Theodorus Catharina Claessen, Amsterdam (NL); David Anssari Moin, Amsterdam (NL); Teo Cherici, Amsterdam (NL)

(73) Assignee: PROMATON HOLDING B.V., Amsterdam (NL)

( * ) Notice: Subject to any disclaimer, the term of this patent is extended or adjusted under 35 U.S.C. 154(b) by 0 days.

(21) Appl. No.: 17/257,481

(22) PCT Filed: Jul. 3, 2019

(86) PCT No.: PCT/EP2019/067905
§ 371 (c)(1),
(2) Date: Dec. 31, 2020

(87) PCT Pub. No.: WO2020/007941
PCT Pub. Date: Jan. 9, 2020

(65) Prior Publication Data
US 2021/0174543 A1 Jun. 10, 2021

(30) Foreign Application Priority Data
Jul. 3, 2018 (EP) .................................... 18181421

(51) Int. Cl.
*G06T 7/73* (2017.01)
*A61C 9/00* (2006.01)
(Continued)

(52) U.S. Cl.
CPC ................ *G06T 7/75* (2017.01); *A61C 9/004* (2013.01); *G06T 17/20* (2013.01); *G06T 19/20* (2013.01);
(Continued)

(58) Field of Classification Search
CPC .... G06T 7/70; G06T 7/73; G06T 7/75; G06T 19/20; G06T 2219/2004; G06T 2219/2016;
(Continued)

(56) References Cited

U.S. PATENT DOCUMENTS 6,721,387 B1   4/2004  Naidu et al.
7,987,099 B2   7/2011  Kuo et al.
(Continued)

FOREIGN PATENT DOCUMENTS

CN    101977564 A    2/2011
CN    106618760 A    5/2017
(Continued)

OTHER PUBLICATIONS

Gutierrez-Becker et al., "Learning Optimization Updates for Multimodal Registration", Computer Aided Medical Procedures, Technische Universitat Munchen, Munich, Germany, Springer International Publishing, 2016 (Year: 2016).*
(Continued)

*Primary Examiner* — Diane M Wills
(74) *Attorney, Agent, or Firm* — Steven M. Koehler; Westman, Champlin & Koehler, P.A.

(57) ABSTRACT

A method for automatically determining a canonical pose of a 3D object comprises: providing one or more blocks of voxels of a voxel representation of the 3D object to a first 3D deep neural network, the first 3D neural network being trained to generate canonical pose information; receiving canonical pose information from the first 3D deep neural
(Continued)

network, the canonical pose information comprising for each voxel a prediction of a position of the voxel in the canonical coordinate system; using the canonical coordinates to determine an orientation and scale of the axes of the canonical coordinate system and a position of the origin of the canonical coordinate system relative to the axis and the origin of the first 3D coordinate system and using the orientation and the position to determine transformation parameters of the first coordinate system into canonical coordinates; and, determining a canonical representation of the 3D dental structure.

18 Claims, 19 Drawing Sheets

(51) Int. Cl.
G06T 17/20 (2006.01)
G06T 19/20 (2011.01)
(52) U.S. Cl.
CPC ............ G06T 2207/20084 (2013.01); G06T 2207/30036 (2013.01); G06T 2210/41 (2013.01); G06T 2219/2004 (2013.01); G06T 2219/2016 (2013.01)
(58) Field of Classification Search
CPC ....... G06T 2210/41; G06T 2207/10081; G06T 2207/30004–30104; G06T 2207/20084; G06T 2207/30036; A61C 9/004; G06N 3/02
See application file for complete search history.

(56) References Cited

U.S. PATENT DOCUMENTS

| | | |
|---|---|---|
| 8,099,305 B2 | 1/2012 | Kuo et al. |
| 8,135,569 B2 | 3/2012 | Matov et al. |
| 8,439,672 B2 | 5/2013 | Matov et al. |
| 8,639,477 B2 | 1/2014 | Chelnokov et al. |
| 9,107,722 B2 | 8/2015 | Matov et al. |
| 9,135,498 B2 | 9/2015 | Andreiko et al. |
| 9,904,999 B2 | 2/2018 | Andreiko et al. |
| 10,032,271 B2 | 7/2018 | Somasundaram et al. |
| 10,235,606 B2 * | 3/2019 | Miao ................ G06T 7/33 |
| 10,456,229 B2 | 10/2019 | Fisker et al. |
| 10,610,185 B2 | 4/2020 | Taguchi et al. |
| 10,685,259 B2 | 6/2020 | Salah et al. |
| 10,932,890 B1 | 3/2021 | Sant et al. |
| 10,997,727 B2 | 5/2021 | Xue et al. |
| 11,007,036 B2 | 5/2021 | Pokotilov et al. |
| 11,107,218 B2 | 8/2021 | Salah et al. |
| 2005/0192835 A1 | 9/2005 | Kuo et al. |
| 2008/0085487 A1 | 4/2008 | Kuo et al. |
| 2008/0253635 A1 | 10/2008 | Spies et al. |
| 2009/0191503 A1 | 7/2009 | Matov et al. |
| 2010/0069741 A1 | 3/2010 | Kuhn et al. |
| 2011/0038516 A1 | 2/2011 | Koehler et al. |
| 2011/0081071 A1 | 4/2011 | Benson et al. |
| 2011/0255765 A1 | 10/2011 | Carlson et al. |
| 2012/0063655 A1 | 3/2012 | Dean et al. |
| 2013/0022251 A1 | 1/2013 | Chen et al. |
| 2013/0039556 A1 | 2/2013 | Kachelriess et al. |
| 2013/0230818 A1 | 9/2013 | Matov et al. |
| 2014/0169648 A1 * | 6/2014 | Andreiko ................ G16Z 99/00 |
| | | 382/128 |
| 2014/0227655 A1 | 8/2014 | Andreiko et al. |
| 2015/0029178 A1 | 1/2015 | Claus et al. |
| 2016/0008095 A1 | 1/2016 | Matov et al. |
| 2016/0034788 A1 | 2/2016 | Lin et al. |
| 2016/0042509 A1 | 2/2016 | Andreiko et al. |
| 2016/0078647 A1 | 3/2016 | Schildkraut et al. |
| 2016/0117850 A1 | 4/2016 | Jin et al. |
| 2016/0324499 A1 | 11/2016 | Sen Sharma et al. |
| 2016/0371862 A1 | 12/2016 | Silver et al. |
| 2017/0024634 A1 | 1/2017 | Miao et al. |
| 2017/0046616 A1 | 2/2017 | Socher et al. |
| 2017/0100212 A1 | 4/2017 | Sherwood et al. |
| 2017/0150937 A1 | 6/2017 | Stille et al. |
| 2017/0169562 A1 | 6/2017 | Somasundaram et al. |
| 2017/0258420 A1 * | 9/2017 | Inglese ................ A61B 6/4085 |
| 2017/0265977 A1 | 9/2017 | Fisker et al. |
| 2017/0270687 A1 | 9/2017 | Manhart |
| 2018/0005377 A1 | 1/2018 | Alvarez et al. |
| 2018/0028294 A1 | 2/2018 | Azernikov et al. |
| 2018/0110590 A1 | 4/2018 | Maraj et al. |
| 2018/0182098 A1 | 6/2018 | Andreiko et al. |
| 2018/0300877 A1 | 10/2018 | Somasundaram et al. |
| 2019/0026599 A1 | 1/2019 | Salah et al. |
| 2019/0147245 A1 | 5/2019 | Qi et al. |
| 2019/0147666 A1 | 5/2019 | Keustermans et al. |
| 2019/0148005 A1 | 5/2019 | Domracheva et al. |
| 2019/0164288 A1 | 5/2019 | Wang et al. |
| 2019/0172200 A1 | 6/2019 | Andreiko et al. |
| 2019/0282333 A1 | 9/2019 | Matov et al. |
| 2019/0328489 A1 | 10/2019 | Capron-Richard et al. |
| 2020/0015948 A1 | 1/2020 | Fisker et al. |
| 2020/0022790 A1 | 1/2020 | Fisker |
| 2020/0085535 A1 | 3/2020 | Pokotilov et al. |
| 2020/0179089 A1 | 6/2020 | Serval et al. |
| 2020/0320685 A1 | 10/2020 | Anssari Moin et al. |
| 2021/0045843 A1 | 2/2021 | Pokotilov et al. |
| 2021/0082184 A1 | 3/2021 | Claessen et al. |
| 2021/0110584 A1 | 4/2021 | Claessen et al. |
| 2021/0150702 A1 | 5/2021 | Claessen et al. |
| 2021/0217233 A1 * | 7/2021 | Feng ................ G16H 50/50 |
| 2021/0264611 A1 | 8/2021 | Xue et al. |
| 2021/0322136 A1 | 10/2021 | Anssari Moin et al. |
| 2022/0067943 A1 | 3/2022 | Claessen et al. |
| 2023/0186476 A1 | 6/2023 | Ghazvinian Zanjani et al. |
| 2023/0263605 A1 | 8/2023 | Madden et al. |

FOREIGN PATENT DOCUMENTS

| | | |
|---|---|---|
| CN | 108205806 A | 6/2018 |
| CN | 108305684 A | 7/2018 |
| EP | 2742857 A1 | 6/2014 |
| EP | 3121789 A1 | 1/2017 |
| EP | 3462373 A1 | 4/2019 |
| EP | 3591616 A1 | 1/2020 |
| EP | 3671521 A1 | 6/2020 |
| EP | 3767531 A1 | 1/2021 |
| JP | 2007-525289 A | 9/2007 |
| JP | 2010-220742 A | 10/2010 |
| JP | 2013-537445 A | 10/2013 |
| JP | 2017-102622 A | 6/2017 |
| JP | 2017-520292 A | 7/2017 |
| JP | 2017-157138 A | 9/2017 |
| JP | 2022-501299 A | 1/2022 |
| WO | 2015169910 A1 | 11/2015 |
| WO | 2016143022 A1 | 9/2016 |
| WO | 2017099990 A1 | 6/2017 |
| WO | 2019002616 A1 | 1/2019 |
| WO | 2019002631 A1 | 1/2019 |
| WO | 2019068741 A2 | 4/2019 |
| WO | 2019122373 A1 | 6/2019 |
| WO | 2019207144 A1 | 10/2019 |
| WO | 2020007941 A1 | 1/2020 |
| WO | 2020048960 A1 | 3/2020 |
| WO | 2020127398 A1 | 6/2020 |
| WO | 2021009258 A1 | 1/2021 |

OTHER PUBLICATIONS

Studholme, Colin, Derek LG Hill, and David J. Hawkes. "Automated three-dimensional registration of magnetic resonance and positron emission tomography brain images by multiresolution optimization of voxel similarity measures." Medical physics 24.1 (1997): 25-35 (Year: 1997).*

(56) References Cited

OTHER PUBLICATIONS

Chen et al. "Deep RBFNet: Point Cloud Feature Learning Using Radial Basis Functions", Cornell University Library, Dec. 11, 2018, 11 pages.

Chen et al. "Fast Resampling of 3D Point Clouds Via Graphs", IEEE Transactions on Signal Processing, Feb. 1, 2018, pp. 666-681, vol. 66, No. 3.

Eun, H. and Kim, C. "Oriented Tooth Localization for Periapical Dental X-ray Images via Convolutional Neural Network", Asia-Pacific Signal and Information Processing Association Annual Summit and Conference (APSIPA), Dec. 3, 2016, pp. 1-7.

Fang et al. "3D Deep Shape Descriptor", 2015 IEEE Conference on Computer Vision and Pattern Recognition (CVPR), 2015, pp. 2319-2328.

Ghafoorian et al. "EL-GAN: Embedding Loss Driven Generative Adversarial Networks for Lane Detection", Computer Vision—ECCV 2018 Workshops, Jan. 23, 2019, pp. 256-272, vol. 11129.

Ghazvinian Zanjani et al. "Deep Learning Approach to Semantic Segmentation in 3D Point Cloud Intra-oral Scans of Teeth", Proceedings of the 2nd International Conference on Medical Imaging with Deep Learning, 2019, 22 pages, retrieved online from https://openreview.net/forum?id=ByxLSoblgV.

Gomes et al. "Efficient 3D Object Recognition Using Foveated Point Clouds", Computers & Graphics, May 1, 2013, pp. 496-508, vol. 37.

Gorler, O. and Akkoyun, S. "Artificial Neural Networks Can be Used as Alternative Method to Estimate Loss Tooth Root Sizes for Prediction of Dental Implants", Cumhuriyet University Faculty of Science Science Journal (CSJ), Apr. 2017, pp. 385-395, vol. 38, No. 2.

Guo et al. "3D Mesh Labeling Via Deep Convolutional Neural Networks", ACM Transactions on Graphics, Dec. 2015, pp. 1-12, vol. 35, No. 1, Article 3.

Hermosilla et al. "Monte Carlo Convolution for Learning on Non-Uniformly Shaped Point Clouds", ACM Transactions on Graphics, Nov. 2018, 12 pages, vol. 37, No. 6, Article 235.

Hou et al. "3D-SIS: 3D Semantic Instance Segmentation of RGB-D Scans", Computer Vision and Pattern Recognition (CPR), Apr. 29, 2019, 14 pages.

Huang et al. "Edge-Aware Point Set Resampling", ACM Transactions on Graphics, 2013, pp. 1-12, vol. 32, No. 1, Article 9.

Johari et al. "Detection of Vertical Root Fractures in Intact and Endodontically Treated Premolar Teeth by Designing a Probabilistic Neural Network: An ex vivo Study", Dentomaxillofacial Radiology, Feb. 2017, vol. 46, No. 2, pp. 1-9.

Ku et al. "Joint 3D Proposal Generation and Object Detection from View Aggregation", IEEE/RSJ International Conference on Intelligent Robots and Systems (IROS), Jul. 12, 2018, pp. 1-8.

Le T. and Duan Y. "PointGrid: A Deep Network for 3D Shape Understanding", Proceedings of the IEEE Conference on Computer Vision and Pattern Recognition, Jun. 18-23, 2018, pp. 9204-9214.

Li et al. "SO-Net: Self-Organizing Network for Point Cloud Analysis", Eye In-Painting with Exemplar Generative Adversarial Networks, Jun. 2018, pp. 9397-9406.

Liu, C. and Furukawa, Y. "MASC: Multi-scale Affinity with Sparse Convolution for 3D Instance Segmentation", Computer Vision and Pattern Recognition (CPR), Feb. 12, 2019, 4 pages.

Qi et al. "Frustum PointNets for 3D Object Detection from RGB-D Data", Computer Vision and Pattern Recognition (CPR), Apr. 13, 2018, 15 pages.

Qi et al. "PointNet++: Deep Hierarchical Feature Learning on Point Sets in a Metric Space", Conference on Neural Information Processing Systems (NIPS), Jun. 2017, 14 pages.

Ravanbakhsh et al. "Deep Learning With Sets and Point Clouds", Feb. 24, 2017, 12 pages, retrieved online from https://arxiv.org/abs/1611.04500.

Silva et al. "Automatic Segmenting Teeth in X-Ray Images: Trends, A Novel Data Set, Benchmarking and Future Perspectives", Feb. 9, 2018, 33 pages, retrieved online from https://arxiv.org/pdf/1802.03086.pdf.

Skrodzki et al. "Directional Density Measure to Intrinsically Estimate and Counteract Non-Uniformity in Point Clouds", Computer Aided Geometric Design, Aug. 2018, pp. 73-89, vol. 64.

Shaoqing et al. "Mask R-CNN", Proceedings of the IEEE International Conference on Computer Vision, 2017, pp. 2961-2969.

Tian, S. "Automatic Classification and Segmentation of Teeth on 3D Dental Model Using Hierarchical Deep Learning Networks" IEEE Journals & Magazine, Jun. 21, 2019, pp. 84817-84828.

Wang et al. "SGPN: Similarity Group Proposal Network for 3D Point Cloud Instance Segmentation", CVF Conference on Computer Vision and Pattern Recognition, Nov. 23, 2017, 13 pages.

Wu et al. "3D ShapeNets: A Deep Representation for Volumetric Shapes", 2015 IEEE Conference on Computer Vision and Pattern Recognition (CVPR), 2015, pp. 1912-1920.

Xu et al. "SpiderCNN: Deep Learning on Point Sets with Parameterized Convolutional Filters", Computer Vision—EECV, 2018, 16 pages.

Yi et al. "GSPN: Generative Shape Proposal Network for 3D Instance Segmentation in Point Cloud", Proceedings of the IEEE/CVF Conference on Computer Vision and Pattern Recognition (CVPR), 2019, 13 pages.

Zhou et al. "A Method for Tooth Model Reconstruction Based on Integration of Multimodal Images", Journal of Healthcare Engineering, Jun. 20, 2018, vol. 8, pp. 1-8.

Non-published U.S. Appl. No. 17/415,465, filed Jun. 17, 2021.

Non-published U.S. Appl. No. 17/626,744, filed Jan. 12, 2022.

Ahn, B. "The Compact 3D Convolutional Neural Network for Medical Images", Jul. 2, 2017, pp. 1-9, http://cs231n.standord.edu/reports/2017/pdfs/23/pdf, retrieved Dec. 18, 2018.

Auro Tripathy, "Five Insights from GoogLeNet You Could Use in Your Own Deep Learning Nets", Sep. 20, 2016, pp. 1-21, https://www.slideshare.net/aurot/googlenet-insights?from_action=save, retrieved Dec. 18, 2018.

Bustos et al. "An Experimental Comparison of Feature-Based 3D Retrieval Methods" 2nd International Symposium on 3D Data Processing, Visualization, and Transmission, 3DPVT 2004, Sep. 6-9, 2004, pp. 215-222.

Chaouch, M. and Verroust-Blondet, A. "Alignment of 3D Models", Graphical Models, Mar. 2009, pp. 63-76, vol. 71, No. 2.

Çiçek et al. "3D U-Net: Learning Dense Volumetric Segmentation from Sparse Annotation", Medical Image Computing and Computer-Assisted Intervention—MICCAI 2016, Part II, Oct. 2, 2016, pp. 424-432.

Duda et al. "Pattern Classification: Introduction", 2001, Pattern Classification, New York, John Wiley & Sons, US, pp. 1-13.

Duy et al. "Automatic Detection and Classification of Teeth in CT Data", International Conference on Medical Image Computing and Computer-Assisted Intervention—MICCAI 2012, 2012, pp. 609-616.

Everingham et al. "The PASCAL Visual Object Classes (VOC) Challenge", International Journal of Computer Vision, Sep. 9, 2009, pp. 303-338, vol. 88, No. 2.

Fechter et al. "A 3D Fully Convolutional Neural Network and a Random Walker to Segment the Esophagus in CT", Apr. 21, 2017, 23 pages, https://arxiv.org/pdf/1704.06544.pdf, retrieved Dec. 18, 2018.

Gjesteby et al. "Deep Learning Methods for CT Image-Domain Metal Artifact Reduction", SPIE, Developments in X-Ray Tomography XI, Sep. 25, 2017, 6 pages, vol. 10391.

Gkantidis et al. "Evaluation of 3-Dimensional Superimposition Techniques on Various Skeletal Structures of the Head Using Surface Models", PLOS One, Feb. 23, 2015, 20 pages, vol. 10, No. 2.

Hall, P. and Owen, M. "Simple Canonical Views", Proceedings of the British Machine Vision Conference (BMVC), Sep. 2005, 10 pages.

Han et al. "Deep Residual Learning for Compressed Sensing CT Reconstruction Via Persistent Homology Analysis", Cornell University Library, Nov. 19, 2016, pp. 1-10.

He et al. "Deep Residual Learning for Image Recognition", 2016 IEEE Conference on Computer Vision and Pattern Recognition (CPR), Jun. 2016, pp. 770-778.

(56) References Cited

OTHER PUBLICATIONS

Hongming Li, Y. "Non-Rigid Image Registration Using Fully Convolutional Networks With Deep Self-Supervision", Sep. 3, 2017, 8 pages.
Isola et al. "Image-to-Image Translation with Conditional Adversarial Networks", 2017 IEEE Conference on Computer Vision and Pattern Recognition (CVPR), Honolulu, HI, 2017, pp. 5967-5976.
Joda, T. and Gallucci, G. "Systematic Literature Review of Digital Three-Dimensional Superimposition Techniques to Create Virtual Dental Patients", The International Journal of Oral & Maxillofacial Implants, 2015, pp. 330-337, vol. 30, No. 2.
Jung et al. "Combining Volumetric Dental CT and Optical Scan Data for Teeth Modeling", Computer-Aided Design, Oct. 2015, pp. 24-37, vol. 67-68.
Klinder et al. "Automated Model-Based Vertebra Detection, Identification, and Segmentation in CT Images", Medical Image Analysis, Jun. 2009, pp. 471-482, vol. 13, No. 3.
Li et al. "PointCNN: Convolution on X-Transformed Points", Neural Information Processing Systems (NIPS), Nov. 5, 2018, 11 pages.
Liao et al. "Automatic Tooth Segmentation of Dental Mesh Based on Harmonic Fields", Biomedical Research International, 2015, 10 pages, vol. 2015.
Litjens et al. "A Survey on Deep Learning in Medical Image Analysis", Medical Image Analysis, Dec. 2017, pp. 60-88, vol. 42.
Meyer et al. "Normalized Metal Artifact Reduction (NMAR) in Computed Tomography", Medical Physics, Oct. 2010, pp. 5482-5493, vol. 37, No. 10.
Miki et al. "Tooth Labeling in Cone-Beam CT Using Deep Convolutional Neural Network for Forensic Identification", SPIE 10134, Medical Imaging 2017: Computer-Aided Diagnosis, Mar. 3, 2017, 6 pages.
Miki et al. "Classification of Teeth in Cone-Beam CT Using Deep Convolutional Neural Network", Computers in Biology and Medicine, Jan. 2017, pp. 24-29, vol. 1, No. 80.
Pavaloiu et al. "Automatic Segmentation for 3D Dental Reconstruction", IEEE 6th ICCCNT, Jul. 13-15, 2015, 6 pages.
Pavaloiu et al. "Neural Network Based Edge Detection for CBCT Segmentation", 5th IEEE EHB, Nov. 19-21, 2015.
Qi et al. "PointNet: Deep Learning on Point Sets for 3D Classification and Segmentation", Computer Vision and Pattern Recognition (CVPR), 2017, 19 pages.
Ruellas et al. "3D Mandibular Superimposition: Comparison of Regions of Reference for Voxel-Based Registration" PLOS One, Jun. 23, 2016, 13 pages.
Ryu et al. "Analysis of Skin Movement With Respect to Flexional Bone Motion Using MR Images of a Hand", Journal of Biomechanics, 2006, pp. 844-852, vol. 39, No. 5.
Schulze et al. "Artefacts in CBCT: A Review", Dentomaxillofacial Radiology, Jul. 1, 2011, pp. 265-273, vol. 40, No. 5.
Sekuboyina et al. "A Localisation-Segmentation Approach for Multi-Label Annotation of Lumbar Vertebrae Using Deep Nuts", Cornell University Library, 201 Olin Library Cornell University Ithaca, NY 14853, Mar. 13, 2017, 10 pages.
Simonovsky et al. "A Deep Metric for Multimodal Registration" International Conference on Medical Image Computing and Computer-Assisted Intervention (MICCAI), 2016, pp. 10-18, vol. 9902.
Szegedy et al. "Going Deeper With Convolutions", 2015 IEEE Conference on Computer Vision and Pattern Recognition (CVPR), Jun. 2015, pp. 1-9.
Tonioni et al. "Learning to Detect Good 3D Keypoints", International Journal of Computer Vision, 2018, pp. 1-20, vol. 126.
Wang et al. "Dynamic Graph CNN for Learning on Point Clouds", ACM Trans. Graph, Jan. 2019, vol. 1, No. 1, 13 pages.
Wu et al. "Tooth Segmentation on Dental Meshes Using Morphologic Skeleton", Computers & Graphics, Feb. 2014, pp. 199-211, vol. 38.
Wu et al. "Model-Based Teeth Reconstruction", ACM Transactions on Graphics (TOG), ACM, US, Nov. 11, 2016, pp. 1-13, vol. 35, No. 6.
Yau et al. "Tooth Model Reconstruction Based Upon Data Fusion for Orthodontic Treatment Simulation", Computers in Biology and Medicine, May 1, 2014, pp. 8-16, vol. 48.
Yu, Y. "Machine Learning for Dental Image Analysis", Nov. 2016, 61 pages, https://arxiv.org/ftp/arxiv/papers/1611/1611.09958.pdf, retrieved Nov. 30, 2017.
Zhang, Y. and Yu, H. "Convolutional Neural Network Based Metal Artifact Reduction in X-Ray Computed Tomography", IEEE Transactions on Medical Imaging, Jun. 2018, pp. 1370-1381, vol. 37, No. 6.
Zhang, C. and Xing, Y. "CT Artifact Reduction Via U-Net CNN", SPIE, Medical Imaging 2018: Image Processing, Mar. 2, 2018, 6 pages, vol. 10574.
International Search Report and Written Opinion for International Patent Application No. PCT/EP2019/067905, dated Dec. 8, 2019.
Hosntalab et al. "A Hybrid Segmentation Framework for Computer-Assisted Dental Procedures", IEICE Transactions on Information and Systems, Oct. 2009, pp. 2137-2151, vol. E92D, No. 10.
Office Action in corresponding Japanese application No. 2020-572743 dated Jul. 31, 2023.
Atzmon et al. "Point Convolutional Neural Networks by Extension Operators", Mar. 27, 2018, 14 pages, arXiv:1803.10091v1 [cs.CV].
Office Action in corresponding Israel Patent Application Serial No. 279834 dated May 24, 2023.
Hamida et al. "Deep Learning for Semantic Segmentation of Remote Sensing Images with Rich Spectral Content", 2017 IEEE International Geoscience and Remote Sensing Symposium (IGARSS), 2017, pp. 2569-2572.
Kamnitsas et al. "Efficient Multi-scale 3D CNN With Fully Connected CRF for Accurate Brain Lesion Segmentation", Medical Image Analysis, 2017, pp. 61-78, vol. 36.

* cited by examiner

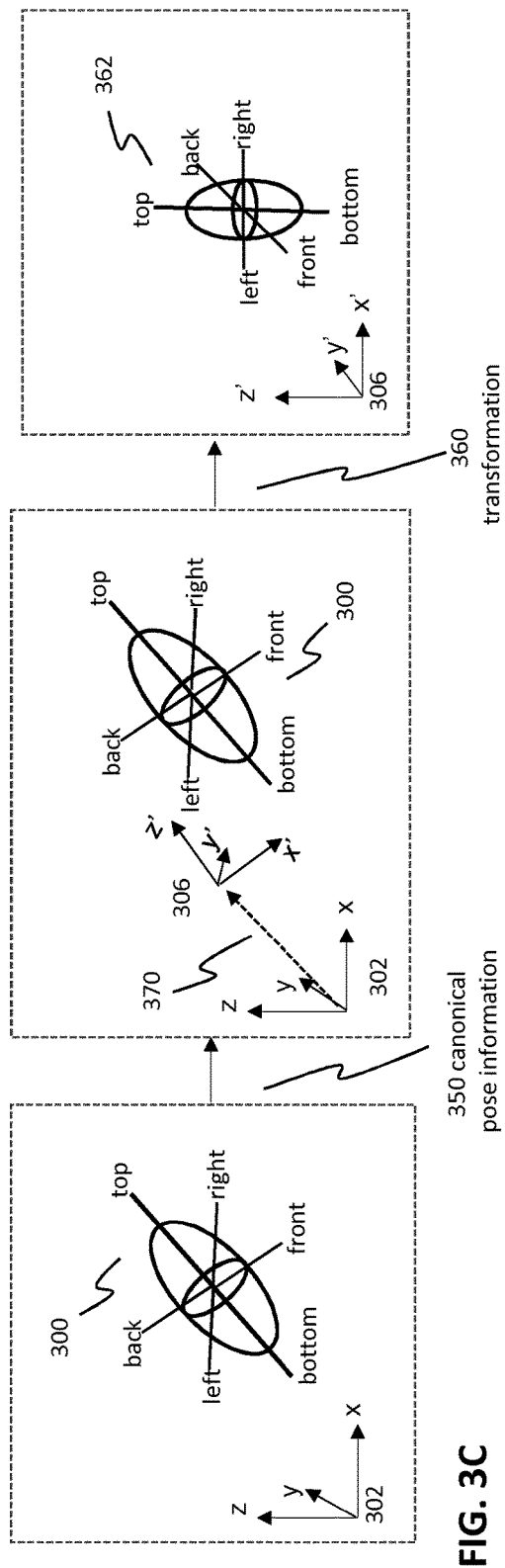

FIG. 3C 380 providing a voxel representation of a 3D dental structure associated with a first coordinate system to the input of a 3D deep neural network, the neural network being configured to generate canonical pose information associated with a second canonical coordinate system 382 receiving from the output of the 3D deep neural network canonical pose information, wherein for each voxel of the voxel representation the canonical pose information comprising a prediction of a canonical coordinate of the voxel 384 using the canonical pose information to determine an orientation of the axes of the canonical coordinate system and a position of the origin of the canonical coordinate system relative to the axis and the origin of the first coordinate system and using the orientation and the position to determine transformation parameters for transforming coordinates of the first coordinate system into coordinates of the second canonical coordinate system 386 determining a canonical pose of the 3D dental structure in the space represented by the second canonical coordinate system, the determining including applying the transformation parameters to the coordinates of the voxels of the voxel representation

FIG. 3D

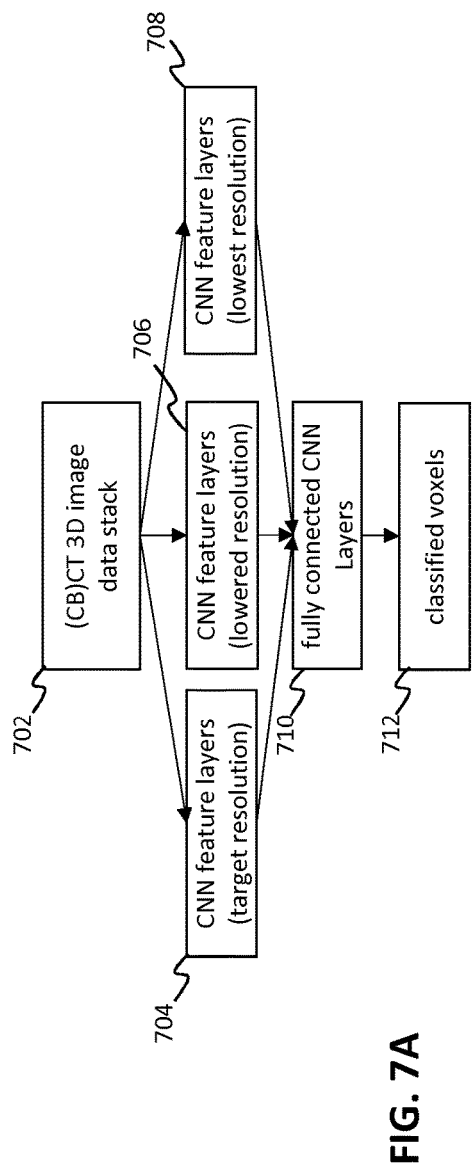
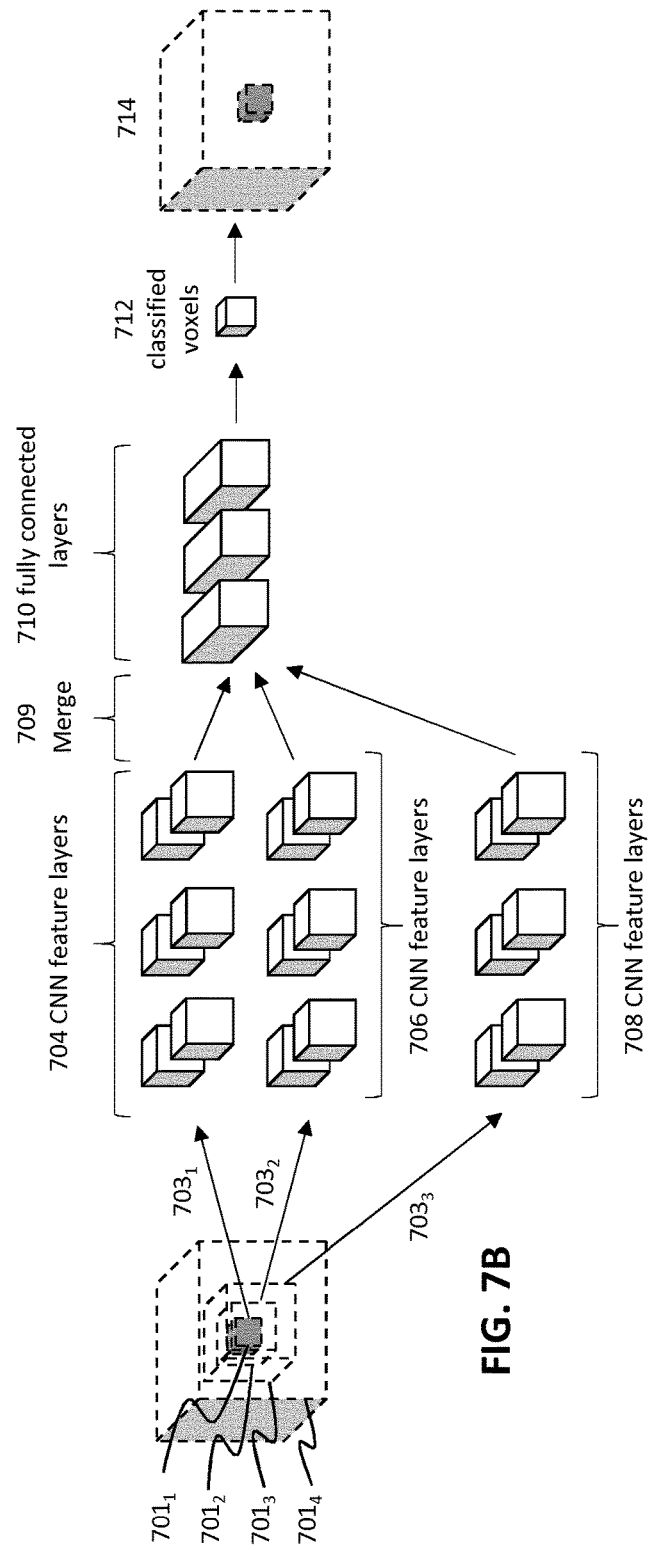
FIG. 7A
FIG. 7B

AUTOMATED DETERMINATION OF A CANONICAL POSE OF A 3D OBJECTS AND SUPERIMPOSITION OF 3D OBJECTS USING DEEP LEARNING

CROSS-REFERENCE TO RELATED APPLICATION

The present application is a national stage of and claims priority of International patent application Serial No. PCT/EP2019/067905, filed Jul. 3, 2019, and published in English as WO2020/007941A1.

FIELD OF THE INVENTION

The invention relates to automated determination of a canonical pose of a 3D object, such as 3D dental structure, and superimposition of 3D objects using deep learning; and, in particular, though not exclusively, to methods and systems for automated determination of a canonical pose of a 3D object and methods and systems for automated superimposition of 3D objects and a computer program product enabling a computer system to perform such methods.

BACKGROUND OF THE INVENTION

Accurate 3D models of a patient's dentition and jaw bones (maxilla and mandible) are essential for 3D computer-assisted dental applications (orthodontic treatment planning, dental implant planning, orthognathic surgery planning (jaw surgery), etc.). The formation of such 3D models is based on 3D image data of the patient, typically 3D Computed Tomography (CT) data of a 3D object representing e.g. a dento-maxillofacial complex or another body part. A CT scan typically results in a voxel representation representing (part of) the 3D object, wherein each voxel is associated with an intensity value, typically a radiodensity of the scanned volume. In medical applications, such as dental applications, CT scans are usually acquired using Cone-Beam CT (CBCT), because of the lower radiation dose to the patient, the lower acquisition price of the equipment, and the greater ease of use compared to fan-beam CT.

However, CBCT techniques are sensitive to artefacts (especially in the presence of metal), there is no an industry-wide standard for conversion of the sensor output of the CBCT scanner into radiation values representing the radiodensity in Hounsfield Units (HU) in the scanned volume. Moreover, the low-dose use provides a relatively poor contrast, making it difficult to distinguish between structures in a 3D object, e.g. a dento-maxillofacial complex, that have similar densities. These problems may result in discrepancies in 3D models derived from such voxel representations using e.g. a thresholding technique. Hence, 3D models derived from a voxel representation of CBCT data are not or at least less suitable to design accurately fitting tooth-supported templates such as used in e.g. orthodontics (clear aligner therapy), jaw surgery (orthognathic surgery), implant surgery (implantology), cosmetic dentistry (crowns, bridges), etc.

In order to address this problem, a voxel representation of a CBCT data set or a 3D model derived from such voxel representation may be supplemented, augmented and/or (partly) replaced by optical scan data. Optical scan data, such intra-oral scan (IOS) data are generated by a (e.g. a laser or structured light) surface scan of tooth surfaces (generally the tooth crowns and the surrounding gingival surface) derived from a gypsum model (or impression) of a patient's dentition or by generating intra-oral scan (IOS) data of the patient's dentition. Compared to (CB)CT data, advantages are the absence of radiation during data acquisition, and the higher spatial resolution. Typical accuracies of optical (extra-oral) scans and IOS are approximated to be within the range between 5 and 10 micron and between 25 and 75 microns, respectively. However, scan results do not differentiate between teeth (crowns) and gingival regions. Moreover, no information can be captured beyond visible surfaces, in particular no information on tooth roots, jaw bone, nerves, etc. is acquired. Intra-oral scans may be supplemented by generalised model data, e.g. derived from a database of crown shapes with corresponding root shapes, to estimate the underlying structures, but—as such—a generalisation does not take into account information considering the actual 3D shape of the desired volumes. Hence, such model-based estimates are inherently inaccurate.

More generally, when processing 3D image data e.g. to generate accurate 3D models, to repair missing data in a 3D dataset, but also to analyse and evaluate e.g. (potential) treatment effect(s)/outcomes or for the purpose of disease progression analysis, it is advantageous or even necessary to combine sets of 3D image data from different sources. This could mean aligning one or more voxelized 3D data sets, such as CBCT data sets, and/or one or more point cloud or 3D surface mesh data sets, e.g. IOS data sets, of the same 3D object, e.g. the same dental structure or bone structure, and merge the aligned sets into one data set that can be used for determining an accurate 3D model or for performing an analysis of the dental structure. The process of aligning different image data sets is referred to as image superimposition or image registration. The problem of superimposition or registration thus relates to the finding of a one-to-one mapping between one or more coordinate systems such that corresponding features of a model, e.g. a 3D dental structures, in the different coordinate systems are mapped to each other. The merger of the aligned data sets into one data set representing the dental structure is usually referred to as fusion.

In CT and CBCT imaging, known 3D superimposition techniques include point-based or land-mark based superimposition, surface-based or contour-based superimposition and voxel-based superimposition. Examples of such techniques are described in the article of GKANTIDIS, N et al. *Evaluation of 3-dimensional superimposition techniques on various skeletal structures of the head using surface models*. PLoS One 2015, Vol. 10, No. 2; and the article by JODA T et al, *Systematic literature review of digital 3D superimposition techniques to create virtual dental patients*. Int J Oral Maxillofac Implants March-April 2015, Vol. 30, No. 2). Typically, these techniques require human intervention, e.g. human input.

The accuracy of point-based and surface-based superimposition techniques depends on the accuracy of the landmark identification and the 3D surface models respectively. This may be especially problematic in the presence of artefacts and low-contrast regions. When matching disparate data sets, it will be challenging to identify corresponding landmarks with sufficient precision. Point-based matching algorithms such as iterative closest point (ICP) generally need user interaction to provide an initial state which is already relatively closely aligned. Voxel-based superimposition may overcome some of the limitations of the land-mark based and surface-based superimposition techniques. This technique employs 3D volume information stored as voxel representations. The similarities between the (to be) superimposed 3D data may be deduced from level intensities of voxels in corresponding reference structures. This technique is especially challenging when combining low-contrast non-standardized CBCT data of different sources or when combining data of different image modalities (e.g. CT and MRI, or CBCT and binary 3D image data as may be derived from surface meshes either enclosing or not enclosing a volume). Additional difficulties may arise when data sets only partially overlap. State of the art voxel-based superimposition methods are often computationally expensive.

The large size of the 3D data sets and the fact that clinical implementation requires a very strict standard on accuracy, make it difficult to utilize conventional methods of image superimposition on high-dimensional medical images. With the recent developments in deep learning, some efforts have been made to apply deep learning in the field of image registration. In one approach deep learning is used to estimate a similarity metric, which is then used to drive an iterative optimization scheme. This is e.g. reported by Simonovsky et al, *A Deep Metric for Multimodal Registration* MICCAI 2016 (Springer, Cham) pp. 10-18, in which the problem is presented as a classification task, where a CNN is set to discriminate between alignment and misalignment of two superimposed image patches. In another approach a deep regression (neural) network is used to predict transformation parameters between images. For example, EP3121789 describes a method wherein a deep neural network is used to directly predict the parameters of transformation between a 3D CT image and a 2D X-ray image. Similarly, the article by Li et al, "Non-rigid image registration using fully convolutional networks with deep self-supervision", of 3 Sep. 2017, wherein a trained neural network receives two pictures and calculates for each pixel a deformation dx, dy, dx which is used to register one picture onto the other. This method requires two input images that have already a certain similarity and thus cannot handle 3D data sets of different modalities. Hence, the problem of registering 3D data sets of different modalities (in pose, data type, coordinate system, etc.) of a particular 3D object is not addressed in the prior art.

Large variances in these 3D data sets (in terms of data formats/modalities, coordinate systems, position and orientation of the 3D object, quality of the image data, differing amounts of overlap between the structures present, etc.) which the superimposition system should be able to deal with, make the problem of accurate automated superimposition of 3D objects (e.g. superimposition of 3D dental structures without any human intervention) a non-trivial exercise. Known superimposition systems are not capable of dealing with these issues in a reliable and robust manner. More generally, large variances in 3D data sets of different modalities pose a problem for accurate processing by a deep neural network system. This is not only a problem for accurate registration, but also accurate segmentation and/or classification by a deep neural network.

Hence, there is a need in the art for a method that can fully automatically, timely and robustly superimpose 3D object, such as 3D dento-maxillofacial structures, 3D data sets. More specifically, there is a need in the art for a solution in which e.g. a dental expert may obtain superimposition results, required for any of various purposes, without the need of additional knowledge or interactions being required from said expert, with a known accuracy and timeliness of results.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can comprise, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including a functional or an object oriented programming language such as Java™, Scala, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer, server or virtualized server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), or graphics processing unit (GPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In this application, 'image' may refer to a data set comprising information in two, three, or more spatial dimensions. '3D image data' may refer to any kind of three-dimensional set of data, e.g. voxel intensity values, surface mesh definitions, etc. Adjusting the coordinate system of one or more images to coincide with that of another reference image comprising (parts of) the same structures, is variously known as data or image registration, matching, superimposition, or alignment. Except when the context indicates otherwise, these terms (and other words derived from these terms) are used interchangeably. '(Set of) transformation parameters' is in this context a generic term for information on how to rotate, translate and/or scale one data set in order to superimpose it onto another one or to represent the data set in an alternative coordinate system; it may be represented by a single matrix, but also by, for instance, a collection of matrices, vectors and/or scalars.

In one aspect, the invention relates to a computer-implemented method for automatically determining a canonical pose of a 3D object in a 3D data set. The method may comprise: a processor of a computer providing one or more blocks data points of the 3D data set to the input of a first 3D deep neural network, the first 3D neural network being trained to generate canonical pose information associated with a canonical coordinate system defined relative to a position of part of the 3D object; the processor receiving canonical pose information from the output of the first 3D deep neural network, the canonical pose information comprising for each of the data points of the one or more blocks a prediction of a position of a data point in the canonical coordinate system, the position being defined by canonical coordinates; the processor using the canonical coordinates to determine an orientation of the axes of the canonical coordinate system, a position of the origin of the canonical coordinate system relative to the axis and the origin of the first 3D coordinate system and/or a scaling of the axes of the canonical coordinate system; and, using the orientation and the positions to determine transformation parameters, for transforming coordinates of the first coordinate system into canonical coordinates; and, the processor determining a canonical representation of the 3D object, the determining including applying the transformation parameters to coordinates of the data points of the 3D data set.

In an embodiment, the 3D object may be a 3D dental structure. In an embodiment, the data points of the 3D data set may represent voxels. In another embodiment, the data points of the 3D data set may define points of a point cloud or points and normal of a 3D surface mesh.

In an embodiment, the first 3D deep neural network may be configured as a convolutional deep neural network that is configured to process voxelized 3D data.

In another embodiment, the first 3D deep neural network may be implemented as a deep multi-layer perceptron (MLP) based network, which is capable to process points of a 3D point cloud or a 3D surface mesh.

In an embodiment, the transformation parameters may include rotation, translation and/or scaling parameters.

In an embodiment, the canonical representation of the 3D object may be a canonical voxel representation or a canonical 3D mesh representation of the 3D object.

In an embodiment, the canonical pose information may include one or more voxel maps for associating (linking) a voxel of the voxel representation with (to) a prediction of a position of the voxel in the canonical coordinate system.

In an embodiment, the one or more voxel maps may include a first 3D voxel map associating (linking) a voxel with (to) a prediction of a first canonical coordinate x' of the canonical coordinate system, a second voxel 3D map associating (linking) a voxel with (to) a prediction of a second canonical coordinate y' of the canonical coordinate system and a third 3D voxel map associating (linking) a voxel with (to) a prediction of a third canonical z' coordinate of the canonical coordinate system In an embodiment, determining an orientation of an axis of the canonical coordinate system may further comprise: determining for a voxel of the voxel representation a local gradient in a canonical coordinate of one of the one or more 3D voxel maps, the local gradient representing a vector in the space defined by the first coordinate system, wherein the orientation of the vector represents a prediction of the orientation of a canonical axis and/or wherein the length of the vector defines a scaling factor associated with the canonical axis.

Hence, the method allows automated determination of a canonical representation of the 3D object such as a 3D dental structure. The method may be used to transform different 3D data modalities of a 3D object into the canonical pose of the 3D object which can be used in the process of superimposition of different 3D data sets. Alternatively and/or additionally, the method may be used as a pre-processing step before a 3D data set is offered to a 3D input of one or more 3D deep neural networks that are configured to segment the 3D object, e.g. a 3D dental structure, and/or to determine a taxonomy of segmented 3D objects, e.g. teeth. Such pre-processing step substantially increases the accuracy of the segmentation and classification of the 3D objects as the accuracy of such trained neural network can be affected if the pose of the 3D object represented by the 3D data set that is input to the system deviates too much (especially with respect to orientation) from a normalized pose.

In a further aspect, the invention may relate to a computer-implemented method for automated superimposition of a first 3D object, such as a first 3D dental structure, represented by (at least) a first 3D data set and a second 3D object, such as a second 3D dental structure, represented by a second 3D data set. In an embodiment, the first and second 3D object are 3D dental structures of same person. In an embodiment, the method may comprise: a processor of a computer providing one or more first blocks of voxels of a first voxel representation of the first 3D object associated with a first coordinate system and one or more second blocks of voxels of a second voxel representation of the second 3D object associated with a second coordinate system to the input of a first 3D deep neural network, the first 3D deep neural network being trained to generate canonical pose information associated with a canonical coordinate system defined relative to a position of part of the 3D object; the processor receiving first and second canonical pose information from the output of the 3D deep neural network, the first canonical pose information comprising for each voxel of the one or more first blocks a prediction of a first position of the voxel in the canonical coordinate system; and, the second canonical pose information comprising for each voxel of the one or more second blocks a prediction of a second position of the voxel in the canonical coordinate system, the first and second position being defined by first and second canonical coordinates respectively; the processor using the first canonical pose information to determine a first orientation of the axes and first position of the origin of the axes in the first coordinate system and using the second canonical pose information to determine a second orientation and a second position of the origin of the axes of the canonical coordinate system in the second coordinate system; the processor using the first orientation and the first position to determine first transformation parameters, preferably first rotation, translation and/or scaling parameters, for transforming coordinates of the first coordinate system into coordinates of the canonical coordinate system; and, using the second orientation and the second position to determine second transformation parameters, preferably second rotation, translation and/or scaling parameters, for transforming coordinates of the second coordinate system into canonical coordinates; and, the processor determining a superimposition of the first 3D object and the second 3D object, the determining including using the first and second transformation parameters to form a first and second canonical representation of the first and second 3D object respectively.

Hence, two or more different 3D data sets of 3D objects, such as 3D dental structures (representing dento-maxillofacial complexes), typically of the same patient, may be superimposed by transforming the coordinates associated with the 3D data sets to coordinates of a canonical coordinate system. In a typical example, different 3D data sets may be different scans of (part of) a patient's dentition. Usually, the different 3D data sets are at least partly overlapping, i.e. both data sets have at least part of a object element (e.g. a tooth or tooth crown in case of a 3D dental structure) in common. A 3D deep neural network, e.g. a 3D convolutional neural network, may determine the canonical pose for at least parts of a 3D object. In some embodiments, the 3D deep neural network processes the coordinates block by block, in order to meet computational limitations. A computer may then apply additional processing to deduce the relative position of the canonical origin and canonical axes (directions and scale) for each voxel provided to the 3D convolutional network. Subsequently, transformation parameters to superimpose or align the two image data sets may be deduced and the 3D image data sets may be aligned using said transformation parameters. The first 3D image data set may be transformed to align with the second 3D image data set, or the second 3D image data set may be transformed to align with the first 3D image data set, or both 3D image data sets may be transformed such that they are aligned in a third orientation different from either received orientation.

The 3D deep neural network may be trained to be very robust against variances in the 3D data sets because the 3D deep neural network is trained based on a large number of typical 3D dento-maxillofacial structures wherein the structures exhibit a large spatial variance (translation, rotation and/or scaling). Issues related to (limited) memory size of the 3D deep neural network may be solved by training the deep neural network on the basis of subsamples (blocks) of voxel representations. To that end, a voxel representation may be partitioned into blocks of voxels of a predetermined size before being provided to the input of the 3D deep neural network. An additional advantage of using blocks is that the network may determine the canonical pose of even a limited amount of data, e.g. a few teeth instead of an entire dentition. Due to the fact that the canonical coordinate system is defined relative to a known (pre-determined) standard for the objects (e.g. dento-maxillofacial structures), the obtained first and second canonical 3D data sets are aligned, wherein the accuracy may depend on training time, training sample variance, and/or available blocks per received data set.

In this disclosure a canonical pose defines a pose, comprising a position, an orientation, and a scale, and is a pose that is defined by assigning predetermined positions and/or orientations to (preferably) reliably and unambiguously identifiable part of a 3D object, e.g. the dental arch in case of a 3D dental structure. In a similar manner, a canonical coordinate system may be defined by assigning the origin to a reliably and unambiguously identifiable position relative to an identifiable part of the 3D object, and to define the coordinate axes in a consistent manner, e.g. the x-axis along the tangent of the point of maximum curvature of the dental arch. Such a canonical coordinate system may define a standardized, non-ambiguous, predetermined coordinate system that is consistent across 3D object data of a certain type (e.g. all dento-maxillofacial image data may be defined with respect to the typical position, orientation and scale of reliably identifiable dento-maxillofacial structures). Its function is to ensure that a 3D object in different image data sets are in the same relative position, orientation, and scale. Such function may be used in a multitude of applications in which 3D data, such as voxel representations, point clouds or 3D meshes, are processed by a trained neural network. The embodiments in this disclosure use the insight that if two or more 3D objects are transformed to the canonical coordinate system, the 3D objects are also aligned to each other. It furthermore uses the insight that a canonical pose of a dento-maxillofacial structure may be automatically determined by utilising a 3D deep neural network, preferably a 3D convolutional neural network, preventing the need for human interaction.

In an embodiment, the first and second canonical representation of the first and second 3D object, preferably first and second 3D surface meshes, may be 3D surface meshes, the determining a superimposition further including: segmenting the first canonical representation of the first 3D object into at least one 3D surface mesh of a 3D object element, e.g. a first 3D dental object elements, of the first 3D object and segmenting the second canonical representation of the second 3D object into at least one 3D surface mesh of a second 3D object elements, e.g. a second 3D dental element, of the second 3D object; selecting at least three first and second non-collinear key-points of the first and second 3D surface mesh, a key-point (a point of interest on the surface of a 3D surface mesh); and, aligning the first and second dental element on the basis of the first and second first and second non-collinear key-points. In an embodiment, a key-point may define a local and/or global maximum or minimum in the surface curvature of the first surface mesh.

In an embodiment, the first and second canonical representation of the first and second 3D object may be voxel representations. In an embodiment, the determining a superimposition may further include: providing at least part of the first canonical voxel representation of the first 3D object and at least part of the second canonical voxel representation of the second 3D object to the input of a second 3D deep neural network, the second 3D deep neural network being trained to determine transformation parameters, preferably rotation, translation and/or scaling parameters, for aligning the first and second canonical voxel representation; aligning first and second canonical representation of the first and second 3D object on the basis of the transformation parameters provided by the output of the second 3D deep neural network.

In an embodiment, determining a superimposition may further include: the processor determining a volume of overlap between the canonical representation of the first 3D object and the canonical representation of the second 3D object.

In an embodiment, determining a superimposition may further include: the processor determining a first volume of interest comprising first voxels of the first canonical representation in the volume of overlap; and, determining a second volume of interest comprising second voxels of the second canonical representation in the volume of overlap.

In an embodiment, the method may further comprise: the processor providing first voxels contained in the first volume of interest (VOI) to the input of a third 3D deep neural network, the third 3D deep neural network being trained to classify and segment voxels; and, the processor receiving activation values for each of the first voxels in the first volume of interest and/or for each of the second voxels in the second volume of interest from the output of the third 3D deep neural network, wherein an activation value of a voxel represents the probability that the voxel belongs to a predetermined 3D object element, e.g. a 3D dental element (such as a tooth) of a 3D dental structure; and, the processor using the activation values for determining a first and second voxel representation of first and second 3D object elements in the first and second VOI respectively.

In an embodiment, the processor may use the first and second voxel representation of the first and second 3D object elements to determine first and second 3D surface meshes of the first and second 3D object elements.

In an embodiment, the method may further comprise: the processor selecting at least three first and second non-collinear key-points of the first and second 3D surface mesh, a key-point preferably defining a local and/or global maximum or minimum in the surface curvature of the first surface mesh; and, the processor aligning the first and second 3D object element on the basis of the first and second first and second non-collinear key-points, preferably using an iterative closest point algorithm.

In an embodiment, the method may further comprise: the processor providing the first voxel representation of the first 3D dental element and the second voxel representation of the second 3D dental element to a fourth 3D deep neural network, the fourth 3D deep neural network being trained to generate an activation value for each of a plurality of candidate structure labels, an activation value associated with a candidate label representing the probability that a voxel representation received by the input of the fourth 3D deep neural network represents a structure type as indicated by the candidate structure label; the processor receiving from the output of the fourth 3D deep neural network a plurality of first and second activation values, selecting a first structure label with the highest activation value of the first plurality of activation values and selecting a second structure label with the highest activation value of the second plurality of activation values and assigning the first and second structure label to the first and second 3D surface mesh respectively.

In an embodiment, the method may further comprise: the processor selecting at least three first and second non-collinear key-points of the first and second 3D surface mesh, a key-point preferably defining a local and/or global maximum or minimum in the surface curvature of the first surface mesh; the processor labelling the first and second key-points based on the first structure label assigned to the first 3D surface mesh and the second structure label assigned to the second 3D surface mesh respectively; and, the processor aligning the first and second 3D dental element on the basis of the first and second key-points and the first and second structure labels of the first and second 3D surface meshes respectively, preferably using an iterative closest point algorithm.

In a further aspect, the invention may relate to a computer-implemented method for training a 3D deep neural network to automatically determine a canonical pose of a 3D object, such as a 3D dental structure, represented by a 3D data set. In an embodiment, the method may comprise: receiving training data and associated target data, the training data including a voxel representation of a 3D object and the target data including canonical coordinate values of a canonical coordinate system for each voxel of the voxel representation, wherein the canonical coordinate system is a predetermined coordinate system defined relative to a position of part of the 3D dental structure; selecting one or more blocks of voxels (one or more subsamples) of the voxel representation of a predetermined size and applying a random 3D rotation to the subsample and applying the same rotation to the target data; offering the one or more blocks to the input of the 3D deep neural network and the 3D deep neural network predicting for each voxel of the one or more blocks canonical coordinates of the canonical coordinate system; and, optimising values of the network parameters of the 3D deep neural network by minimizing a loss function representing a deviation between the coordinate values predicted by the 3D deep neural network and the (appropriately transformed) canonical coordinates associated with the target data.

In another aspect, the invention may relate to a computer system adapted for automatically determining a canonical pose of a 3D object, such as a 3D dental structure, represented by a 3D data set, comprising: a computer readable storage medium having computer readable program code embodied therewith, the program code including at least one trained 3D deep neural network, and at least one processor, preferably a microprocessor, coupled to the computer readable storage medium, wherein responsive to executing the computer readable program code, the at least one processor is configured to perform executable operations comprising: providing one or more blocks of voxels of a voxel representation of the 3D object associated with a first coordinate system to the input of a first 3D deep neural network, the first 3D neural network being trained to generate canonical pose information associated with a canonical coordinate system defined relative to a position of part of the 3D object; receiving canonical pose information from the output of the first 3D deep neural network, the canonical pose information comprising for each voxel of the one or more blocks a prediction of a position of the voxel in the canonical coordinate system, the position being defined by canonical coordinates; using the canonical coordinates to determine an orientation of the axes of the canonical coordinate system and a position of the origin of the canonical coordinate system relative to the axis and the origin of the first 3D coordinate system and using the orientation and the position to determine transformation parameters, preferably rotation, translation and/or scaling parameters, for transforming coordinates of the first coordinate system into canonical coordinates; and, determining a canonical representation, preferably a canonical voxel representation or a canonical 3D mesh representation, of the 3D object, the determining including applying the transformation parameters to coordinates of the voxels of the voxel representation or the 3D data set used for determining the voxel representation.

In yet another aspect, the invention may relate to a computer system adapted for automated superimposition of a first 3D object, such as a first 3D dental structure, represented by a first 3D data set and a second 3D object, a second 3D dental structure, represented by a second 3D data set, comprising: a computer readable storage medium having computer readable program code embodied therewith, the program code including at least one trained 3D deep neural network, and at least one processor, preferably a microprocessor, coupled to the computer readable storage medium, wherein responsive to executing the computer readable program code, the at least one processor is configured to perform executable operations comprising: providing one or more first blocks of voxels of a first voxel representation of the first 3D object associated with a first coordinate system and one or more second blocks of voxels of a second voxel representation of the second 3D object associated with a second coordinate system to the input of a 3D deep neural network; the 3D deep neural network being trained to generate canonical pose information associated with a canonical coordinate system defined relative to a position of part of the 3D object; receiving first and second canonical pose information from the output of the 3D deep neural network, the first canonical pose information comprising for each voxel of the one or more first blocks a prediction of a first position of the voxel in the canonical coordinate system; and, the second canonical pose information comprising for each voxel of the one or more second blocks a prediction of a second position of the voxel in the canonical coordinate system, the first and second position being defined by first and second canonical coordinates respectively; using the first canonical pose information to determine a first orientation of the axes and first position of the origin of the axes in the first coordinate system and using the second canonical pose information to determine a second orientation and a second position of the origin of the axes of the canonical coordinate system in the second coordinate system; using the first orientation and the first position to determine first transformation parameters, preferably first rotation, translation and/or scaling parameters, for transforming coordinates of the first coordinate system into coordinates of the canonical coordinate system; and, using the second orientation and the second position to determine second transformation parameters, preferably second rotation, translation and/or scaling parameters, for transforming coordinates of the second coordinate system into canonical coordinates; and, determining a superimposition of the first 3D object and the second 3D object, the determining including using the first and second transformation parameters to form a first and second canonical representation of the first and second 3D object respectively.

In an embodiment, at least one of the first and second voxel representations may comprise (CB)CT data wherein voxel values represent radiodensities.

In an embodiment, at least one of the first and second voxel representations may comprise voxelized surface data or volume data obtained from a surface, preferably structured light or laser surface scan data, more preferably intra-oral scanner (IOS) data.

In a further aspect, the invention may also relate to a computer program product comprising software code portions configured for, when run in the memory of a computer, executing the method steps according to any of the process steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIGS. 3A-3D depict schematics illustrating a method of determining a canonical pose of a 3D dental structure according to an embodiment of the invention;

FIGS. 7A and 7B depict examples of a 3D deep neural network architecture for segmentation of dento-maxillofacial 3D image data according to an embodiment of the invention;

DETAILED DESCRIPTION

In this disclosure embodiments are described of computer systems and computer-implemented methods that use 3D deep neural networks for fully automated, timely, accurate and robust superimposition of different 3D data sets representing 3D object, such as 3D dento-maxillofacial structures originating from dento-maxillofacial complexes. The methods and systems enable superimposition of at least two 3D data sets using a 3D deep neural network that is trained to determine a canonical pose for each of the two 3D data sets. The output of the trained neural network is used determine transformation parameters that are used to determine superimposed canonical 3D data sets, wherein a canonical 3D data set represents a canonical representation of 3D object, such as a dento-maxillofacial structure. Further 3D deep learning networks and/or superimposition schemes may be used to further improve the accuracy of the superimposition. The systems and methods will be described hereunder in more detail.

Figure 1:
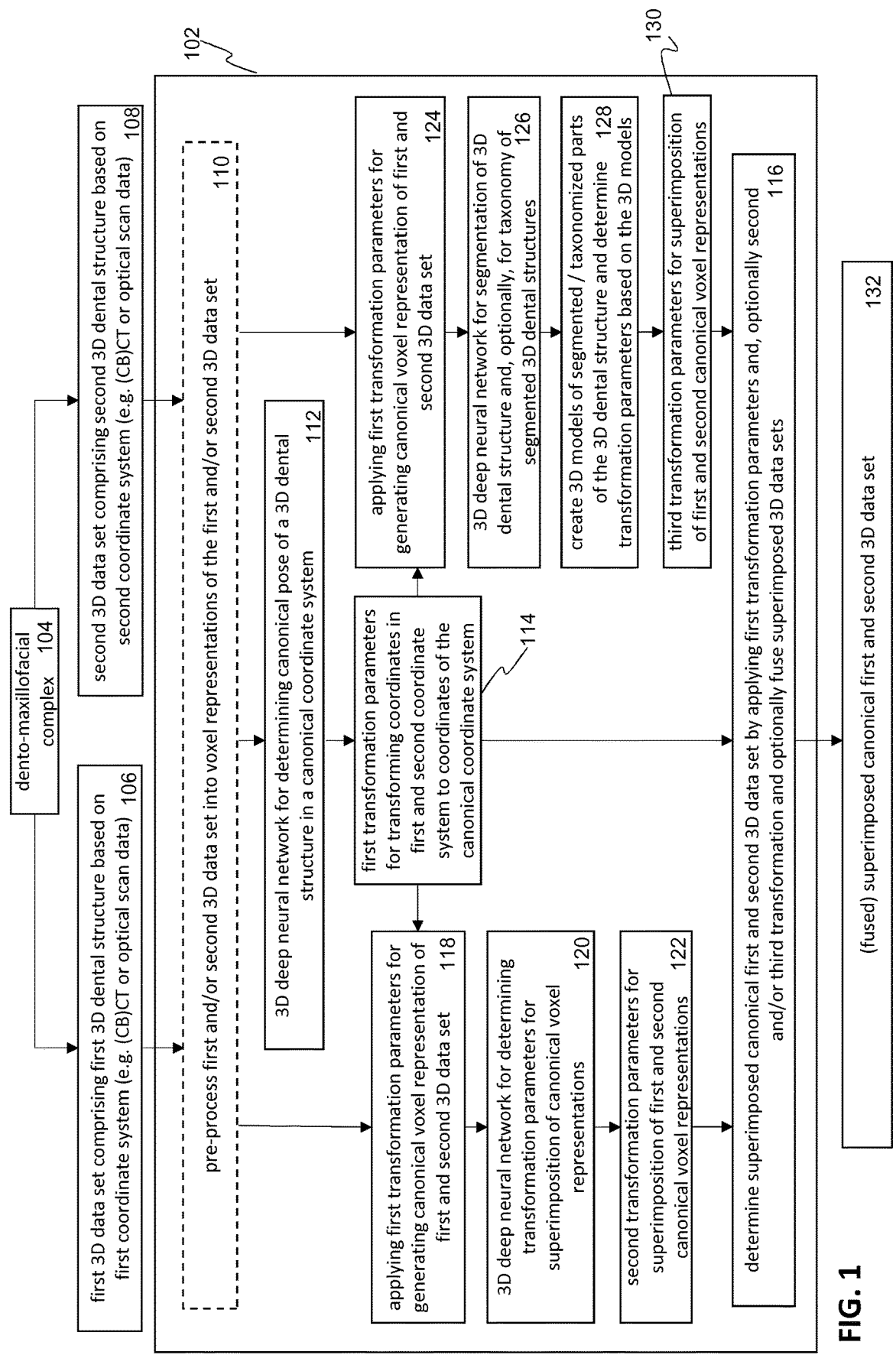
FIG. 1 depicts a schematic overview of a computer system for superimposition of dento-maxillofacial 3D image data using deep learning according to an embodiment of the invention.

FIG. 1 depicts a high-level schematic of a computer system for automated superimposition of image data representing a 3D object, in this example a 3D dento-maxillofacial complex, using deep learning according to an embodiment of the invention. The computer system 102 may comprise at least two inputs for receiving at least two 3D data sets, e.g. a first data set 106 comprising a first 3D object, such as a first 3D dental structure, associated with a first coordinate system and a second data set 108 comprising a second 3D object, such as a second 3D dental structure, associated with a second coordinate system. The 3D data sets may represent a first 3D dental structure and a second 3D dental structure originating from a 3D dento-maxillofacial complex 104, preferably from the same patient. The first and second 3D objects may have at least a part in common, e.g. a common dental part in case of a 3D dental structure. The 3D data sets may be generated by different scanners, e.g. different (CB)CT scanners and/or different optical scanners. Such scanning devices may include a cone beam CT scanner, fan beam CT scanner, optical scanner such as an intra-oral scanner, etc.

In case of a CBCT scanner, the 3D data set may include a voxel representation of x-ray data generated by a CBCT scanner. The voxel representation may have a predetermined format, e.g. the DICOM format or a derivative thereof. The voxel representation defines a 3D voxel space of a predetermined size, e.g. a 400×400×400 voxel space wherein each voxel is associated with a certain volume and the position of the voxels in the voxel space may be defined based on a predetermined coordinate system.

Alternatively, in case of an optical scanner, the 3D data set may comprise surface mesh data, e.g. a set of points or vertices in 3D space connected by edges defining a set of faces, the set of faces in turn defining a surface in 3D space. The 3D data set may also comprise point cloud data representing points in a 3D space defined by a 3D coordinate system. In an embodiment, a 3D data set representing a surface mesh may be generated using an intra-oral scanner, wherein the 3D data set may have a predetermined format, e.g. the STL format or a derivative thereof. Also in this case, the 3D surface mesh representation defines a 3D space of a predetermined size wherein the position of the points and/or vertices are based on a predetermined coordinate system (which differs from the coordinate system used for the other 3D data set).

In some embodiments, a 3D surface mesh of a 3D dental structure may be segmented into individual segmented (i.e. separated) 3D dental elements, e.g. tooth-crowns and surfaces belonging to gingiva. Segmenting 3D surface meshes into individual 3D surface meshes is a well-known technique in the art, as described e.g. by WU K et al, *Tooth segmentation on dental meshes using morphologic skeleton*. Comput Graph February 2014 Vol. 38, 199-211.

The 3D data sets may be generated (approximately) at the same time or at different points in time (pre-operative and post-operative scans using the same or different scanning systems), wherein the representation of the 3D dento-maxillofacial complex may be defined on the basis of a 3D coordinate system as defined by the image processing software so that the orientation and/or scale of the 3D dento-maxillofacial structures in the 3D dento-maxillofacial complex of the different 3D sets may substantially vary. The 3D dento-maxillofacial complex may include 3D dento-maxillofacial structures, in short 3D dental structures such as jaw, teeth, gums, etc.

Large variances in the 3D data sets (in terms of data formats/modalities, coordinate systems, position and orientation of the 3D structure, quality of the image data, differing amounts of overlap between the structures present, etc.) that may be offered to the input of the computer system, make the problem of accurate automated superimposition of the 3D dental structures (i.e. superimposition of the 3D dental structures without any human intervention) a non-trivial exercise. Known superimposition systems are not capable of dealing with these issues in a reliable and robust manner.

In order to deal with this problem, the system of FIG. 1 may include a first trained 3D deep neural network 112 that is configured to receive a voxel representation of different 3D data sets originating from a 3D dento-maxillofacial complex, preferably of one patient. The 3D deep neural network is trained to determine a canonical pose in a canonical coordinate system of a 3D dental structure in the 3D dento-maxillofacial complex, wherein the canonical coordinate system defines a coordinate system relative to a position on a common dento-maxillofacial structure, for example a position on the dental arch. The 3D deep neural network may be configured to determine first transformation parameters 114 (in terms of translation, rotation and/or scaling) for a voxel representation of a 3D data set as encoded in the memory of the 3D deep neural network. The first transformation parameters are determined on the basis of translation, orientation and/or scaling information of typical dento-maxillofacial features as encoded in the 3D deep neural network and may be used to transform coordinates based on the first coordinate system of the first 3D data set and coordinates of the second coordinate system based on the second 3D data set to coordinates based on a canonical coordinate system. The thus obtained first and second 3D data set represent superimposed first and second 3D dental structures in the canonical coordinate system.

In the case that the first and/or the second 3D data sets are optical scan data, these data may be pre-processed before being offered to the input of the first 3D deep neural network. Here, pre-processing may include transforming the 3D scanning data, e.g. a 3D mesh, into a voxel representation so that it can be processed by the 3D deep neural network. For example, a 3D surface mesh may e.g. be voxelized in a such a way that a 3D voxel space representing at least the same real-world volume as comprised within the 3D surface mesh data. For example, such voxelized 3D surface mesh may have a binary voxel representation having default voxel values of a first value (e.g. "0") where no surface of the mesh data coincides with the representative voxel, and voxel values of a second value (e.g."1") where the mesh data does coincide. When a received 3D surface mesh defines an 'open' 3D surface structure, the structure may be 'closed' with additional surfaces. Voxelization may be realized as above wherein voxels located within an enclosed volume may also have a second value (e.g. "1"). This way a voxel representation of a volume is formed. The resolution (size of a voxel) may be selected appropriately in order to yield accurate results throughout the system, while still adhering to requirements considering e.g. available memory and processing.

In an embodiment, a 3D deep neural network may be used that is capable of determining the canonical pose of optical scan data (a 3D point cloud) directly based on the point cloud data. An example of such network are multi-layer perceptron (MLP) based deep neural network. MPL deep neural network architectures include PointNet (Qi, C. R., et al.: *Pointnet: Deep learning on point sets for 3d classication and segmentation*. Proc. Computer Vision and Pattern Recognition (CVPR), IEEE 1(2), 4 (2017)) or PointCNN (Li et al. "*PointCNN: convolution on χ-transformed points*", arXiv:1801.07791v5 of 5 Nov. 2018, to be published in Neural Information Processing Systems (NIPS) 2018). These MLP deep neural networks are capable of directly processing points of a point cloud. Such neural networks may be trained to determine the canonical pose information based on the optical scan data as described in this application. In effect this would lead to being able to omit such a voxelization step as a pre-processing step, lead to faster processing and the ability of higher accuracy results depending on the granularity of the point cloud data.

A further pre-processing step may include partitioning the first and second 3D data sets into blocks of a predetermined size. The block size may depend on the size of the 3D input space of the first 3D deep neural network and on the memory space of the 3D deep neural network.

In an embodiment, the computer may determine a superimposed canonical first and second data set by determining first transformation parameters for the first 3D data set and first transformation parameters for the second 3D data set and by applying the thus determined transformation parameters to the first and second 3D data set. The 3D deep neural network may be trained to be very robust against large variances in the 3D data sets because the 3D deep neural network is trained based on a large number of typical 3D dento-maxillofacial structures wherein the structures exhibit a large spatial variance (translation, rotation and/or scaling). Issues related to (limited) memory size of the 3D deep neural network may be solved by training the deep neural network on the basis of subsamples (blocks) of voxel representations. To that end, a voxel representation is first partitioned in blocks of predetermined sizes before offered to the input of the 3D deep neural network. Due to the fact that the canonical coordinate system is defined relative to a known (pre-determined) standard for dento-maxillofacial structures, the obtained first and second canonical 3D data sets are aligned, wherein the accuracy may depend on the training time, training sample variance, and/or available blocks per received data set. Additionally, as described below in greater detail, a specific network architecture may be used to encode large amounts of 3D image information considering spatial variance.

In some cases, it may be advantageous to further refine the accuracy of the superimposition of canonical 3D data sets. Therefore, in some embodiments, a further refinement of the superimposition may be obtained using (partially overlapping) canonical voxel representations 118 of the first and second 3D data set and evaluating the superimposition of the canonical voxel representations using a further second 3D deep learning network. In these embodiments, the computer may determine the overlap between the volumes defined by the 3D dental structures represented by the superimposed canonical first and second data sets. Here, the overlap may be defined as the volume within the space defined by the canonical coordinate system that is common to the 3D dental structures of the first and second data set. The overlap may be used to select a volume of interest (VOI) in the canonical voxel representation of the first and second 3D data set. This way a first VOI of the canonical voxel representation of the first 3D data set and a second VOI of the canonical voxel representation of the second 3D data set may be selected for input to the second 3D deep neural network 120, which is configured to determine second transformation parameters 122. This 3D deep neural network may be referred to as a direct transformation deep neural network as the neural network generates transformation parameters in response to the provisioning of a canonical voxel representation to the input of the neural network. Applying the second transformation parameters to the each of the first and second canonical 3D data set (as obtained on the basis of the first transformation parameters) may further improve the accuracy of the superimposition 116.

Alternately and/or in addition, in some embodiments, a further refinement of the superimposition may be obtained using the canonical voxel representations of the first and second 3D data set and evaluating the superimposition of the canonical voxel representations based an analytical superimposition algorithm. In particular, in this embodiment, canonical voxel representations 124 of the first and second 3D data may be determined. Also in this case, overlap between the volumes defined by the 3D dental structures represented by the superimposed canonical first and second data sets may be used to determine one or more first VOIs of the canonical voxel representation of the first 3D data set and one or more second VOIs of the canonical voxel representation of the second 3D data set, which may be provided to the input to the input of a third 3D deep neural network 126. This deep neural network is configured to classify voxels of a VOI of a voxel representation of a 3D dental structure and form voxel representations of different segmented 3D dental elements, e.g. tooth, jaw bone, gum, etc. Additionally, in some embodiments, a post-processing step may be applied wherein a segmented 3D model of a segmented 3D dental element is generated based on classified voxels of a segmented 3D dental structure. Additionally, in some embodiments, a further fourth 3D deep neural network may be used to label voxel representations of segmented 3D dental elements according to a known taxonomy scheme, e.g. uniquely and consistently identifying individual teeth.

The segmentation and taxonomy processes may benefit from the information derived from the first 3D deep neural network. In particular, the determination and the application of an initial first set of transformation parameters by the first 3D deep neural network may result in a canonical voxel representation of a 3D data set, which allows more accurate segmentation and/or taxonomy results since the accuracy of the 3D deep neural networks used for segmentation and/or taxonomy are relatively sensitive to large rotational variances of the 3D input data.

Further, as explained above, the amount of overlap may be used by the third 3D deep neural network to determine in which volume of the space defined by the canonical coordinate system, overlapping structures (e.g. 3D dental elements) of the first and second 3D data set are present that are identical. Identification of volumes (VOIs) comprising overlapping structures in the first and second 3D data set may be used to determined so-called keypoints. Keypoints are used to mark the same (overlapping) structures within the two differing data sets. Hence, a set of keypoints identifies the exact 3D position of multiple points in the first 3D data set, which are linked to an associated set of key points in the second 3D data set. A distance minimizing algorithm may use the keypoints to calculate the appropriate third transformation parameters 130 for accurate superimposition of the first and second 3D data sets.

In an embodiment, the computer may use the superimposed canonical first and second 3D data set (as determined on the basis of the first transformation parameters and, optionally, the second and/or third transformation parameters) to create a single fused 3D data set 132 in a predetermined data format. Fusion of 3D data sets is known in the art, reference is made e.g. to the article of JUNG W et al, *Combining volumetric dental CT and optical scan data for teeth modeling*, Comput Aided Des October 2015, Vol. 67-68, 24-37.

Figure 2:
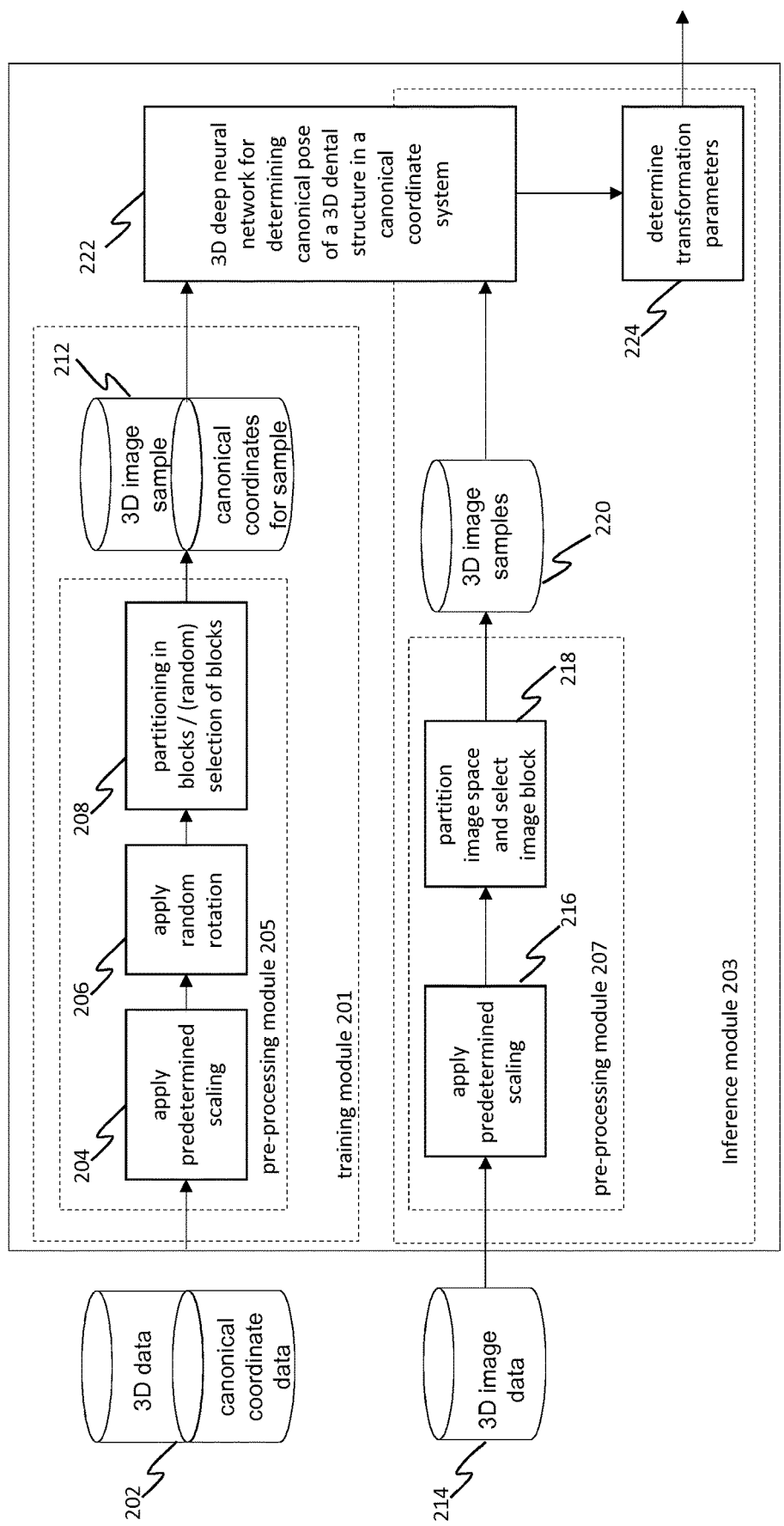
FIG. 2 depicts a schematic of a system for determining a canonical pose of a 3D dental structure according to an embodiment of the invention.

FIG. 2 depicts a schematic of a system for determining a canonical pose of a 3D dental structure in a canonical coordinate system according to an embodiment of the invention. The system 200 comprises at least one 3D deep neural network 222 having an input and an output. The system may include a training module 201 for training the 3D deep neural network on the basis of a training set 212. Additionally, the system may include an inference module 203 that is configured to receive a 3D data set representing a 3D object in a certain coordinate system and to determine transformation parameters for transforming coordinates of the voxels of the 3D data set into canonical coordinates of a canonical coordinate system as encoded in the 3D neural network during training.

The network may be trained on the basis of a training set 212 including 3D image samples and associated canonical coordinates for the 3D image samples. The training data may comprise 3D data sets (e.g. voxel intensity values, e.g. radio densities in the case of (CB)CT data, or binary values, e.g. in the case of voxelized surface scan data). Canonical coordinate data, which may be represented as an (x,y,z) vector per input voxel, may be used as target data.

A canonical coordinate system may be selected that is suitable for a class of 3D objects, e.g. 3D dental structures. In an embodiment, in the case of a 3D dental structure, a canonical coordinate system may be determined to have an origin (0,0,0) at a consistent point (inter- and intra-patient). Henceforth, when referring to 'real-world coordinates', this is considered as having axes directions related to the patient perspective, with a patient standing upright, with lowest-highest' meaning patient perspective 'up-down', 'front-back' meaning 'front-back' from the patient perspective, and left-right' meaning patient perspective 'left-right'. 'Real world' is intended to refer to the situation from which information, such as 3D data sets, is sourced. Such consistent point may e.g. be the lowest point (in real-world coordinates)—where both most frontally positioned teeth (FDI system index 11 and 21) are still in contact, or would be in contact (if e.g. either of those teeth is missing). Considering the directions of the axes, real-world directions (viewed as patient) down-up, left-right and front-back may respectively be defined and encoded as x, y and z-values ranging from a low value to a high value. In order to scale to real-world dimensions, various methods may be employed as long as this is done consistently across all training data, as the same scaling will be the output of the 3D deep learning network. For example, a value of 1 coordinate unit per real-world translation of 1 mm may be employed.

In order to achieve a 3D deep neural network that is robust against variances in data and or data modalities, a large variety of training samples 212 may be generated on the basis of an initial training set 202 that includes 3D data sets, e.g. voxel representations of 3D dental structures and associated canonical coordinate data. To that end, the training module may include one or more modules for pre-processing the training data. In an embodiment, in order to adhere to the processing and memory requirements of 3D deep neural network 222, a downscaling module 204 may be used to downscale a 3D data set to a downscaled 3D data set and associated canonical coordinates of a predetermined resolution. Such downscaling operation results in a smaller 3D image data set, e.g. downscaling the voxel resolution in each direction to 1 mm. In another embodiment, a transformation module 206 may be used to generate different variations of one 3D data set by applying random rotations to the (downscaled) 3D data and associated canonical coordinates. Note that this may be done for any available patient, effectively supplying a pool of data from which to draw potential training samples, having a multitude of patient data sets and a multitude of rotations per data set.

In a further embodiment, the training module may include a partitioning module 208 for partitioning the (downscaled) 3D data sets and associated canonical coordinates in blocks (3D image samples), wherein each block has a predetermined size and is a subset of the total volume of the 3D data set. For example, a 3D data set provided to the input of the training module may include a volume of 400×400×400 voxels wherein each voxel has a dimension of 0.2 mm in every orthogonal direction. This 3D data set may be downscaled to a downscaled 3D data set having a volume of e.g. 80×80×80 voxels of 1 mm in every direction. Then, the partitioning module may divide the downscaled 3D data set into 3D data blocks of a predetermined size (e.g. 24×24×24 voxels of 1 mm in every direction). These blocks may be used to train the 3D deep neural network using the canonical coordinates as target. In an embodiment, the partitioning module may include a random selector for randomly selecting blocks that form the training set 212 for the 3D deep neural network 222.

Note that such a 3D deep learning network will inherently train on both varying rotations (from 206) and translations (from random selections 208). Optionally, in another embodiment, samples may be presented on a multitude of scales as may be generated from 204.

With an appropriately trained 3D deep learning network 222, new 3D image data 214 (having an arbitrary position and orientation) may be presented as input to the system and appropriately pre-processed analogous to the training 3D image data, more specifically employing predetermined scaling 216, partitioning the down-scaled data set into image blocks of a predetermined size 218, and presenting the 3D image blocks 220 as required by the 3D deep neural network. By presenting image blocks covering the entire space of the received 3D image data at least once, canonical coordinates can be predicted by the 3D deep neural network for every (down-sampled) voxel in the 3D image data set.

Such prediction data may be processed further 224 in order to generate one general set of transformation parameters, defining how the received data may be transformed to be aligned as close as possible to its canonical pose. This processing will be described and illustrated hereunder in more detail. Note that with enough training samples from a relatively large real-world 3D space, a canonical pose may be determined for received data from a smaller volume (provided it is representatively comprised within the training data). Note that effectively the resolution of the input data may be around 1.25 mm. Predictions by 3D deep neural network 222 may be yielded in floating point values.

Figure 3A:
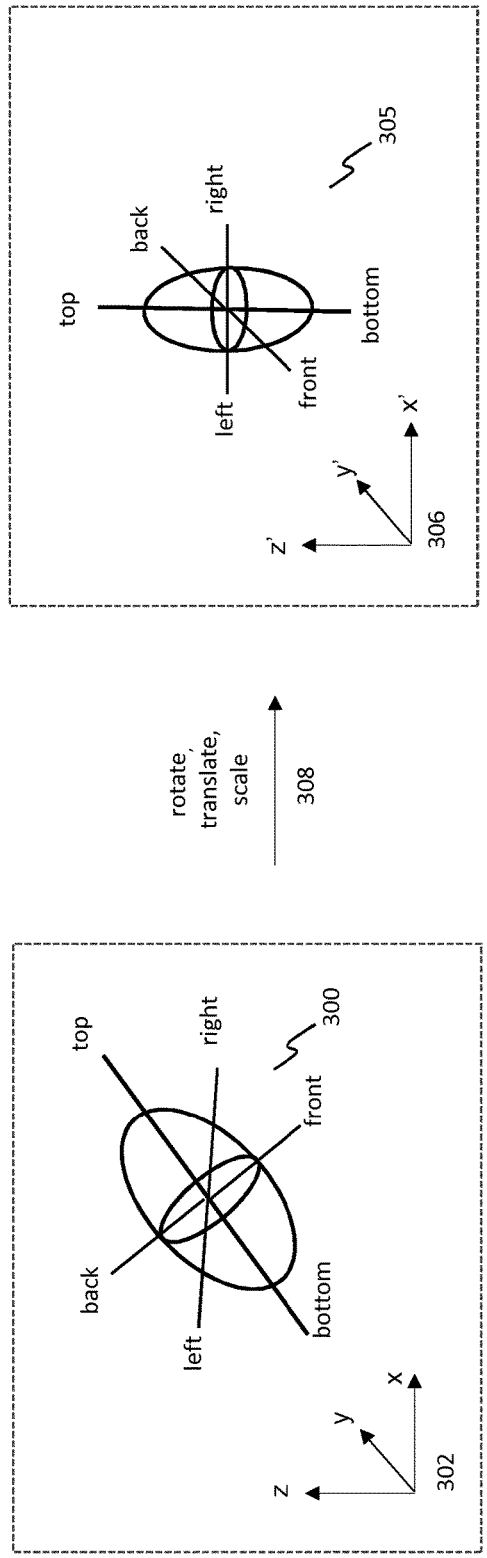

FIGS. 3A-3D depict schematics illustrating a method of determining a canonical pose of a 3D object such as a 3D dental structure according to an embodiment of the invention. FIG. 3A schematically depicts a voxel representation 300 of a 3D object, e.g. a dental object such as a tooth. A voxel may be associated with an intensity value, e.g. a radio density obtained from a (CB)CT scan. Alternatively, a voxel may be associated with a binary value. In that case, a voxel representation may be a binary voxel representation of a voxelized surface or a voxelized surface-derived volume obtained from a structured light scan or laser surface scan. The 3D object may have specific features identifying a top part (e.g. a crown), a bottom part (e.g. a root), a front part, a back part and a left and right part. The voxel representation is associated with a first (orthogonal) coordinate system (x,y,z) 302, e.g. a coordinate system that is used by the scanning software to represent the scanned data in a 3D space. These coordinates may e.g. be provided as (meta-) data in a DICOM image-file. The 3D object may have a certain orientation, position and size in the 3D space defined by the first coordinate system. Note however that such coordinate system may not yet correspond to a system as may be defined relative to the object, illustrated here by 'left', 'right', 'front', 'back', 'bottom' and 'top'. Using a trained 3D deep neural network, the 3D object may be (spatially) 'normalized' (i.e. re-oriented, re-positioned and scaled) 308 and defined based on an (orthogonal) canonical coordinate system. In the canonical coordinate system (x', y',z') 306, the normalized 3D object 305 may have a canonical pose, in which specific features of the 3D object may be aligned with the axis of the canonical coordinate system. Hence, the system may receive a voxel representation of a 3D dental structure having a certain orientation, position and size in a 3D space defined by a coordinate system defined by the scanning system and determine a canonical voxel representation of the 3D object wherein the 3D object is defined in a canonical coordinate system wherein the size of the objected is scaled and wherein specific features of the 3D dental structure are aligned with axes of the canonical coordinate system.

Figure 3B:
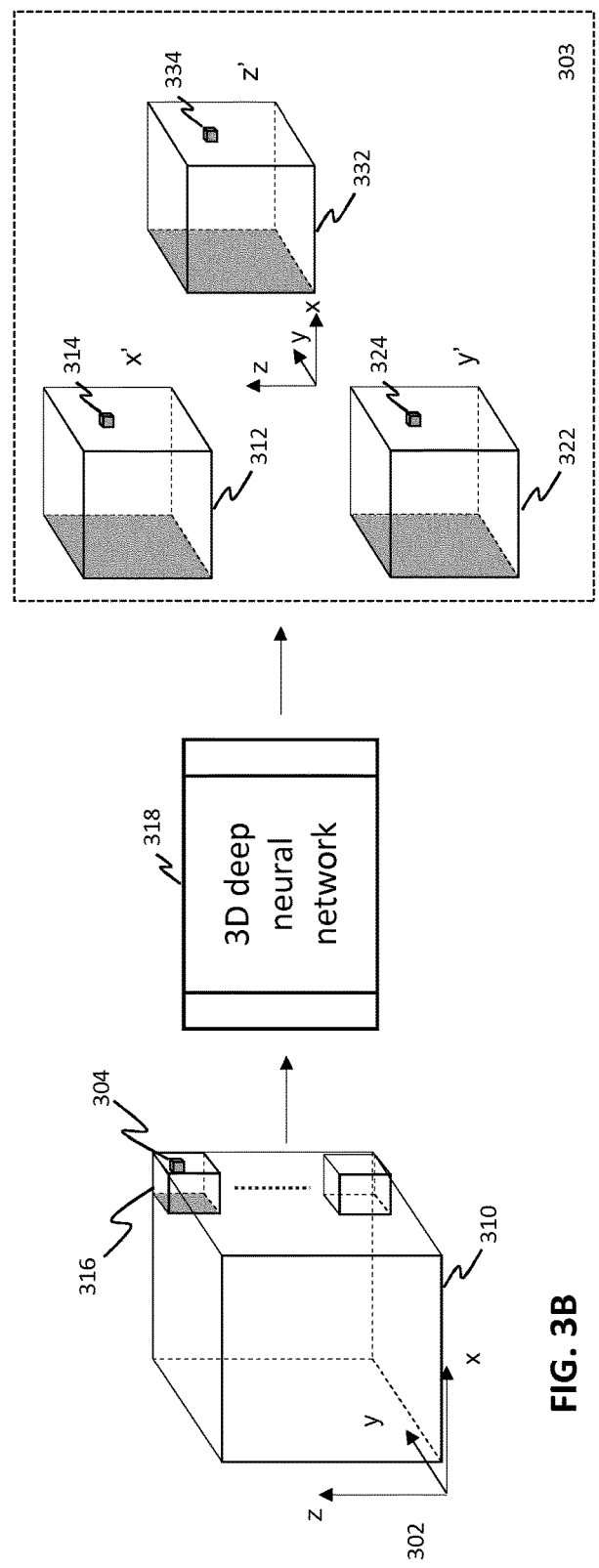

FIG. 3B depicts a 3D deep neural network 318 which may be trained to receive voxels of a voxel representation 310 of a 3D object, wherein voxels may have a certain position defined by a coordinate system 302 (x,y,z). The 3D deep neural network may be configured to generate so-called canonical pose information 303 associated with the voxel representation. The canonical pose information may comprise for each voxel 304 (x,y,z) of the voxel representation, a prediction of a coordinate (x',y',z') in a space defined by the canonical coordinate system. The canonical coordinate system may be defined with respect to a typical position, orientation and scale of reliably identifiable dento-maxillofacial structures, e.g. features of the dental arch. The information required to derive such canonical coordinate system may be encoded in the 3D deep neural network during the training phase of the network. This way, the canonical pose information may be used to place different varieties and/or modalities of 3D data representing the same dento-maxillofacial structure in the same relative position, orientation, and scale.

Hence, for each input voxel 304 three corresponding output values 314, 324, 334 are generated by the 3D deep neural network, comprising predictions for the values of, respectively, the input voxel's x'-, y'-, and z'-coordinates in the canonical coordinate system. In an embodiment, the canonical pose information may include three 3D voxel maps 312, 322, 332 wherein each 3D voxel map links a voxel of a voxel representation at the input of the 3D neural network to a canonical coordinate.

Before providing the voxel representation to the input of the 3D deep neural network, the voxel representation may be partitioned into a set of voxel blocks (illustrated here by 316, hereafter in short 'blocks'), wherein the dimensions of a voxel block match the dimensions of the input space of the 3D deep neural network. The block size may depend on data storage capabilities of the 3D deep neural network. Thus, the 3D deep neural network may process the voxels in each of the blocks of the voxel representation and produce canonical pose information for voxels of each block, i.e. predictions of coordinates (x',y',z') of a canonical coordinate system for each voxel in a block. In an embodiment, the 3D deep neural network may generate three voxel maps 312, 322, 332, a first voxel map 312 comprising for each voxel in a block that is offered to the input of the 3D deep neural network, a corresponding x' coordinate; a second voxel map 322 comprising for each voxel in a block an y' coordinate; and, a third voxel map 332 comprising for each voxel in a block an z' coordinate.

FIG. 3C schematically shows a voxel representation of a 3D object 300 that is offered to the input of the 3D deep neural network, and defined on the basis of a first coordinate system (x,y,z) 302, e.g. a coordinate system used by the image processing software of the scanner that was used to produce the 3D images. These coordinates or the information to determine these coordinates may be included in the data file, e.g. a DICOM file, as metadata. Based on canonical pose information generated by the 3D deep neural network a prediction of the canonical pose of the 3D object in a canonical coordinate system may be generated. Hence, the canonical pose information 350 may link a position (x,y,z) of each voxel in the first coordinate system to a position (x',y',z') in the canonical coordinate system. This information may be used to determine a transformation 360 that allows the system to transform the 3D object defined in the first coordinate system into its canonical pose 362 defined in the canonical coordinate system.

The pose information may be used to determine an orientation and a scaling factor associated with the axis of the canonical coordinate system (the canonical axes). Here, the orientation may be an orientation of the canonical axes in the space defined by the first coordinate system. The pose information may also be used to determine the position of the origin of the canonical coordinate system.

An orientation of a canonical axis may be determined based on a (local) gradient in one or more voxels in a 3D voxel map as determined by the 3D deep neural network. For example, for each or at least a number of voxels of the first 3D voxel map associated with the x' component of a canonical coordinate, a local gradient may be determined. The local gradient may be represented as a 3D vector in the x,y,z space defined by the first coordinate system. The direction of the vector represents a prediction of the orientation of the canonical x'-axis at the position of the voxel. Further, the length of the vector represents a prediction of a scaling factor associated with the canonical x'-axis. In an embodiment, a prediction for the orientation and the scaling factor associated with canonical x'-axis may be determined based on x' values of the first 3D voxel map. For example, a statistically representative measure of the predictions for voxels of the first 3D voxel map, e.g. the median or average gradient, may be determined. In an embodiment, the x' values of the first 3D voxel map may be pre-processed, e.g. smoothed and/or filtered. For example, in an embodiment, a median filter may be used to remove (local) outliers. In the same way, a prediction of an orientation and a scaling factor for the canonical y'-axis may be determined based on the y' values in the second 3D voxel map and a prediction of an orientation and a scaling factor for the canonical z'-axis may be determined based on the z' values in the third 3D voxel map. The predicted orientations of the canonical x', y', z' axes may be post-processed to ensure that the axes are orthogonal or even orthonormal. Various known schemes e.g. the Gram-Schmidt process, may be used to achieve this. Rotation and scaling parameters may be obtained by comparing the received coordinate system 302 and the coordinate system as derived from predictions.

The position of the origin of the canonical coordinate system (in terms of a translation vector in the space of the first coordinate system) may be obtained by determining a prediction of the canonical coordinates of the centre of a voxel representation that is offered to the input of the 3D deep learning network. These coordinates may be determined based on e.g. the average or median value of predicted x' values of the first 3D voxel map, y' values of the second 3D voxel map and z' values of the third 3D voxel map. A translation vector may be determined based on the predicted canonical coordinates $(x_p',y_o',z_o')$ of the centre of the block and the coordinates of the centre of the blocks based on the first coordinate system, e.g. using a simple subtraction. Alternatively, the origin of the canonical coordinate system may be determined by an aggregation of multiple predictions of such blocks, the latter effectively processing a canonical coordinates as determined for the space of the same size of the received voxel representation. The above described process may be repeated for each or at least a large part of the blocks of a 3D data set. The information determined for each block (orientation, scale and origin of the canonical coordinate system) may be used to obtain average values that provide an accurate prediction.

Hence, the systems and methods depicted in FIGS. 2 and 3 provide an efficient way of determining a canonical pose of a 3D dental structure. As shown in FIG. 3D these methods include a first step 380 of a processor of a computer providing a voxel representation of a 3D dental structure associated with a first coordinate system to the input of a 3D deep neural network, the neural network being configured to generate canonical pose information associated with a second canonical coordinate system. Thereafter in step 382, the processor may receive from the output of the 3D deep neural network canonical pose information, wherein for each voxel of the voxel representation the canonical pose information comprising a prediction of a canonical coordinate of the voxel. The processor subsequently may execute a processing step 384 wherein the canonical pose information is used to determine an orientation (and if applicable scaling) of the axes of the canonical coordinate system (by e.g. determining a vector representing the local gradient of a position of a voxel) and a position of the origin of the canonical coordinate system (by e.g. determining a vector representing average (x',y',z') values hence average 3D distance to canonical origin) and wherein the orientation and the position (and if applicable scaling) are subsequently used to determine transformation parameters for transforming coordinates of the first 3D coordinate system into coordinates of the second canonical coordinate system. Thereafter in step 386, the processor determines a canonical pose of the 3D dental structure in the space represented by the second canonical coordinate system by applying the transformation parameters to the received 3D data set. In case of the 3D data set is a voxel representation the parameters may be applied to the voxels. Alternatively, in case the 3D data set is a mesh representation, the parameters may be applied to the coordinates of mesh.

This way, a canonical representation of a 3D object such as a 3D dental structure can be realized. The method may be used to transform different 3D data modalities associated with a 3D object into the canonical pose of the 3D object which can be used in the process of superimposition of the different 3D data sets. Alternatively and/or additionally, the method may be used as a pre-processing step before a 3D data set is offered to a 3D input of one or more 3D deep neural networks that are configured to segment the 3D object and (optionally) to determine a taxonomy of the segmented parts of the 3D object. Such pre-processing step substantially increases the accuracy (and/or reduces training time or memory requirements for a same accuracy for such 3D deep neural networks) of the segmentation and classification of the 3D objects as the accuracy of such trained neural network can be affected if the pose of the 3D object represented by the 3D data set that is input to the system deviates too much (especially with respect to orientation) from a normalized pose.

Figure 4A:
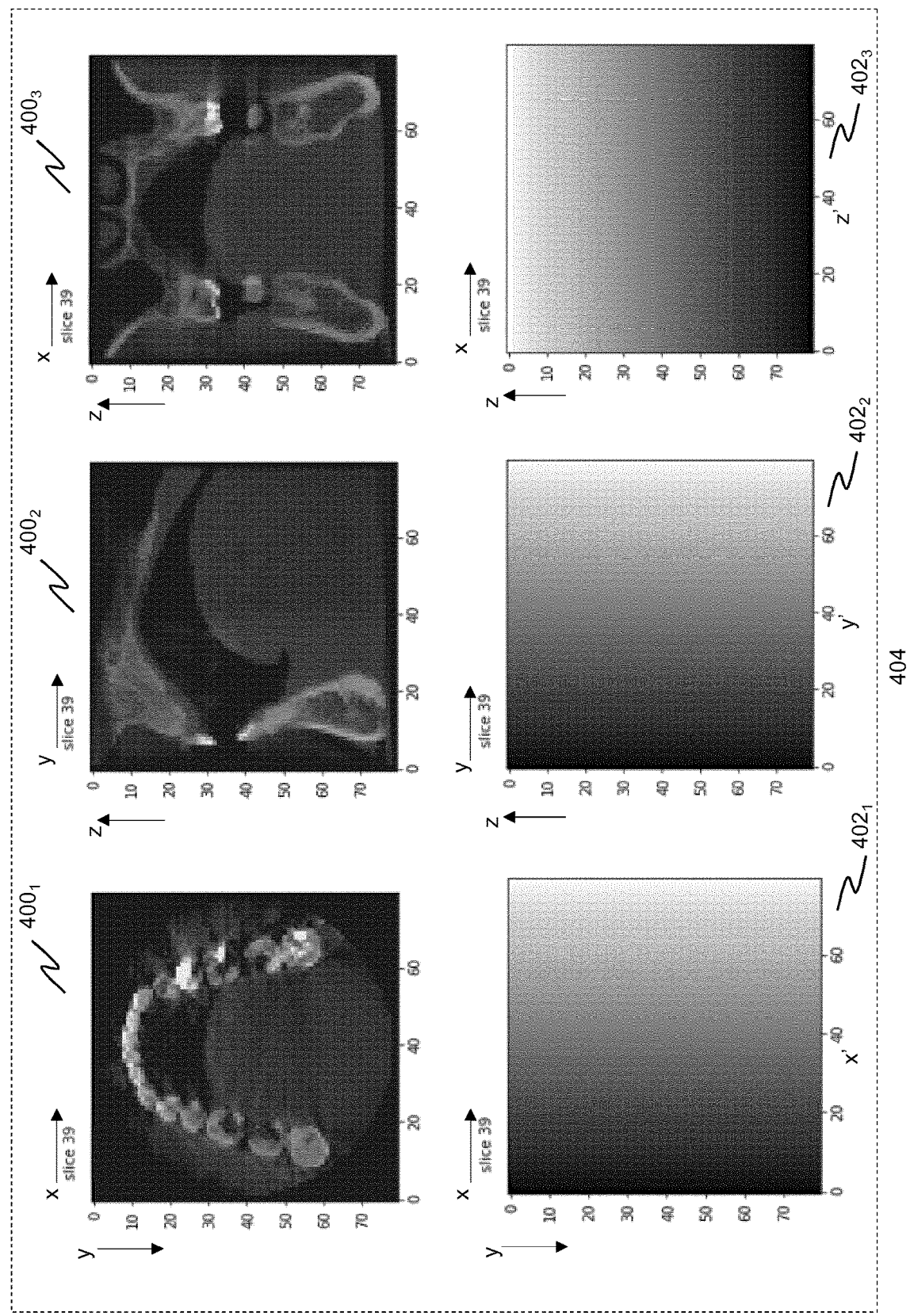
FIGS. 4A-C illustrate training and prediction data employed by system components, according to an embodiment of the invention.
Figure 4B:
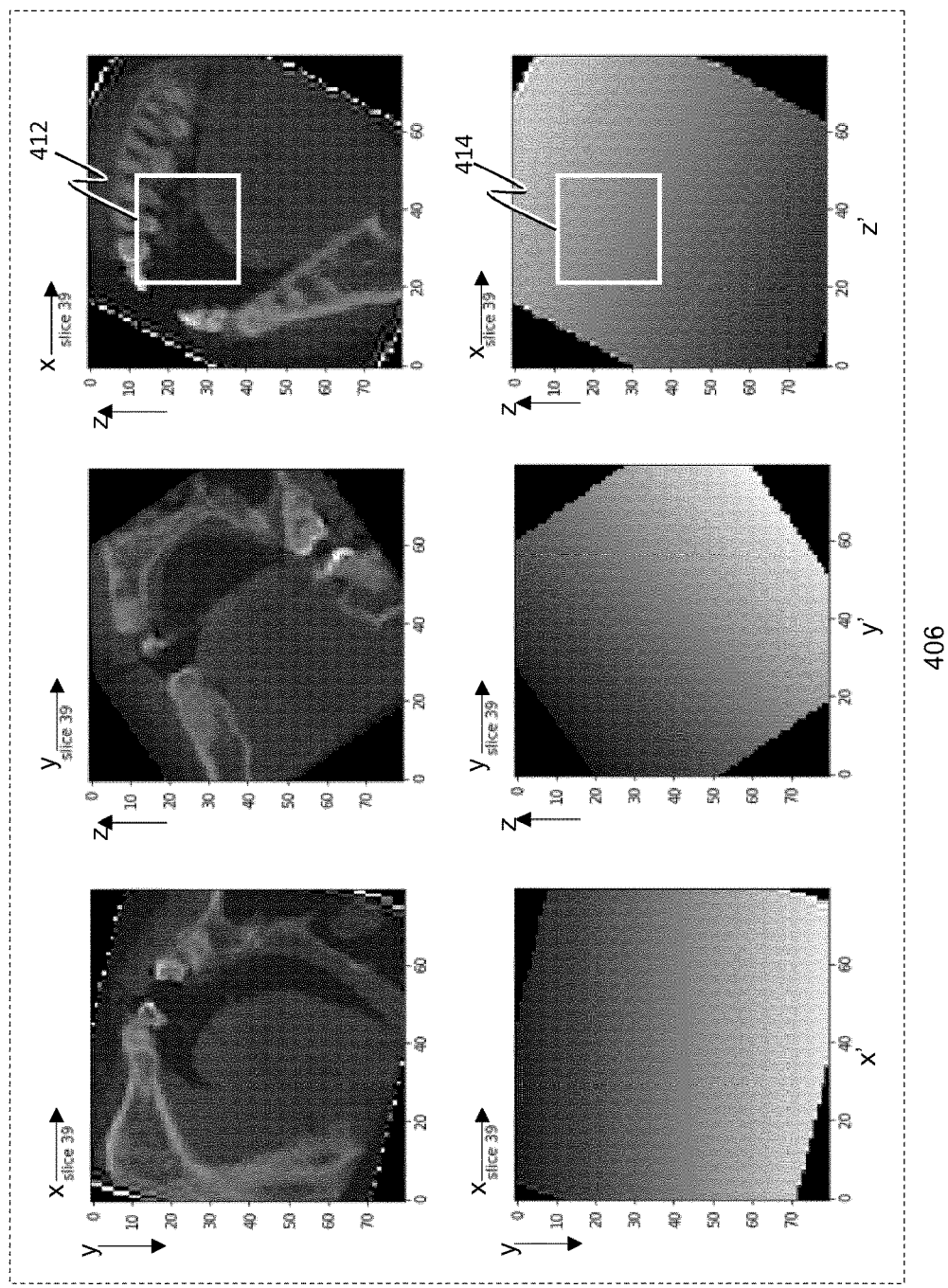
Figure 4B:
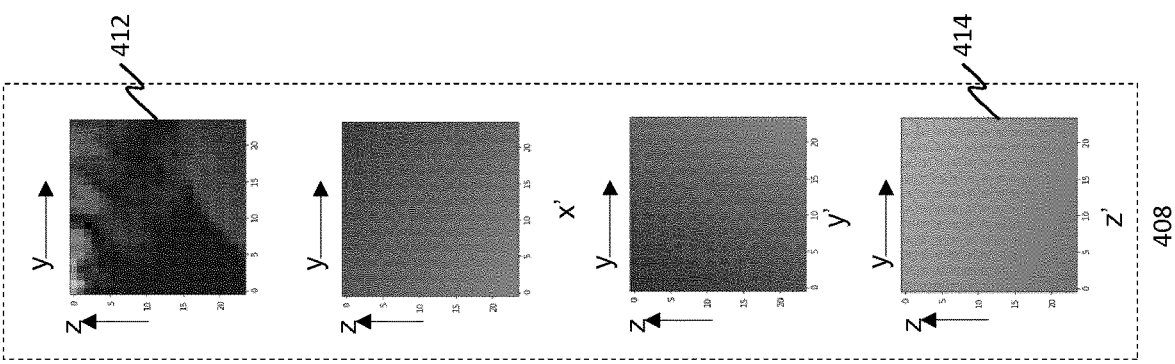
Figure 4C:
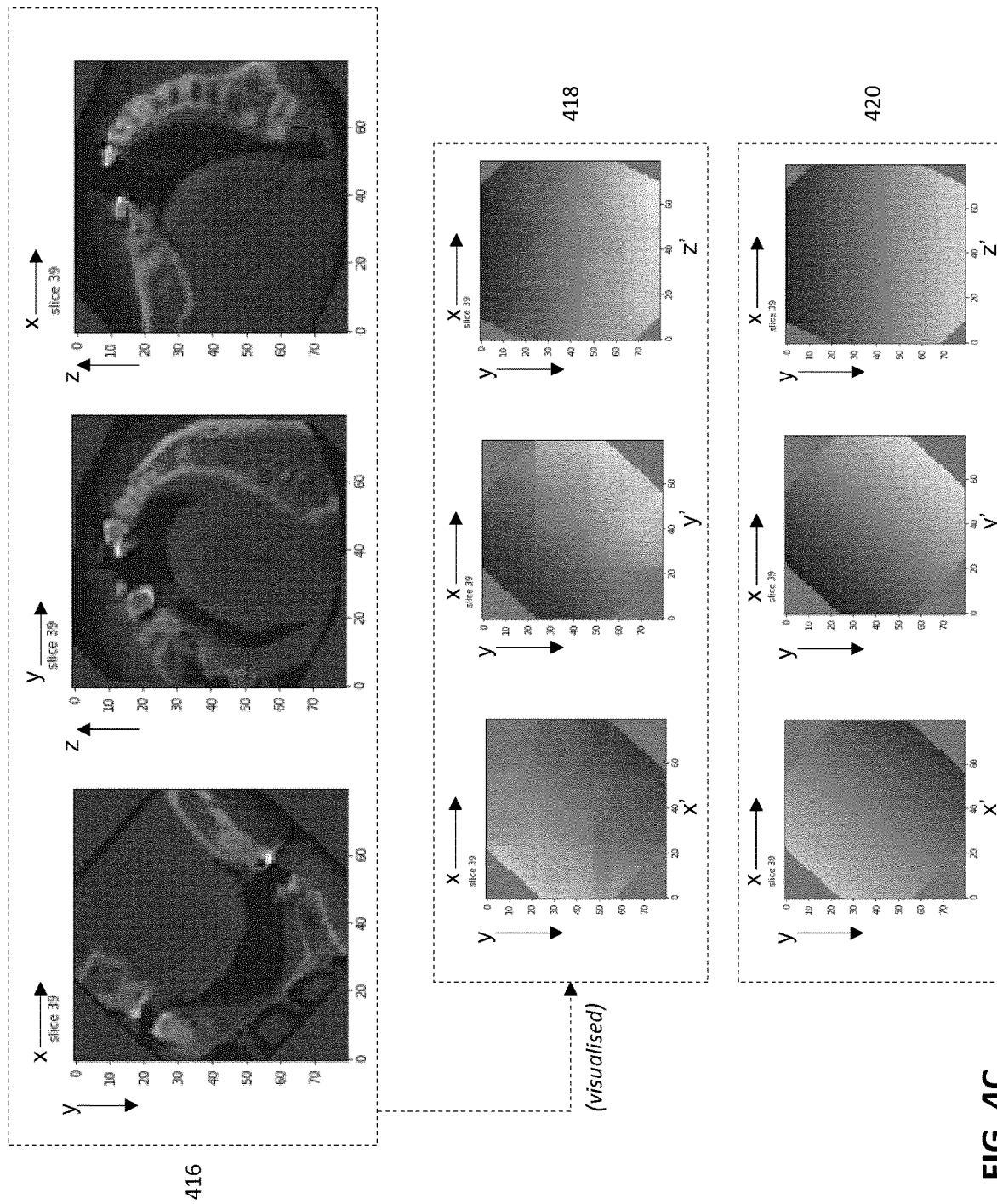

FIGS. 4A-C show illustrations of training targets and results as may be used by a method as described with reference to FIGS. 3A-3D. FIG. 4A depicts three slices $400_{1-3}$ of a 3D data set, in this example a CBCT scan of a 3D dental structure and associated slices of the 3D voxel maps for the x', y' and z' coordinate as may be used to train a 3D deep neural network. These 3D voxel maps comprise the desired predictions of the canonical x' coordinate $402_1$, the canonical y' coordinate $402_2$ and the canonical z' coordinate $402_3$. The grayscale values visualize the gradients of (encoded) values for coordinates according to the canonical coordinate system. The coordinates (x, y, z) indicate the position of a voxel of the 3D dental structure based on a coordinate system associated with the CBCT scan. The axes as visualized including their directions are denoted top-left per picture. Also noteworthy is that the grayscale values of the gradients displayed have been appropriately scaled to have the same grayscale value for the same value across all of FIGS. 4A-C. This allows for better visual comparison of what are effectively translations towards the canonical coordinate system as encoded (for training) or predicted. Finally note that all visualizations are 2D representations of a single middle 'slice' (effectively pixels of 2D image data), as sliced from the actually employed 3D data set and the associated voxel maps, as denoted by the slice number visible top-left per illustration.

For the purpose of training the system, a 3D data set representing a 3D dental structure may be attributed with a canonical coordinate system, as illustrated by FIG. 4B. In the case of these illustrations, for the illustrations showing gradients, the value for black is −40.0 mm and the value for white is +40 mm, effectively having the centre of this patient scan as origin (0,0,0). This data (both the 3D image data and the representation of the canonical system) are already downscaled appropriately as would result from processor 204. These data may then be rotated (e.g. employing a linear or other interpolation method) yielding 3D data as shown in the illustrations of 406. Depending on the exact method of performing this rotation, the size of the image space may also be expanded to include all voxels of the received 3D image data set, which is not the case in these illustrations.

FIG. 4B illustrates training data 408 as may result from the random selection (as may be performed by processor 208) of an appropriately sized block 412, in this case a subsample having dimension of 24×24×24 voxels, from the randomly rotated input voxel representation 406. Note that when visualizing all three encoded directions of the canonical coordinate system in the same y-z view (the middle y-z slice of the 3D cube of voxels) as done in 408, a gradient direction can be seen, which effectively encodes (in the case of this 2D visualization) the direction of the 2D component (in the y-z plane) of the 3D directional vectors encoding the directions of the axes of the canonical coordinate system. Similarly, the value per voxel effectively encodes the voxel x', y' and z' coordinate according to the canonical coordinate system. Note that when processing e.g. an entire 3D predicted set of data, the 3D vectors for each axis may be determined as following the canonical coordinate system. Selection of subsamples for training may be done in such a way that the selected smaller sized sample includes only voxels as were part of the received 3D image data set (i.e. not including the 'empty' patches of voxels along the edges, as can be seen in the illustrations, resulting from the applied rotation).

FIG. 4C shows a new input 416 after resizing (as may result from processor 216). This input has for the purpose of this illustration been arbitrarily rotated. For the purpose of illustrations 418 and 420, only x-y views (slices) have been visualized. Set 418 shows slices of the predicted canonical coordinates x', y' and z'. It can be seen that the received image data has been partitioned into blocks (or subsamples), coordinate prediction was performed on the blocks and these prediction blocks were placed back into the total received 3D image set space (which may be seen from the square-like structure seen in the images, indicating the dimensions of the blocks). Note that this effectively illustrates that predictions for both rotation, translation and optionally scaling parameters for transformation to the canonical coordinate system may be performed on 3D image data of size 30×30×30 mm. The figure also illustrates that the trained network is relatively robust again patches of 'empty' data as resulting from the rotation employed for this visualization. (I.e. 'empty' data is given a consistent value of 0 in the case of the network trained for the purpose of these illustrations)

Illustrated by 420 are the encoded coordinate values as they would have been if 416 were to have been training data, or the desired 'target' values as should result from the 3D deep neural network. It can be seen that the general values (indicating distance per voxel to origin) and the general directions of the gradients are very similar. In the case of real-world data being rotated, the 'empty' patches as seen within the illustration would not be present. The system may within processor 224 perform e.g. a 3D averaging filter on the predicted coordinate data 418, removal of outlier-values, and/or other methods to smooth the resulting values. A representative measure, e.g. the average or the median, of the predicted coordinate values may be used to determine the position of the centre of the voxel representation 416 relative to the canonical coordinate system. A translation may be determined based on the difference between the position of the centre of the voxel representation 416 relative to the received coordinate system and relative to the canonical coordinate system.

A 3D gradient derivation algorithm, which is relatively computationally inexpensive, may yield three additional cubes of values per 'axis cube of values', effectively yielding per 'axis cube' the three components of the vector describing the direction of the axis. This may result in a directional 3D vector for all of x-, y- and z-axis directions, per voxel. A representative measure, e.g. the average or median, may be determined for these vectors for the desired coordinate axes. If applicable, these vectors per axis may be converted to their unit vector equivalent. Additionally, the system may ensure that these three vectors are converted to their closest perfectly orthonormal set of three, minimizing the sum of the angular distance between the first set of vectors per predicted axis and the resulting orthogonal set.

From these three (effectively) predicted directions of the canonical axes, appropriate transformation parameters considering rotations of the received 3D image data set towards the canonical orientation, as part of the canonical pose, may be calculated. Subsequently the system may determine what the average distance to the canonical origin would be, per axis, for the received 3D image data set. From this, transformation parameters for translation of the received 3D image data set can be calculated, effectively determining where the canonical origin should be within (or relative to) the received 3D image data set, or conversely, where the canonical position should be in the coordinate system.

In another embodiment, the 3D deep neural network may be been trained on varying scales and the magnitude of the gradient of the resulting prediction values may be employed to determine the scale of the received 3D image data set. This may be used to calculate transformation parameters towards a desired scaling of the received data.

Figure 5:
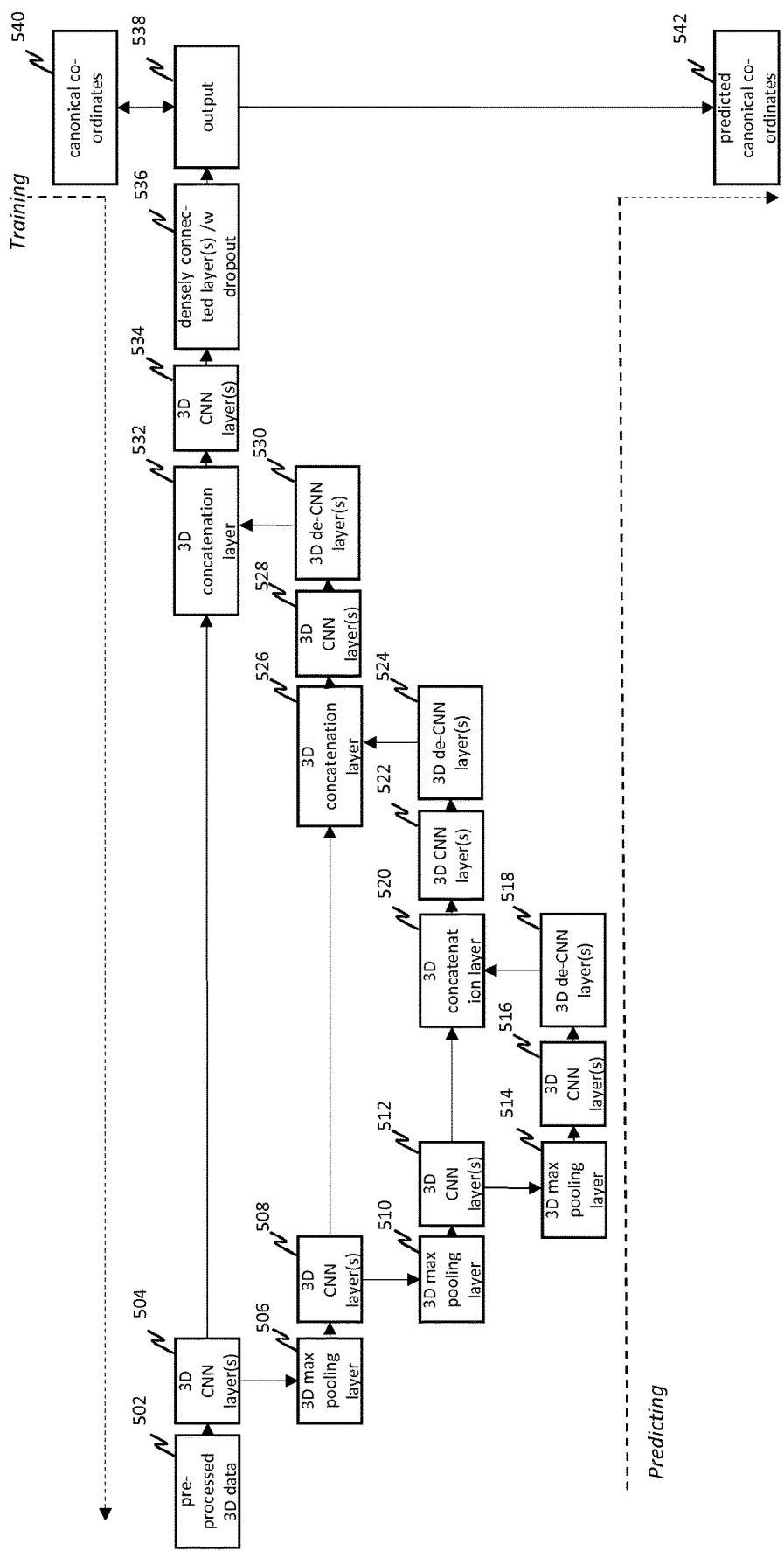
FIG. 5 depicts an example of a 3D deep neural network architecture for generating canonical coordinates according to an embodiment of the invention.

FIG. 5 depicts an example of a 3D deep neural network architecture for determination of canonical coordinates according to an embodiment of the invention. The 3D deep neural network may have an architecture similar to a 3D U-net, which is effectively a 3D implementation of the 2D U-net as is well known in the art.

The network may be implemented using a variety of 3D neural network layers, such as (dilated) convolutional layers (3D CNNs), 3D max-pooling layers, 3D deconvolutional layers (3D de-CNNs), and densely connected layers. The layers may use a variety of activation functions such as linear, tanh, ReLU, PreLU, sigmoid, etc. The 3D CNN and de-CNN layers may vary in their amount of filters, filter sizes and subsampling parameters. The 3D CNN and de-CNN layers, as well as the densely connected layers, may vary in their parameter initialization methods. Dropout layers and/or batch normalization may be employed throughout the architecture.

Following a 3D U-net architecture, during training the various filters within the 3D CNN and 3D de-CNN layers learn to encode meaningful features as would aid the effort of prediction accuracy. During training, matching sets of 3D image data 502 and encoded matching canonical coordinates 540 are used to optimize towards prediction of the latter from the former. A loss function may be employed as a measure to be minimized. This optimization effort may be aided be making use of optimizers such as SGD, Adam, etc.

Such an architecture may employ various resolution scales, effectively downscaling 506, 510, 514 as results from a previous set of 3D CNN layers 504, 508, 512 through max pooling or (dilated and/or subsampling) convolutional layers. The term 'meaningful features' refers to (successive) derivations of information relevant to determining the target output values, are however also encoded through the 3D de-CNN layers, which effectively perform an upscaling whilst employing filters. By combining 520, 526, 532 data resulting from such 3D de-CNN layers 518, 524, 534 with the data from the 'last' 3D CNN layers operating on the same resolution (512 to 520, 508 to 526 and 504 to 532), highly accurate predictions may be achieved. Throughout the upscaling path, additional 3D CNN layers may be used 522, 528, 534. Additional logic may be encoded within the parameters of the network by making use of densely connected layers distilling e.g. logic per voxel based on the results of the filters of the incoming 3D CNN layer 534.

When being utilized for inference, having been trained to have encoded internal parameters in such a way that validation yields sufficiently accurate results, an input sample may be presented and the 3D deep learning network may yield predicted canonical coordinates per voxel 542.

Figure 6:
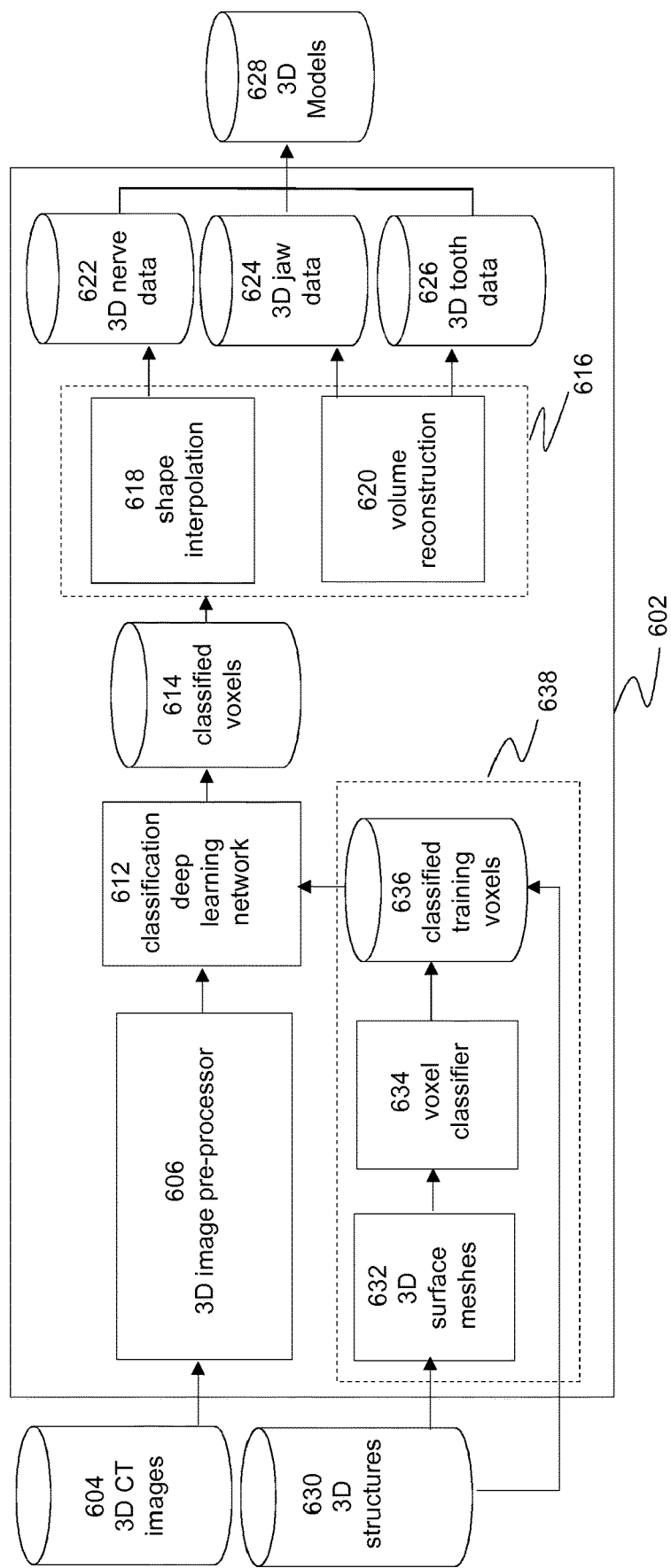
FIG. 6 depicts a schematic overview of a system component for segmentation of dento-maxillofacial 3D image data according to an embodiment of the invention.

FIG. 6 depicts a schematic overview of a system component for segmentation of dento-maxillofacial 3D image data according to an embodiment of the invention. Methods and systems for automatic segmentation based on deep learning are described in European patent application no. 17179185.8 with title *Classification and* 3D *modelling of* 3D *dento-maxillofacial structures using deep learning methods*, which is hereby incorporated by reference in this application.

In particular, the computer system 602 may be configured to receive a 3D image data stack 604 of a dento-maxillofacial structure. The structure may include e.g. jaw-, teeth- and nerve structures. The 3D image data may comprise voxels, i.e. 3D space elements associated with a voxel value, e.g. a greyscale value or a colour value, representing a radiation intensity or density value. Preferably the 3D image data stack may include a CBCT image data according a predetermined format, e.g. the DICOM format or a derivative thereof.

Particularly in CBCT scans, the radio density (measured in Hounsfield Units (HU)), is inaccurate because different areas in the scan appear with different greyscale values depending on their relative positions in the organ being scanned. HU measured from the same anatomical area with both CBCT and medical-grade CT scanners are not identical and are thus unreliable for determination of site-specific, radiographically-identified bone density.

Moreover, dental CBCT systems do not employ a standardized system for scaling the grey levels that represent the reconstructed density values. These values are as such arbitrary and do not allow for assessment of bone quality. In the absence of such a standardization, it is difficult to interpret the grey levels or impossible to compare the values resulting from different machines.

The teeth and jaw bone structure have similar density so that it is difficult for a computer to distinguish between voxels belonging to teeth and voxel belonging to a jaw. Additionally, CBCT systems are very sensitive for so-called beam hardening which produce dark streaks between two high attenuation objects (such as metal or bone), with surrounding bright streaks.

Due to the reasons mentioned above, and as will be described hereunder in more detail, it is particularly beneficial for the superimposition system to make use of the system component as described here with reference to FIG. 6.

The system component may comprise a segmentation pre-processor 606 for pre-processing the 3D image data before it is fed to the input of a first 3D deep neural network 612, which is trained to produce a 3D set of classified voxels as an output 614. Such pre-processing may e.g. comprise normalising voxel values to a range that is more beneficial for a neural network. As will be described hereunder in more detail, the 3D deep neural network may be trained according to a predetermined training scheme so that the trained neural network is capable of accurately classifying voxels in the 3D image data stack into voxels of different classes (e.g. voxels associated with tooth, jaw bone and/or nerve tissue). The 3D deep neural network may comprise a plurality of connected 3D convolutional neural network (3D CNN) layers.

The computer system may further comprise a segmentation post-processor 616 for accurately reconstructing 3D models of different parts of the dento-maxillofacial structure (e.g. tooth, jaw and nerve) using the voxels classified by the 3D deep neural network. Classified voxels 614 may comprise sets of voxels representing e.g. all those classified as belonging to a tooth, jaw or nerve structure. It may be beneficial to create 3D data of these types of structures in such a way that individual teeth and/or jaws (e.g. upper, lower) are represented by separate 3D models. This may be accomplished by volume reconstruction 620. For the case of separating sets of voxels belonging to individual teeth, this may be achieved by (combinations of) 3D binary erosion, 3D marker creation and 3D watershedding. For the combination of separation into lower and upper jaw parts, a distance from origin along the up-down (real-world coordinate system) axis may be found at which the sum of voxels in the plane perpendicular to this direction is at a minimum compared to other intersecting planes along the same axis. The split into upper and lower jaw parts can be made employing this distance. In another embodiment, the jaws may be automatically split by the deep network by classifying the corresponding voxels as separate jaw classes.

Other parts of the classified voxels, e.g. voxels that were classified by the 3D deep neural network as belonging to nerves may be post-processed by using an interpolation function 618 and stored as 3D nerve data 622. After segmentation, post-processing the 3D data of the various parts of the dento-maxillofacial structure, the nerve, jaw and tooth data 622-626 may be combined and formatted in separate 3D models 628 that accurately represent the dento-maxillofacial structures in the 3D image data that were fed to the input of the computer system. Note that both classified voxels 614 as well as 3D models 628 are defined in the same coordinate system as input data 604.

In order to make the 3D deep neural network robust against the variability present in e.g. current-day CBCT scan data, the 3D deep neural network may be trained using a module 638 to make use of 3D models of parts of the dento-maxillofacial structure as represented by the 3D image data. The 3D training data 630 may be correctly aligned to a CBCT image presented at 604 for which the associated target output is known (e.g. 3D CT image data of a dento-maxillofacial structure and an associated 3D segmented representation of the dento-maxillofacial structure). Conventional 3D training data may be obtained by manually segmenting the input data, which may represent a significant amount of work. Additionally, manual segmentation results in a low reproducibility and consistency of input data to be used.

In order to counter this problem, in an embodiment, optically produced training data 630, i.e. accurate 3D models of (parts of) dento-maxillofacial structure(s) may be used instead or in addition to manually segmented training data. Dento-maxillofacial structures that are used for producing the training data may be scanned using a 3D optical scanner. Such optical 3D scanners are known in the art and can be used to produce high-quality 3D jaw and tooth surface data. The 3D surface data may include 3D surface meshes 632 which may be filled (determining which specific voxels are part of the volume encompassed by the mesh) and used by a voxel classifier 634. This way, the voxel classifier is able to generate highly accurate classified voxels 636 for training. Additionally, as mentioned above, manually classified training voxels may be used by the training module to train the network as well. The training module may use the classified training voxels as a target and associated CT training data as an input.

FIGS. 7A and 7B depict examples of 3D deep neural network architectures for segmentation of dento-maxillofacial 3D image data according to various embodiments of the invention. As shown in FIG. 7A, the network may be implemented using 3D convolutional neural networks (3D CNNs). The convolutional layers may employ an activation function associated with the neurons in the layers such as a sigmoid function, tanh function, relu function, softmax function, etc. A plurality of 3D convolutional layers may be used wherein minor variations in the number of layers and their defining parameters, e.g. differing activation functions, kernel amounts and sizes, and additional functional layers such as dropout layers and/or batch normalization may be used in the implementation without losing the essence of the design of the 3D deep neural network.

The network may include a plurality of convolutional paths, in this example three convolutional paths, a first convolutional path associated with a first set of 3D convolutional layers 704, a second convolutional path associated with a second set of 3D convolutional layers 706 and a third set of 3D convolutional layers 708. A computer executing the data processing may provide a 3D data set 702, e.g. CT image data, to the inputs of the convolutional paths. The 3D data set may be a voxel representation of a 3D dental structure.

The function of the different paths is illustrated in more detail in FIG. 7B. As shown in this figure, voxels of the voxel representation may be provided to the input of the 3D deep neural network. The voxels of the voxel representation may define a predetermined volume, which may be referred to as the image volume $701_4$. The computer may divide the image volume in first blocks of voxels and provide a first block to the input of the first path. The 3D convolutional layers of the first path $703_1$ may perform a 3D convolution operation on the first block of voxels $701_1$. During the processing, the output of one 3D convolution layer of the first path is the input of a subsequent 3D convolution layer in the first path. This way, each 3D convolutional layer may generate a 3D feature map representing parts of the first block of pixels that is provided to the input of the first path. A 3D convolutional layer that is configured to generate such feature maps may therefore be referred to as a 3D CNN feature layer.

As shown in FIG. 7B, the convolutional layers of the second path $703_2$ may be configured to process second blocks of voxels $701_2$ of the voxel representation, wherein a second block of voxels represents a down-sampled version of an associated first block of voxels and wherein the first and second block of voxels have the same centred origin. The represented volume of the second block is larger than the volume of the first block. Moreover, the second block of voxels represents a down-sampled version of an associated first block of voxels. The down-sampling factor may be any appropriate value. In an embodiment, the down-sampling factor may be selected between 20 and 2, preferably between 5 and 3.

The first path $703_1$ define a first set of 3D CNN feature layers (e.g. 5-20 layers), which are configured to process input data (e.g. first blocks of voxels at predetermined positions in the image volume) at the voxel resolution of the target (i.e. voxels of the image volume that are classified). The second path may define a second set of 3D CNN feature layers (5-20 layers), which are configured to process second blocks of voxels wherein each block of the second blocks of voxels $701_2$ has the same centre point as its associated block from the first block of voxels $701_1$. Moreover, the voxels of the second blocks are processed at a resolution that is lower than the resolution of $701_1$. Hence, the second blocks of voxels represent a larger volume in real-world dimensions than the first blocks. This way, the second 3D CNN feature layers process voxels in order to generate 3D feature maps that includes information about the direct neighbourhood of associated voxels that are processed by the first 3D CNN feature layers. This way, the second path enables the 3D deep neural network to determine contextual information, i.e. information about the context (e.g. its surroundings) of voxels of the 3D image data that are presented to the input of the 3D deep neural network.

In a similar way, a third path $703_3$ may be utilized, to determine further contextual information of first blocks of voxels $701_3$. Hence, the third path may comprise a third set of 3D CNN feature layers (5-20 layers), which are configured to process third blocks of voxels wherein each block of the third blocks of voxels $701_3$ has the same centre point as its associated block from the first block of voxels $701_1$ and the second block of voxels $701_3$. Moreover, the voxels of the third blocks are processed at a resolution that is lower than the resolution of the first and second blocks of voxels. This down-sampling factor may again be set at an appropriate value. In an embodiment, the down-sampling factor may be selected between 20 and 3, preferably between 16 and 9.

By using three paths or more paths, both the 3D image data (the input data) and the contextual information about voxels of the 3D image data can be processed in parallel. The contextual information is important for classifying dento-maxillofacial structures, which typically include closely packed dental structures that are difficult to distinguish.

The output of the sets of 3D CNN feature layers are then merged and fed to the input of a set of fully connected 3D CNN layers 410, which are trained to derive the intended classification of voxels 412 that are offered at the input of the neural network and processed by the 3D CNN feature layers.

The sets of 3D CNN feature layers may be trained (through their learnable parameters) to derive and pass on the optimally useful information that can be determined from their specific input, the fully connected layers encode parameters that will determine the way the information from the three previous paths should be combined to provide optimal classified voxels 712. Here, the output (the last layer) of the fully connected layers may provide a plurality of activations for each voxel. Such a voxel activation may represent a probability measure (a prediction) defining the probability that a voxel belongs to one of a plurality of classes, e.g. dental structure classes, e.g. a tooth, jaw and/or nerve structure. For each voxel, voxel activations associated with different dental structures may be thresholded in order to obtain a classified voxel. Thereafter, classified voxels belonging to different dental structure classes may be presented in the image space 714. Hence, the output of the 3D deep neural network are classified voxels in an image space that corresponds to the image space of the voxels at the input.

Note that while a segmentation 3D deep neural network as described with respect to FIG. 6 and FIG. 7 may be inherently invariant against translation across the 3D image data space, it may be beneficial to employ information from processor 114 to apply an initial pre-alignment step 124 to adjust at least rotations (albeit relatively roughly) to obtain a canonical pose. With real-world orthogonal directions (e.g. patient up-down, left-right and front-back) being present in the 3D image data used in a pre-defined canonical direction (e.g. respectively internal (3D data set) representation z-direction up-down, x-direction left-right and y-direction front-back), required memory bandwidth for the segmentation 3D deep neural network may be reduced, training time may be reduced and accuracy of segmentation may be improved. This may be done by specifically training and performing inference (prediction on non-training samples) on data with said 3D data sets pre-aligned considering rotations to said canonical rotations.

Figure 8:
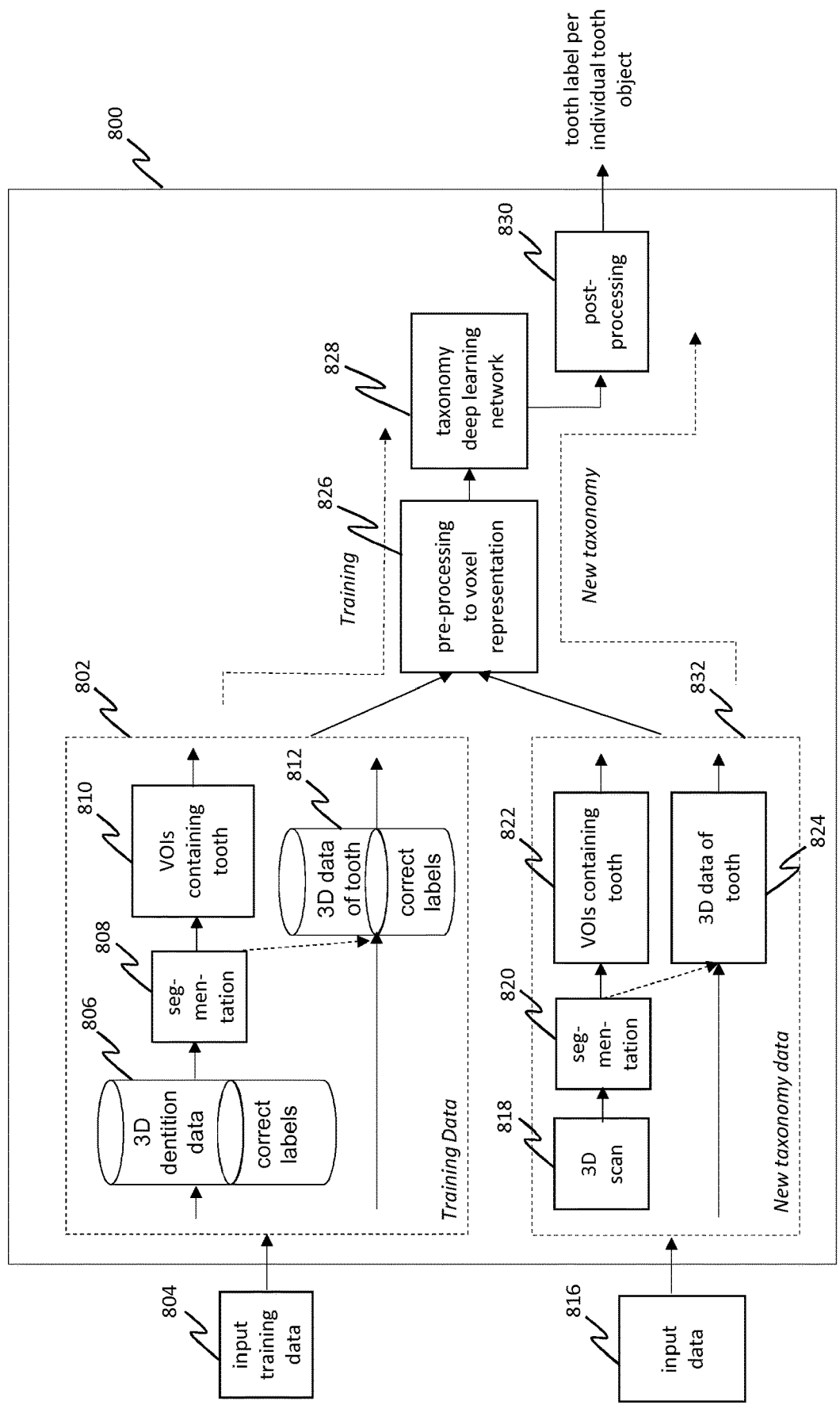
FIG. 8 depicts a schematic overview of a system component for taxonomy of dento-maxillofacial 3D image data according to an embodiment of the invention.

FIG. 8 depicts a schematic overview of a system component for taxonomy of 3D dento-maxillofacial 3D image data according to an embodiment of the invention. Methods and systems for automatic taxonomy based on deep learning are described in European patent application no. 17194460.6 with title Automated classification and taxonomy of 3D teeth data using deep learning methods, which is hereby incorporated by reference in this application. The system 800 may include two different processors, a first training module 802 for executing a process for training the 3D deep neural network 826 and a second classification module 814 for executing a classification process based on new input data 816.

As shown in FIG. 8, the training module may comprise one or more repositories or databases 806, 812 of data sources intended for training. Such repository may be sourced via an input 804 that is configured to receive input data, e.g. 3D image data including dentitions, which may be stored in various formats together with the respective desired labels. More specifically, at least a first repository or database 806 may be used to store 3D image data of dentitions and associated labels of the teeth within this dentition, which may be used by a computer system 808 that is configured to segment and extract volumes of interest 810 representing individual teeth that can be used for training. Such a system may be implemented as described with respect to FIG. 6 and FIG. 7 in the case of voxel (e.g. (CB)CT) data, or may e.g. be 3D surface meshes of individual teeth crowns as may be segmented from a 3D surface mesh comprising teeth and gingiva (e.g. IOS data). Similarly, a second repository or database 812 may be used for storing other formats of 3D data, e.g. 3D surface meshes generated by optical scanning and labels of individual teeth that may be employed during training of the network.

The 3D training data may be pre-processed 826 into a 3D voxel representation (voxelized) that is optimized for 3D deep neural network 828. The training process may end at this stage as the 3D deep neural network processor 826 may only require training on samples of individual teeth. In an embodiment, 3D tooth data such as a 3D surface mesh may also be determined on the basis of the segmented 3D image data that originate from complete dentition scans (808 to 812), which are appropriately labelled.

When using the taxonomy module 800 for taxonomizing a new (part of a) dentition 816, again multiple data formats may be employed when translating the physical dentition into a 3D representation that is optimized for 3D deep neural network 828. As described above, the taxonomy system may e.g. make use of 3D image data of the dentition 106, 108 and use a computer system 820 (being 602) that is configured to segment and extract volumes of interest comprising individual teeth 822 (being 626) analogous to training processor 808. Alternatively, another representation such as a surface meshes per tooth 824 resulting from optical scans may be used. Note again that complete dentition data may be used to extract other 3D representations than volumes of interest (820 to 824).

Pre-processing 826 to the format as required for 3D deep neural network 828 may be put into place. Note that within the context of the entire superimposition system, in the case of a received 3D image data set being e.g. (CB)CT data, taxonomy of segmented data by network 828 may be done utilizing (subsets of) data generated in volume reconstruction 620 directly. In the case of a received 3D image data set being e.g. IOS data, taxonomy by 828 may be performed directly on (subsets of data) following from 3D surface mesh segmentation and voxelization of crowns.

The outputs of the 3D deep neural network may be fed into a taxonomy post-processing step 830 designed to make use of knowledge considering dentitions (e.g. the fact that each individual tooth index can only appear once in a single dentition) to ensure the accuracy of the taxonomy across the set of labels applied to the teeth of the dentition. This may lead to the system outputting tooth labels per identified individual tooth object. In an embodiment, correct labels may be fed back into the training data with the purpose of increasing future accuracy after additional training of the 3D deep neural network.

Figure 9:
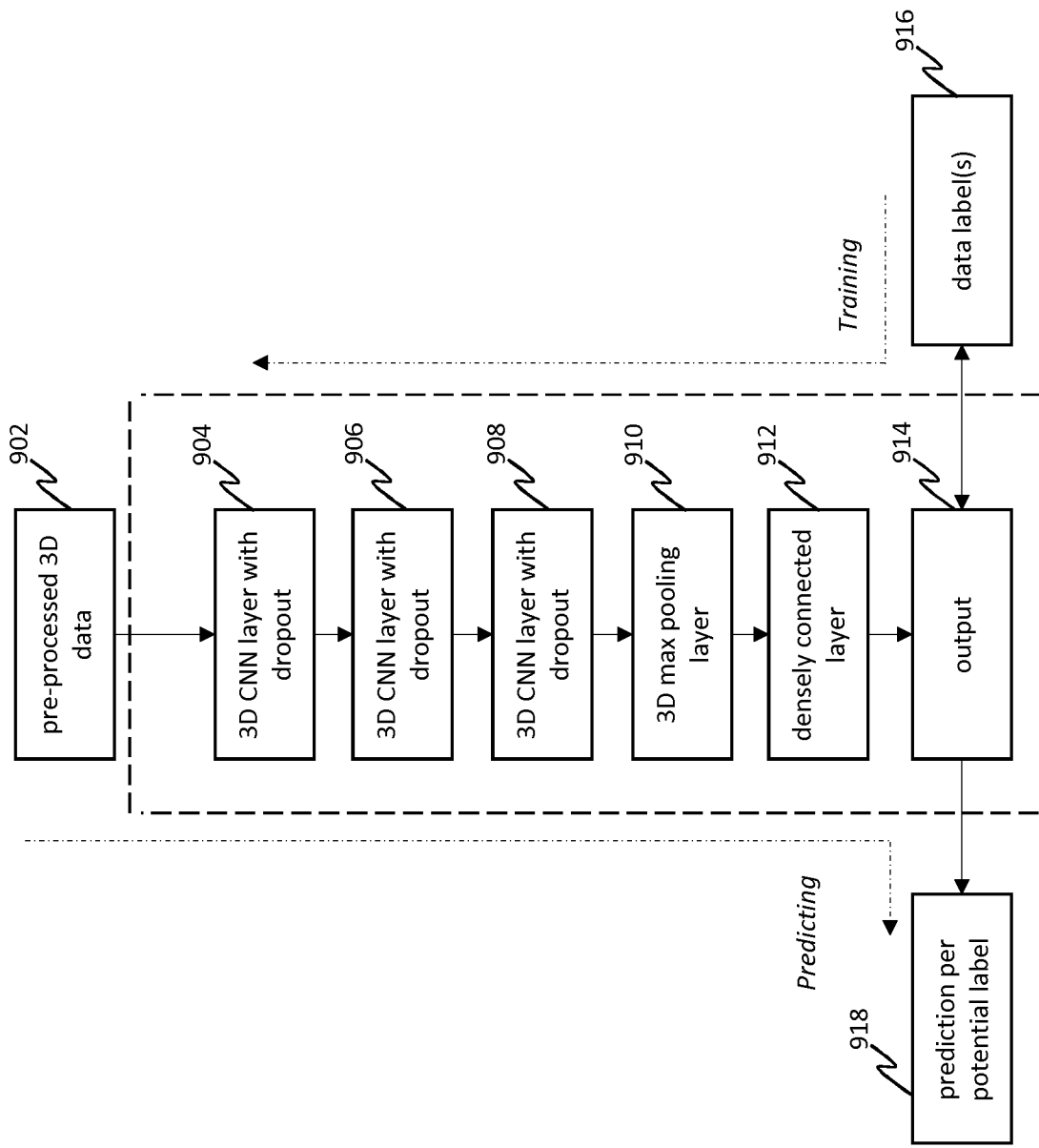
FIG. 9 depicts an example of a 3D deep neural network architecture for taxonomy of dento-maxillofacial 3D image data according to an embodiment of the invention.

FIG. 9 depicts an example of a 3D deep neural network architecture for taxonomy of dento-maxillofacial 3D image data according to an embodiment of the invention. The network may be implemented using 3D convolutional layers (3D CNNs). The convolutions may use an activation function. A plurality of 3D convolutional layers, 904-908, may be used wherein minor variations in the number of layers and their defining parameters, e.g. differing activation functions, kernel amounts, use of subsampling and sizes, and additional functional layers such as dropout and/or batch normalization layers may be used in the implementation without losing the essence of the design of the 3D deep neural network.

In part to reduce the dimensionality of the internal representation of the data within the 3D deep neural network, a 3D max pooling layer 910 may be employed. At this point in the network, the internal representation may be passed to a densely-connected layer 912 aimed at being an intermediate for translating the representation in the 3D space to activations of potential labels, in particular tooth-type labels.

The final or output layer 914 may have the same dimensionality as the desired number of encoded labels and may be used to determine an activation value (analogous to a prediction) per potential label 918.

The network may be trained making use of a dataset with as input for the 3D CNN layers a pre-processed dataset of 3D data 902, i.e. a 3D voxel representation of a tooth. For each sample (being a 3D representation of a single tooth) a matching representation of the correct label 916 may be used to determine a loss between desired and actual output 914. This loss may be used during training as a measure to adjust parameters within the layers of the 3D deep neural network. Optimizer functions may be used during training to aid in the efficiency of the training effort. The network may be trained for any number of iterations until the internal parameters lead to a desired accuracy of results. When appropriately trained, an unlabelled sample may be presented as input and the 3D deep neural network may be used to derive a prediction for each potential label.

Hence, as the 3D deep neural network is trained to taxonomize a 3D data sample of a tooth into one of a plurality of tooth types, e.g. 32 tooth types in case of a healthy dentition of an adult, the output of the neural network will be activation values and associated potential tooth type labels. The potential tooth type label with the highest activation value may indicate to the taxonomy system that it is most likely that the 3D data sample of a tooth represents a tooth of the type as indicated by the label. The potential tooth type label with the lowest or a relatively low activation value may indicate to the taxonomy system that it is least likely that the 3D data set of a tooth represents a tooth of the type as indicated by such a label.

Note that it may be required to train separate specific network models (same architectures having different end-parameters after specific training) based on the type of input volume, e.g. the input voxel representation being a complete tooth volume, or the input voxel representation only representing a tooth crown.

Also note that while a taxonomy 3D deep neural network as described with respect to FIG. 8 and FIG. 9 (as was the case with the segmentation 3D deep neural network) may be inherently invariant against translation across the 3D image data space, it may be beneficial to employ information from processor 114 to apply an initial pre-alignment step 124 to adjust at least rotations (albeit relatively roughly) to obtain a canonical pose. With real-world orthogonal directions (e.g. patient up-down, left-right and front-back) being present in the 3D image data used in a pre-defined canonical direction (e.g. respectively internal (3D data set) representation z-direction up-down, x-direction left-right and y-direction front-back), required memory bandwidth for the taxonomy 3D deep neural network may be reduced, training time may be reduced and accuracy of taxonomy may be improved. This may be done by specifically training and performing inference on data with said 3D data sets pre-aligned considering rotations to said canonical coordinate system.

Figures 10A, 10B:
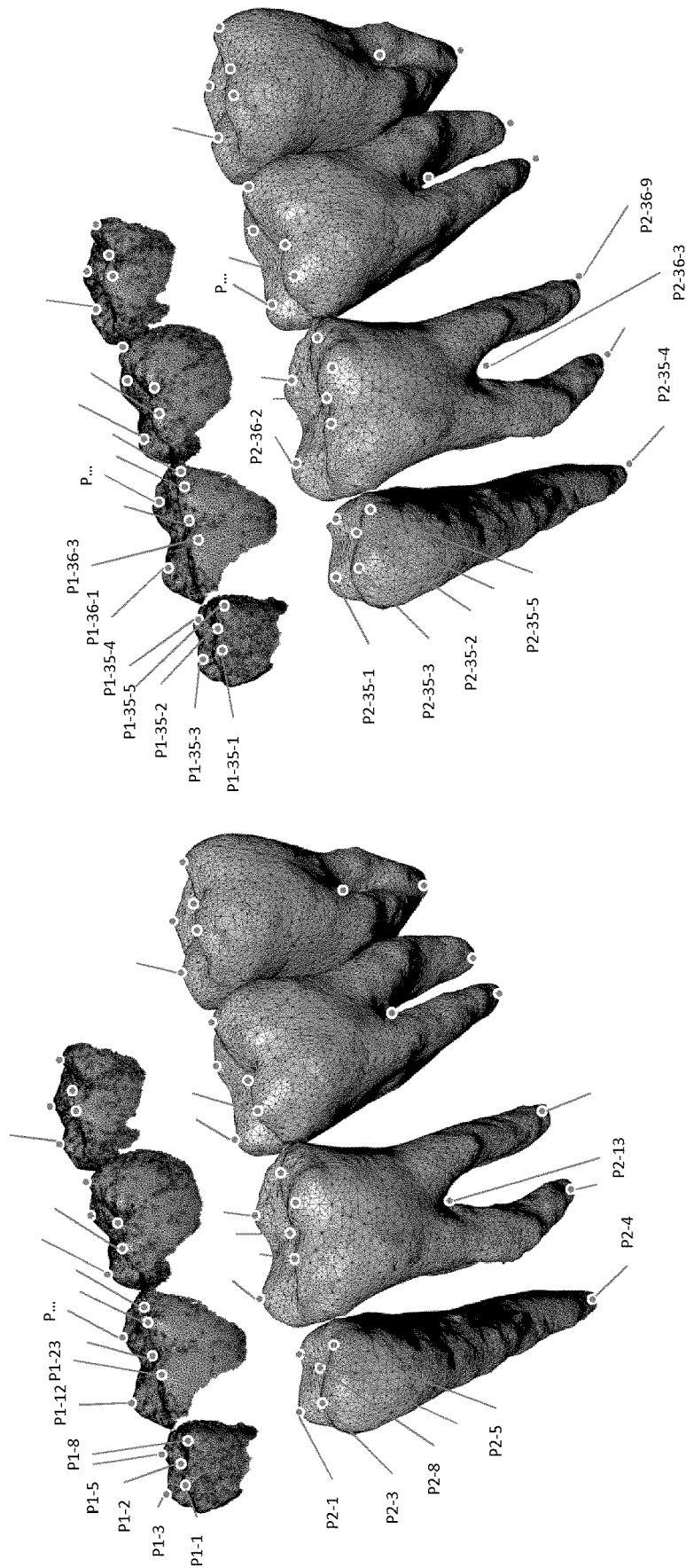
FIGS. 10A and 10B illustrate examples of generated keypoints.

FIG. 10A and FIG. 10B show examples of generated keypoints in two exemplary 3D dento-maxillofacial datasets respectively with and without the inclusion of taxonomy information. Following from at least the 3D image data (surface volumes) defining structures representing separate teeth, or tooth crowns, and following from e.g. processing as described with respect to FIG. 6 and FIG. 7 in the case of (CB)CT data, or by employing more common determination of surface meshes of individual tooth crowns in the case of e.g. IOS data, keypoints that characterize the surfaces may be determined. In effect this may be considered as a reduction step to reduce all available points within a surface mesh to a set of most relevant (most salient) points. This reduction is beneficial since it reduces processing time and memory requirements. In addition, methods for determination of such points may be selected that are expected to yield roughly the same set of points even if the inputs for the generation are slightly divergent (sets of) 3D surface meshes (still representing the same structures). Well known methods in the art for determining keypoints from surface meshes usually include the determination of local or global surface descriptors (or features) that may be hand-crafted (manually engineered) and/or machine-learned and optimized for repeatability across (slightly varying) input surface meshes, and may be optimized for performance (speed of determining the salient or keypoints), e.g. as taught by TONIONI A, et al. *Learning to detect good* 3D *keypoints*. Int J Comput Vis. 2018 Vol. 126, pages 1-20. Examples of such features are local and global minima or maxima in surface curvature.

Shown in FIG. 10A and FIG. 10B are computer renders of two received 3D image data sets, including the edges and vertices defining the meshes of surface faces and hence showing the points defining the surfaces. The top four objects are individually processed and segmented tooth crowns derived from an intra-oral scan. The bottom four objects are individual teeth derived from a CBCT scan according to the method with reference to figure to FIG. 6 and FIG. 7. These two sets of four teeth are sourced from the same patient at approximately the same moment in time. They have been roughly pre-aligned with a processor as has been described in more detail above with reference to FIG. 3, FIG. 4 and FIG. 5, being processor 114 determining the canonical pose as described earlier. From information following 114, overlapping volumes were determined, and the 3D structures were segmented into separate surface meshes representing individual teeth. In the case of FIG. 10B, additionally, taxonomy of individual tooth 3D image data was performed according to methods as described with reference to FIG. 8 and FIG. 9.

In particular, in FIG. 10A, points have been visualised with labels according to the format P[no. of received data set]-[no. of point]; the number of points has been reduced for visualisation purposes. As can be seen, each received set of 3D image data after keypoint generation has its own set of keypoints following from salient features of the volume, where the same points along the surfaces will be marked with an (albeit arbitrarily numbered) keypoint. Note that it would be possible to sub-group such points per individual tooth within the originating 3D data set, but this would yield no additional benefits since the (same) individual tooth would not be identifiable across the different 3D data sets.

In FIG. 10B, employing information following from the additional taxonomy step, the format of the labels has been visualised as P[no. of received data set]-[index of identified tooth]-[no. of point]. This index of the identified tooth is the same index across both received data sets for the same real-world teeth. It should be noted that within each individual tooth sub-group, numbering of keypoints is still arbitrary.

It is noteworthy that 3D surface mesh data (and point cloud data or a collection of keypoints) is in general saved in a format of orthogonal x-, y- and z-coordinates by means of floating point numbers. This opens up the potential of highly accurate determination locations of keypoints, and hence highly accurate alignment results having determined transformation parameters based on e.g. methods minimizing a computed distance between such clouds of keypoints, as may be the case when employing e.g. an iterative closest point method.

The added information considering which keypoint belongs to which tooth (and matching same tooth representation in the other received 3D image data set), as shown in FIG. 10B, may specifically be employed to achieve more accurate determination of alignment transformation parameters. E.g. in cases where no initial pre-alignment has been performed, the average coordinate per tooth may be employed to determine a pre-alignment of one received 3D image data set to the other (in effect roughly orienting the matching teeth as close as possible to each other). In other cases, it may be beneficial to determine a set of transformation parameters first (one per matching tooth between the two received 3D image data set) and to determine the final transformation parameters based on an average of such a set. This may be especially beneficial in cases where overlapping volume between both received 3D image data sets has not been (appropriately enough) determined.

Note that for determination of alignment transformation parameters, at least three non-colinear points need to be determined.

Figure 11:
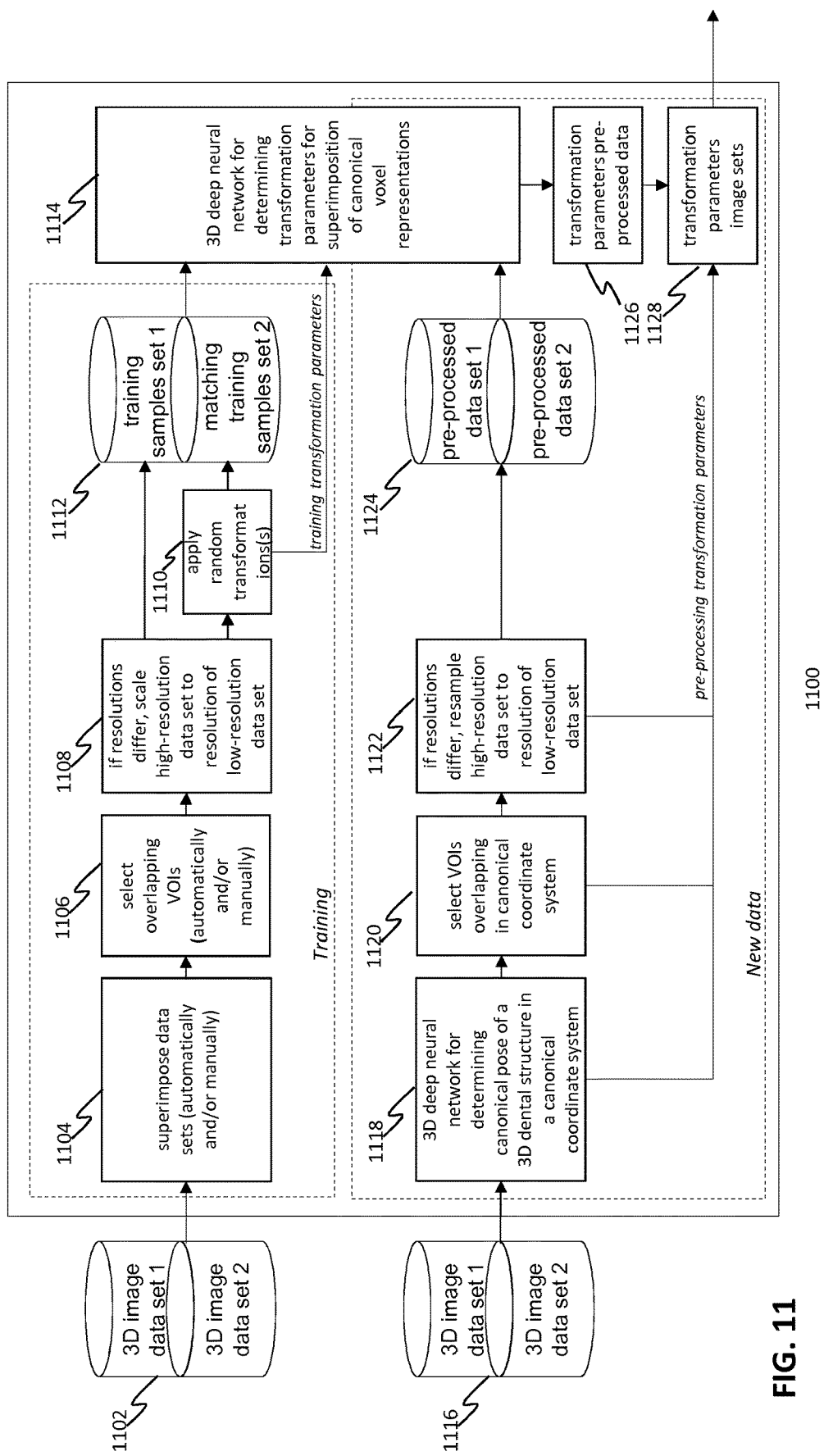
FIG. 11 depicts a schematic overview of a system component for direct determination of transformation parameters for superimposition of voxel representations according to an embodiment of the invention.

FIG. 11 depicts a schematic overview of a system component for direct determination of transformation parameters for superimposition of voxel representations according to an embodiment of the invention. System 1100 may be employed to directly predict transformation parameters, e.g. applicable 3D rotations, 3D translations and 3D scaling defining how one received 3D image data set may be aligned to the other. Training data 1102 and inference data 1116 may consist of 3D image data e.g. voxel intensity values, e.g. radiodensities in the case of (CB)CT data, or binary values, e.g. in the case of voxelized surface scan data. Intensity values may be binarized by means of thresholding, e.g. in the case of (CB)CT data, setting all voxel values higher than a value of e.g. 500 HUs to 1 and the remaining voxel to 0. In particular for the purpose of generating training data, this threshold may be randomly chosen across samples to be generated, e.g. in a range 400 to 800 HUs.

The system may be employed to predict parameters from 3D image data having different modalities between the two received 3D image data sets. Differing sources comprising information considering different structures may be trained upon by the same network. E.g. in the case of matching (CB)CT information to IOS information, surfaces of tooth crowns may be distinguishable with both received data sets, whilst e.g. gingiva are expected to be distinguishable only within the IOS data, and e.g. tooth roots will only be distinguishable in the (CB)CT data.

During the training effort, the internal parameters of 3D deep neural network 1114 may be optimized towards the network providing results of a sufficiently high accuracy. This may be accomplished by employing a collection of 3D image data sets 1102 which may be of varying modalities but that do comprise at least a partial volume overlap of real-world structures. For the purpose of training such a network, it is desirable that these two input sets are aligned or superimposed to each other 1104. If this is not the case yet in data 1102, it may be done either manually or automatically according to e.g. information following a method as described with respect to FIGS. 6-10. The accuracy of the superimposition of the training data may affect the accuracy of the output data.

It is beneficial (considering accuracy, memory bandwidth requirements and potential processing speed) that the data presented for training to network 1114 comprises the same real-world structures and is scaled to a same real-world resolution in the voxel representations that will be provided to the 3D deep neural network 1114. If sufficient overlap is not yet present within the received data sets, this may be done 1106 either manually or automatically according to a region of overlap determined in the canonical coordinate system, e.g. following a method as described with respect to FIG. 3. If the input data sets have different resolutions, as may either be known from metadata within the received data, or e.g. derived by a method as described with respect to FIG. 3, rescaling of the high-resolution data to the resolution of the low-resolution data 1108 may be beneficial.

Note that for the purpose of generation of a multitude of training samples from a same received set of 3D image data sets, the selection of regions of overlap 1106 may be utilized in such a way that not only the maximum overlapping volumes of interest (VOIs) are selected, but smaller volumes within such maximum overlapping volumes as well, effectively 'zooming' in, in 3D, on a subset of matching structure data.

For the purpose of generating a multitude of training samples, random translation, rotation and/or scaling transformations may be applied 1110 effectively misaligning the alignment present in the data processed up until reaching processor 1110. This introduced misalignment may be passed along in the form of the applicable transformation parameters, to 3D deep neural network 1114, for the purpose of serving as training target for the predicted transformations. Rotations and/or translations of the voxel representations of either pre-processed data set sample, or optionally both samples, may be performed by e.g. rotation methods employing linear (or other) interpolation as is known in the art.

A multitude of samples resulting from pre-processing of various sets of 3D image data sets comprising similar structures may be saved in a database (or memory) 1112, and training of network 1114 may thus be performed on a multitude of samples.

In another embodiment, separate 3D deep neural networks having a similar architecture may be trained for specific conditions, e.g. matching of specific image modalities, comprising real-world structures, and/or specific size-scaling of the voxel representations. This may yield higher potential accuracy of results for specific cases, while still adhering to hardware requirement such as available system memory, processing speed, etc.

With 1114 being sufficiently trained, 'new data' 1116 may be presented for prediction or inference. This new data may be of the same type as described above considering being voxel representation of potentially differing image modalities, etc. The canonical pose of dental structures in the input data set may be determined by a first 3D deep neural network 1118, followed by selection of subsets of data representing VOIs 1120 that overlap in the canonical coordinate system, e.g. by a method as described with reference to FIG. 3. If the input data sets have different resolutions, as may either be known from metadata within the received data, or e.g. derived by a method as described with respected to FIG. 3, rescaling of the high-resolution data to the resolution of the low-resolution data 1122 may be performed. This results in both data sets being pre-processed for reception by 3D deep learning network 1114. Note that the pre-alignment and selection of overlapping VOIs are expected to be less precise than the method being described here, and in this respect this method may be considered a more highly accurate refinement upon a method as e.g. described with respect to FIG. 3.

The trained 3D deep neural network may subsequently process the pre-processed data 1114 and output as prediction the transformation parameters 1126 for superimposition of sample 1 and sample 2. Such a set of parameters may e.g. comprise a vector of 6 values, the first 3 encoding applicable rotations to be executed in order along the three orthogonal axis of the received coordinate system for the data sample to be transformed (e.g. sample 2), and the last three values being the applicable translations, positive and/or negative, in order to align or superimpose e.g. sample 2 to sample 1.

In another embodiment, these parameters may be trained upon as being in the form of e.g. a rotation and/or translation matrix and/or a transformation matrix accomplishing the same desired alignment or superimposition result.

Note that in the case of having employed 1118, 1120 and/or 1122, the transformation parameters as predicted for the received samples may not yet yield the parameters for alignment or superimposition of the originally received 3D image data sets. In such case, processor 1128 may be utilized taking into account information considering any pre-processed transformation following from these three pre-processors, i.e. 'stacking' any preceding transformations together with the predicted transformation for the samples, system 1100 yielding as output of 1128 transformation parameters as may be applicable to the received 3D image data sets.

Note that the inference utilization of this system may be considered relatively computationally un-intensive, hence relatively fast. Accuracy of this system may be significantly higher when employing pre-alignment and selection steps 1118 and 1120. This system may be highly robust against differing image modalities and may work on multiple resolutions (voxel sizes in the received voxel representations), employing voxel resolutions of 0.5-1 mm depending on amounts of overlap between structures. It may however be not sufficiently accurate in the case of insufficient overlap. Elements making up the various sets of transformation parameters may be in the form of floating point values.

Figure 12B:
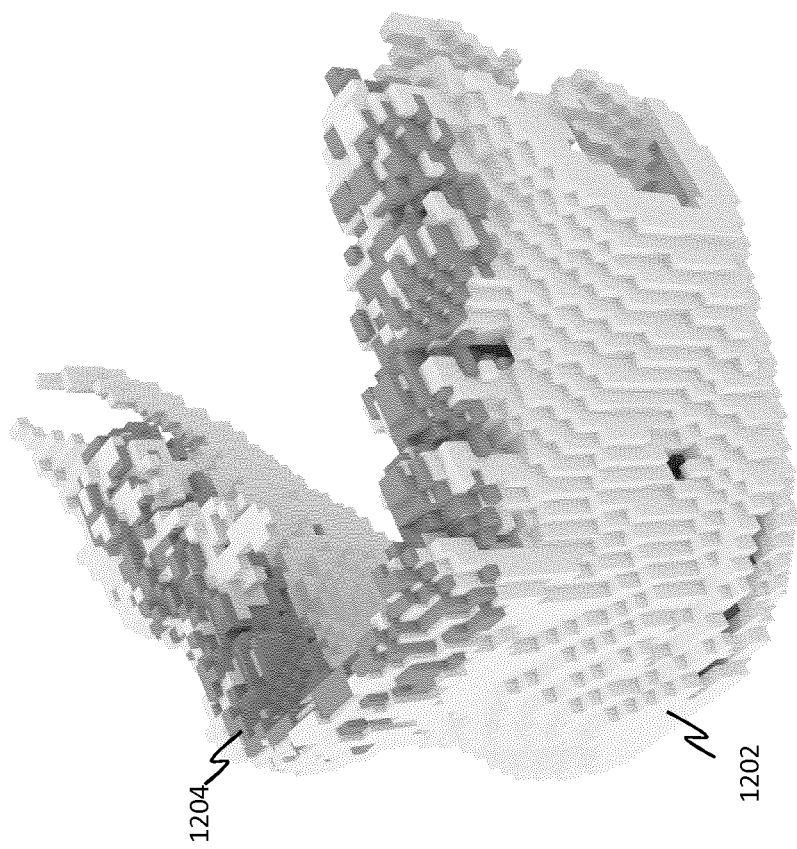
FIGS. 12A and 12B depict received and transformed data as employed within and resulting from a system component for direct generation of transformation parameters according to an embodiment of the invention.
Figure 12A:
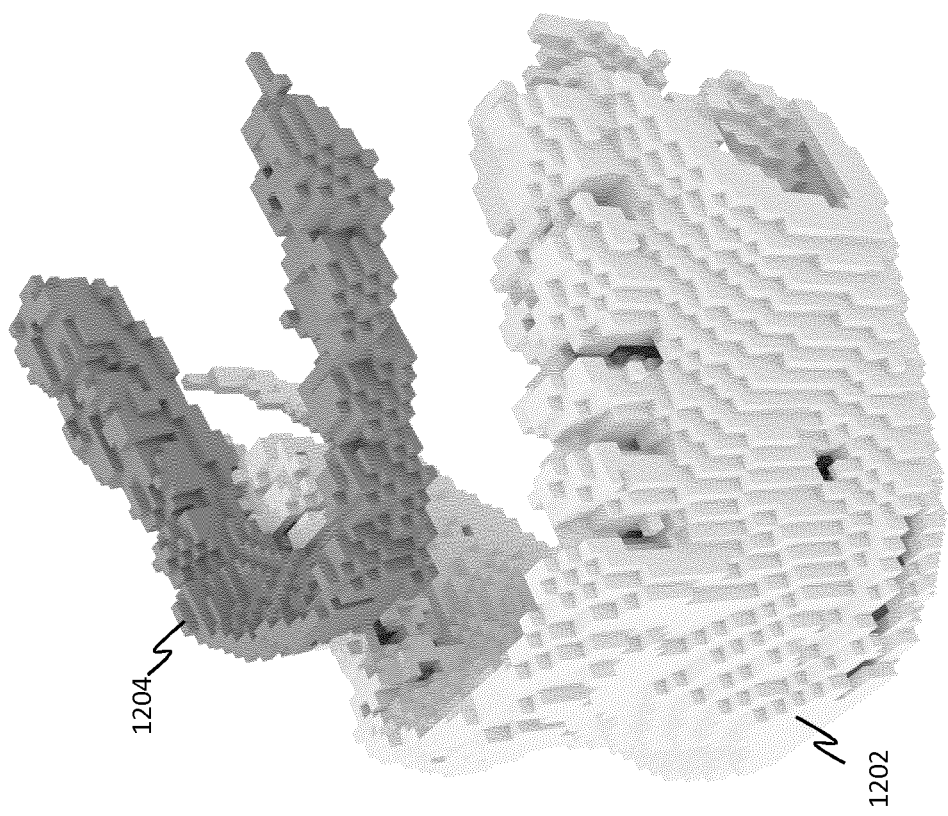

FIGS. 12A and 12B show illustrations of received and transformed data as employed within and resulting from a system component for direct deduction of transformation parameters according to an embodiment of the invention. More specifically, they are visualizations of two received 3D image data sets (1202 and 1204). The visualizations are computer renders of the 3D image datasets in their voxel representation.

In these specific visualizations, the voxel sizes as used, being 1 mm in either orthogonal direction, can be seen. While 1202 as received by the system component originated from CBCT data, for the purpose of this visualization it is shown as the 3D volume resulting from thresholding the CBCT data above 500 Hounsfield units. 1204 is the voxelized representation of an IOS of the same patient, and both received 3D image data sets where taken at approximately the same moment in time.

From FIG. 12B can be seen that with the application of the transformation parameters following from the system component, 1204 has been aligned or superimposed by means of 3D rotation and 3D translation. The received 3D image data sets already had the same scaling in the case of this example.

Figure 13:
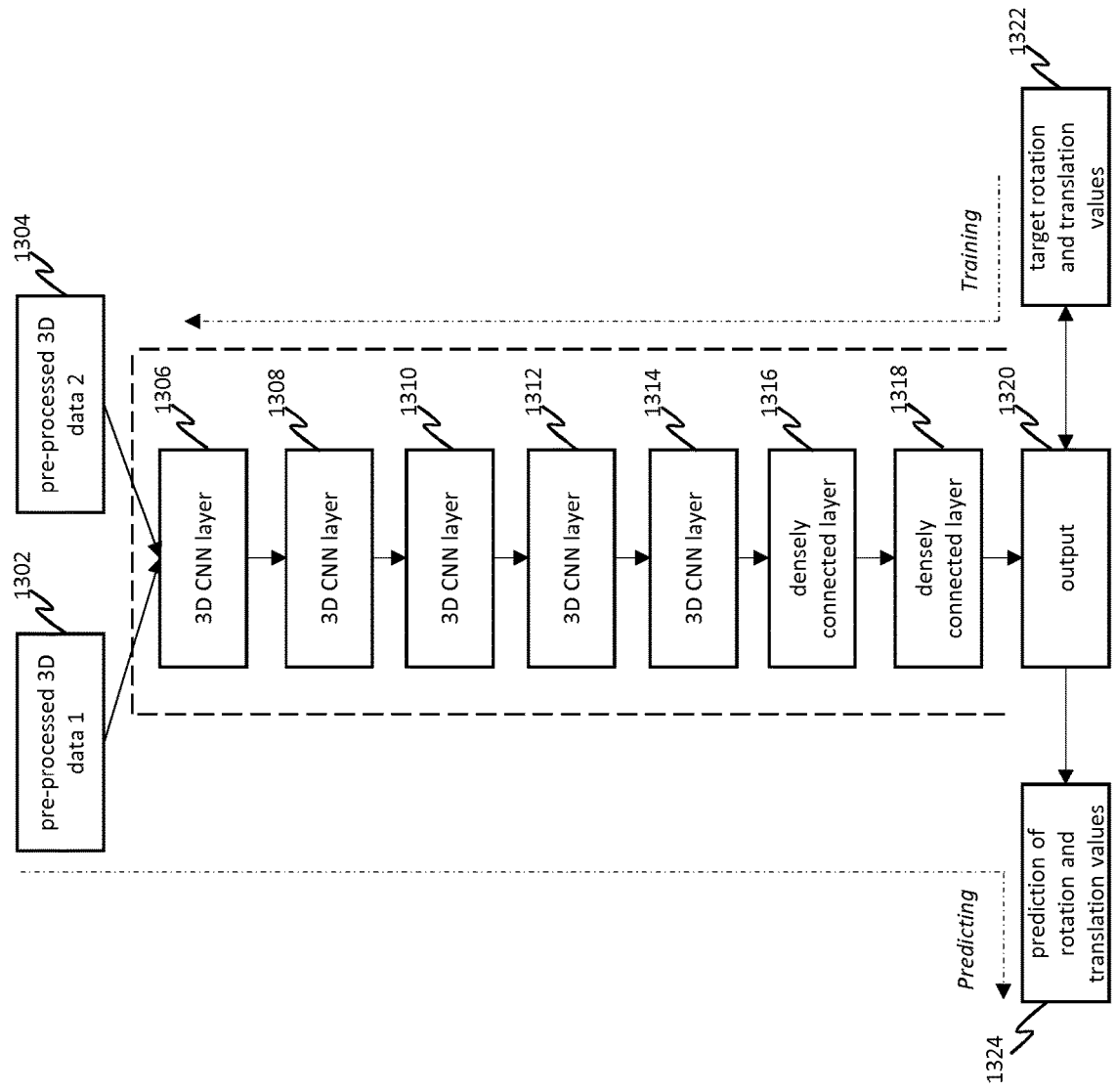
FIG. 13 depicts an example of a 3D deep neural network architecture for a system component for direct deduction of transformation parameters according to an embodiment of the invention.

FIG. 13 depicts an example of a 3D deep neural network architecture for a system component for direct deduction of transformation parameters according to an embodiment of the invention. The received (pre-processed) 3D image data, two voxel representations 1302, 1304 that match the voxel space of the input of the 3D deep neural network, may be passed through and processed by various layers in the network 1306-1320. The first layers of the network may include a plurality of 3D convolutional layers 1306-1314.

When the data have passed the convolutional layers, the internal representation may be passed to a series of densely-connected layers 1316-1318 which infer the rotational and translational distance between the 3D data.

Variations in the number of layers and their defining parameters, e.g. differing activation functions kernel amounts, use of subsampling and size, and additional functional layers such as dropout and/or batch normalization layers may be used in the implementation without losing the essence of the design on the 3D deep neural network.

The final or output layer 1320 may represent a prediction of the translation across the three axes and rotations along the three axes that should be applied to the data to obtain a correct superimposition of the received 3D image data sets.

Training data may comprise sets of two voxel representations as input 1302, 1304 of which the translations and rotations are known. For each data set of voxel representations to be processed, a randomized translation and rotation may be applied to either one, and the total translational and rotational difference could be used to determine a loss between the desired 1322 and actual output 1320. This loss may be used during training as a measure to adjust parameters within the layers of the 3D deep neural network. Such loss may be calculated such that optimally accurate predictions result from the 3D deep learning network. Optimizer functions may be used during training to aid in the efficiency of the training effort. The network may be trained for any number of iterations until the internal parameters lead to a desired accuracy of results. When appropriately trained, two different voxel representations of e.g. maxillofacial structures may be presented as input and the 3D deep neural network may be used to derive a prediction 1324 of the translation and rotation necessary to accurately superimpose the set of inputs.

The layers may use a variety of activation functions such as linear, tanh, ReLU, PreLU, sigmoid, etc. The 3D CNN layers may vary in their amount of filters, filter sizes and subsampling parameters, etc. They, as well as the densely connected layers, may vary in their parameter initialization methods.

Figure 14:
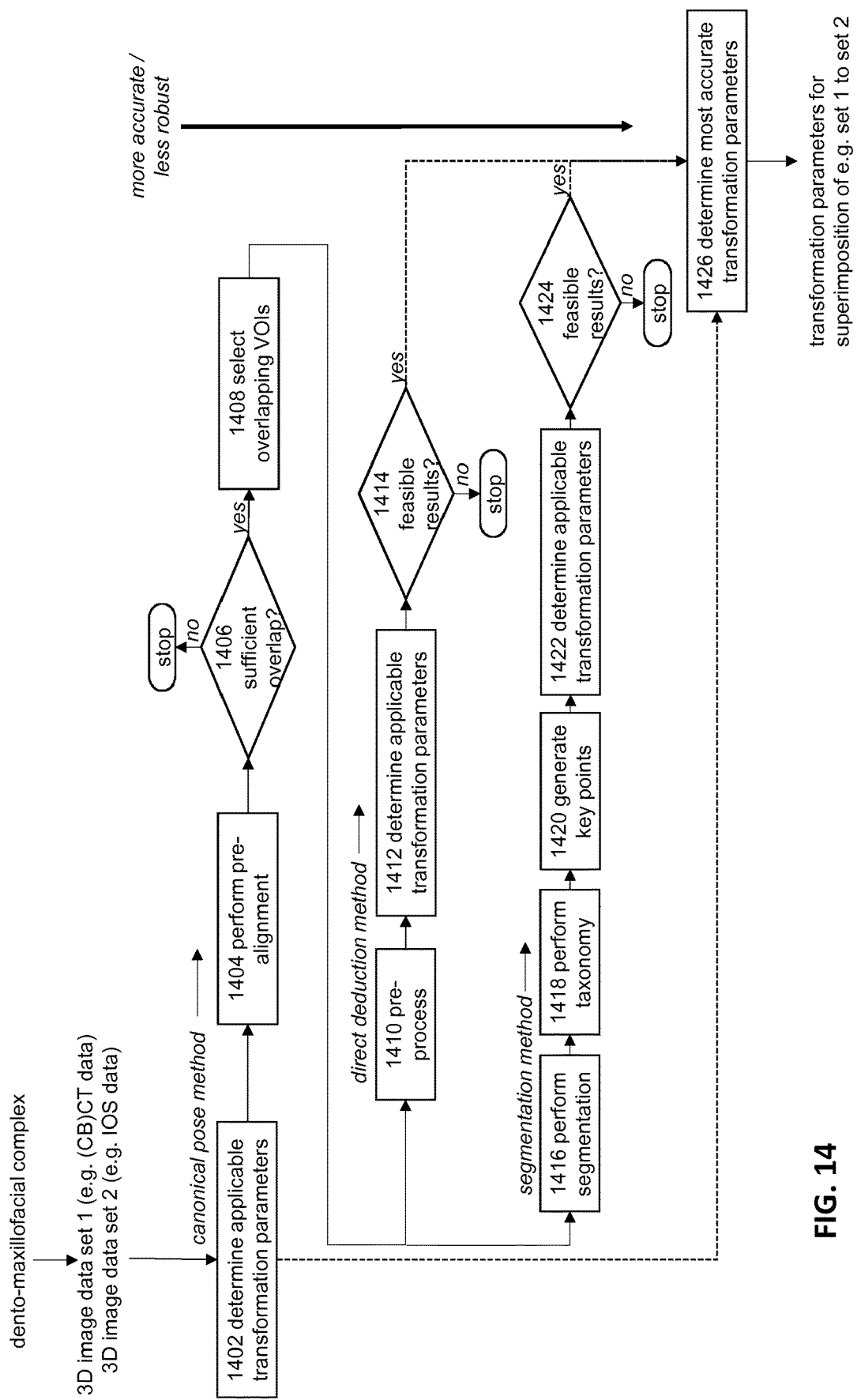
FIG. 14 depicts a flowchart of the system logic for selection/determination of the transformation parameters to be applied, according to an embodiment of the invention.

FIG. 14 depicts a flowchart of the system logic for selection/determination of the transformation parameters to be applied according to an embodiment of the invention. Note that this is an exemplary setup of the system logic according to various embodiments of the invention as described above. The two input data sets are for the purpose of the flowchart stated as already having been appropriately voxelized. The two input data sets may be received at step 1402, at which point a first set of transformation parameters to a canonical pose may be determined. In an exemplary embodiment this step may be robust against large variances in to be applied transformation parameters for the purpose of alignment or superimposition. The accuracy may be less and the resolution of the voxel representations of the received image data may be approximately 1 mm in either orthogonal direction.

Following information from 1402, pre-alignment 1404 and determination of sufficient overlap 1406 may be performed. Note that in an embodiment, this step may perform two determinations of sufficient overlap, one for each optional subsequent method to be performed (starting at respectively 1410 and 1416). If the amount of overlap is insufficient, as according to a threshold or thresholds as may be determined experimentally and subsequently may be programmatically checked, the system may choose to not perform either or both of the methods as starting at 1410, 1416. I.e. this may be considered as the system determining that the transformation parameters as resulting from 1426 would not improve due to non-feasible results from either or both of these additional methods.

In the case of sufficient overlap, the direct deduction method may be performed starting at step 1410, which is expected, especially in the case of having performed pre-alignment 1404 and VOI selection 1408, to yield more accurate results whilst being robust against differing image modalities within the received 3D image data sets. Note that applicable information following preceding transformations, as may potentially follow from 1404 and 1408, may be relayed for use in determination of transformation parameters 1412 following the direct deduction method. Pre-processing 1410 employed within this method may be expected to result in voxel representations at a voxel resolution of 0.5-1.0 mm.

Feasibility of results may still be sanity checked 1414. This may be done by means of comparison of the parameters resulting from 1402 to those resulting from 1414 and/or 1424. If the deviation is of a too large extent, the system may e.g. choose not to relay the parameters to 1426, or 1426 may attribute a weight of 0 to the resulting transformation parameters.

Following determination of applicable overlap, the system may employ the segmentation based method starting at step 1416. Segmentation 1416 may be done automatically on both received 3D image data sets, either employing 3D deep neural network based methods as described above, or other methods known in the art as may be the case with IOS data. Note that in the case of the latter, such segmentations of tooth crowns may be performed on the received 3D image data in the form of surface mesh data.

Taxonomy 1418 may be performed on the (segmented) structure data and the resulting information may be relayed to keypoint generation step 1420. The ability of including the identification of same teeth in the differing received data sets is expected to yield more robustness against potential variances in the amount of overlap and data quality of the received data sets.

The generated clouds of selected (sparse, closely matching) keypoints may be employed at step 1422 to determine the applicable transformation parameters for alignment or superimposition. Note that again any preceding transformation potentially following from 1404, 1408 may be taken into account by 1422 to determine set to set transformation parameters.

A sanity check 1424 for this method may again be performed, e.g. by checking deviations against parameters resulting from 1414 and/or 1402. In case of large discrepancies the system may choose not to relay parameters to 1426. Alternatively, 1426 may assign a weight of 0 to the set of resulting transformation parameters. Non-feasible results may be the results of inaccurate data received, such as e.g. artefacts present in CBCT data, incorrect surface representation from IOS data, etc.

Point data for surfaces meshes is saved with floating point precisions, yielding potentially highly accurate results. This method may be considered as the most accurate within this system, whilst at the same time being the least robust. It may however be considered significantly more robust than current methods in the art due to the inclusion of determination of pre-alignment, overlap and segmentation and taxonomy of individual structures.

Transformation parameters may be internally represented in a variety of ways, e.g. 3 vectors of 3 values describing respectively rotations in order, 3 translation values to an origin, and/or 3 values determining applicable scaling, all having positive and/or negative magnitudes of value belonging to a specific axis in an orthogonal 3D coordinate system. Alternatively, any combination of matrices as known in linear algebra may be employed, more specifically either rotation, transformation, scaling and/or combinations as may be determined in a (affine) transformation matrix.

Prior knowledge considering accuracies, robustness, etc. may be employed to e.g. determine a weighting of importance of any/all transformation parameters received by 1426. Step 1426 may thus programmatically combine the parameters received from the various methods to yield the most accurate desired transformation parameters for alignment or superimposition.

Note that transformation parameters may, depending on desired results from such a system, either be parameters matching set 2 to set 1, set 1 to set 2, and/or both being superimposed in an alternative (desired) coordinate system.

Figure 15B:
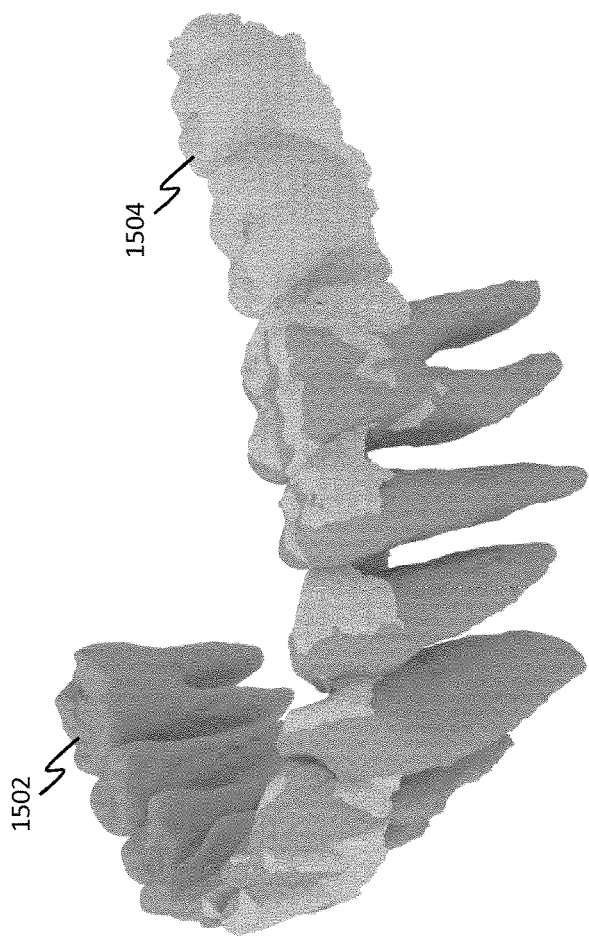
FIGS. 15A and 15B depict transformation results on two exemplary 3D dento-maxillofacial image datasets following from individual methods according to various embodiments of the invention.
Figure 15A:
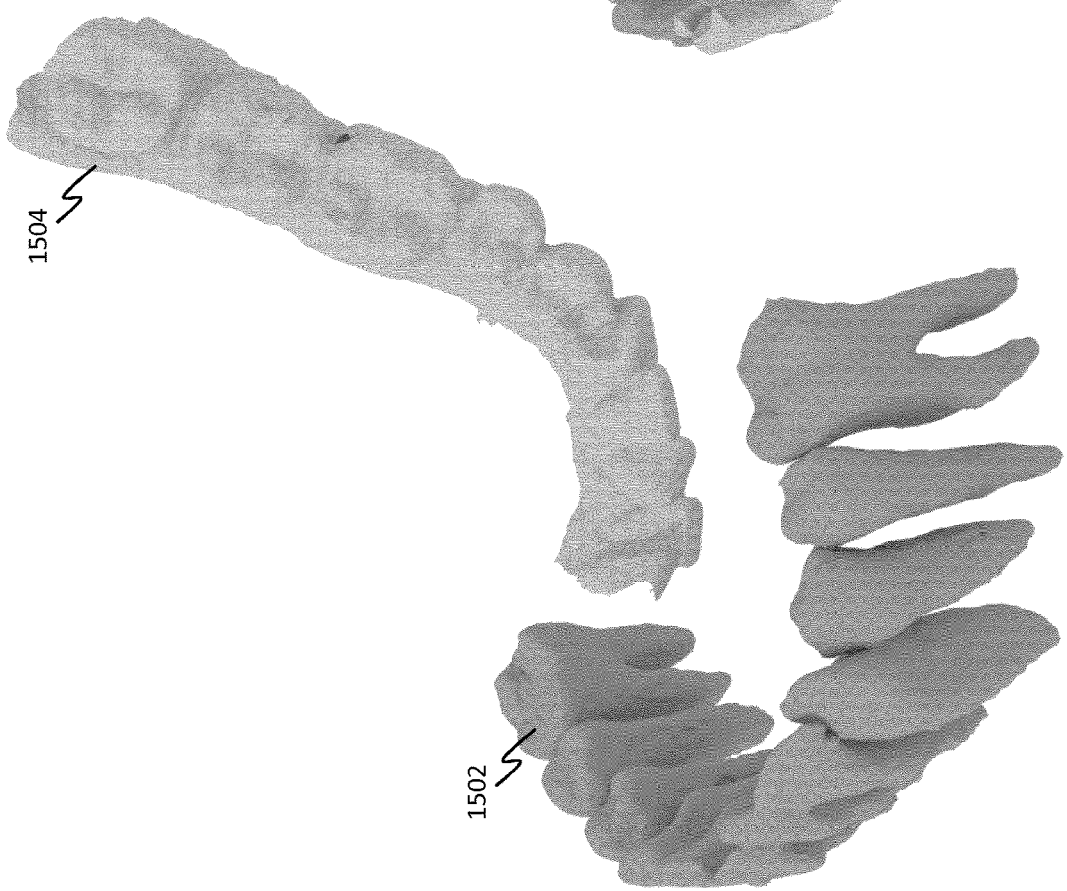

FIG. 15A, and FIG. 15B depict transformation results on two exemplary received datasets following from various embodiments of the invention. More specifically, FIG. 15A and FIG. 15B show computer renders of two 3D image data sets 1502 and 1504. These 3D image data sets were respectively sourced from a CBCT scanner and an intra-oral scanner. According to a system setup as described with respect to FIG. 14, sufficient overlap was determined by the system and all three methods for generation of transformation parameters were performed, with the employment of pre-alignment according to the canonical pose method.

For the purpose of this visualization, the 3D CBCT image data is rendered by means of the surface meshes generated per tooth structure resulting from the segmentation method. In FIG. 15A, the image data is shown oriented as received, and it can be seen that scaling between both 3D image data sets was the same (e.g. 1 mm in real-world dimensions amounts to one unit value on each orthogonal axis for both received data sets) It can also be seen that 1502 and 1504 are misaligned both considering rotations and translations, to a significant extent.

The most accurate set of transformation parameters was determined to be the one resulting from the segmentation and taxonomy method, matching and minimizing the distance between keypoints generated for both segmented (and labelled) teeth (crowns in the case of IOS data) as identified, thus in the case of this example no part of the applied transformation was the direct result of the other two methods. Transformation parameters from the canonical pose method were however employed whilst performing pre-processing for the segmentation and taxonomy based method.

FIG. 15B shows the transformation parameters as determined by the system applied to 1504, being the IOS data, the system having been configured to determine and apply transformation parameters aligning one received 3D image data set to the other. Note that despite overlap only being present for image volumes defining teeth indices 41, 31, 32, 33, 34, 35 and 36 (as may be determined according to FDI notation), the final alignment or superimposition step as applied based on the determined transformation parameters was automatically performed to a significantly high accuracy.

The aligned or superimposed data as shown may further be fused or merged, e.g. for teeth having overlap in surface data (with reference to 132 in FIG. 1). In the case of the data as visualized, specifically showing the results of the segmentation step yielding complete teeth including accurate roots from the CBCT data and the combination with more accurate information considering teeth crowns from the IOS data, a merger of surfaces yielding IOS tooth crowns fused to CBCT tooth roots would be very beneficial e.g. in the fields of implantology or orthodontics as describe before. Such merger methods are known in the field and may benefit greatly from accurate alignment as may result from the system as described.

The methods as described above may provide the most accurate results for superimposition available, whilst being robust to a great variability of conditions considering the input data. This variability considers a varying but potentially large magnitude of 'misalignment' between received 3D image data sets, different image modalities, robustness against potentially low data quality (e.g. misinterpreted surfaces, artefacts in CBCT data, etc.). The system can perform fully automatically and may deliver the most accurate alignment or superimposition results in a timely matter. It should be noted that for any implementation of a 3D deep learning network, results and robustness are expected to increase following longer periods of training/utilization of more (varied) training data.

Although the examples in the figures are described with reference to 3D dental structures, it is clear that the embodiments in this application can be generally used for automatically determining (thus without any human intervention) a canonical pose for 3D object in 3D data sets of different modalities. Moreover, the embodiments in this application can be used for automatic superimposition of a first 3D object with a second 3D object, wherein the first and second 3D object may be represented by 3D data sets of different modalities.

Figure 16:
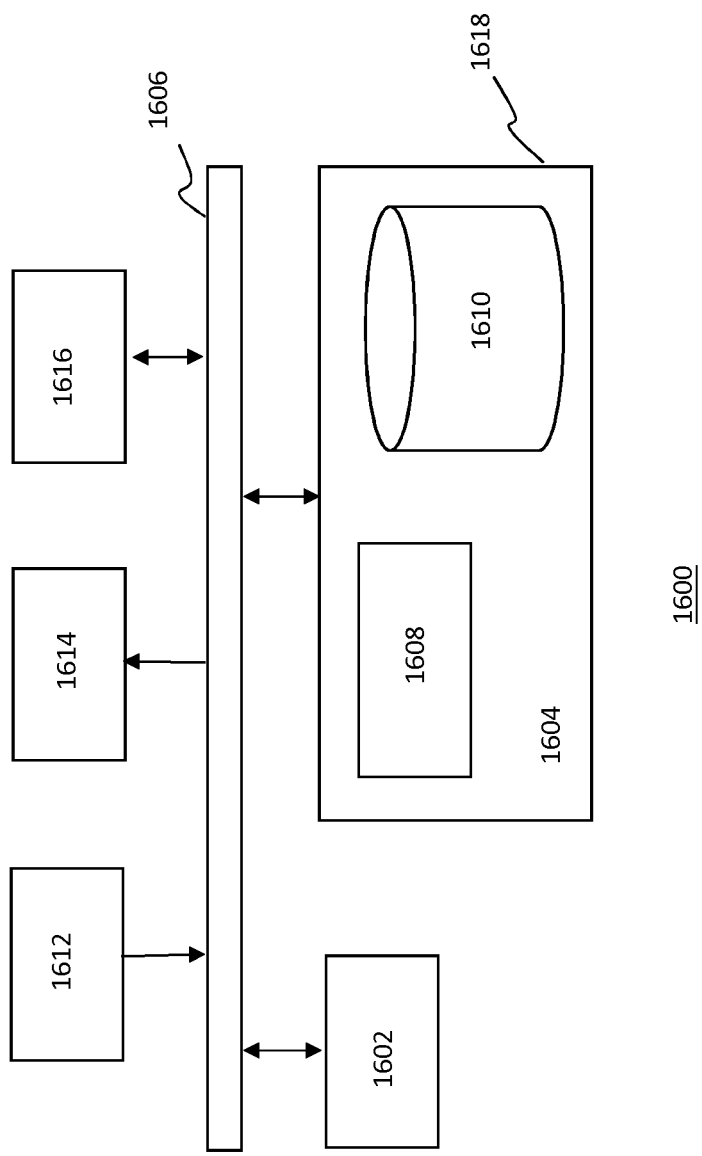
FIG. 16 is a block diagram illustrating an exemplary data processing system that may be used for executing methods and software products described in this disclosure.

FIG. 16 is a block diagram illustrating an exemplary data processing system that may be used in as described in this disclosure. Data processing system 1600 may include at least one processor 1602 coupled to memory elements 1604 through a system bus 1606. As such, the data processing system may store program code within memory elements 1604. Further, processor 1602 may execute the program code accessed from memory elements 1604 via system bus 1606. In one aspect, data processing system may be implemented as a computer that is suitable for storing and/or executing program code. It should be appreciated, however, that data processing system 1600 may be implemented in the form of any system including a processor and memory that is capable of performing the functions described within this specification.

Memory elements 1604 may include one or more physical memory devices such as, for example, local memory 1608 and one or more bulk storage devices 1610. Local memory may refer to random access memory or other non-persistent memory device(s) generally used during actual execution of the program code. A bulk storage device may be implemented as a hard drive or other persistent data storage device. The processing system 1600 may also include one or more cache memories (not shown) that provide temporary storage of at least some program code in order to reduce the number of times program code must be retrieved from bulk storage device 1610 during execution.

Input/output (I/O) devices depicted as input device 1612 and output device 1614 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1616 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1600.

As pictured in FIG. 16, memory elements 1604 may store an application 1618. It should be appreciated that data processing system 1600 may further execute an operating system (not shown) that can facilitate execution of the application. Application, being implemented in the form of executable program code, can be executed by data processing system 1600, e.g., by processor 1602. Responsive to executing application, data processing system may be configured to perform one or more operations to be described herein in further detail.

In one aspect, for example, data processing system 1600 may represent a client data processing system. In that case, application 1618 may represent a client application that, when executed, configures data processing system 1600 to perform the various functions described herein with reference to a "client". Examples of a client can include, but are not limited to, a personal computer, a portable computer, a mobile phone, or the like.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for automatically determining a canonical pose of a 3D dental structure represented by data points of a 3D data set, the method comprising:
providing one or more blocks of data points of the 3D data set associated with a first 3D coordinate system to an input of a first 3D deep neural network, the 3D data set representing a 3D dental structure comprising one or more dental features having a first orientation in a 3D space defined by axes of a first 3D coordinate system, the first 3D deep neural network being trained to generate canonical pose information associated with a 3D space defined by axes of a 3D canonical coordinate system relative to a position of part of the 3D dental structure, the orientation of the one or more dental features in the 3D space of the canonical coordinate system being in alignment with the axes of the 3D canonical coordinate system;
receiving canonical pose information from an output of the first 3D deep neural network, the canonical pose information comprising for each data point of the one or more blocks a prediction of a position of the data point in the canonical coordinate system, the position of the data point being defined by canonical coordinates;
using the canonical coordinates to determine an orientation and scaling of the axes of the 3D canonical coordinate system and a position of an origin of the 3D canonical coordinate system relative to the axes and an origin of the first 3D coordinate system and using the orientation, the scaling, and the position to determine transformation parameters, including rotation, translation, and/or scaling parameters, for transforming coordinates of the first 3D coordinate system into canonical coordinates of the 3D canonical coordinate system; and
determining a canonical representation of the 3D dental structure in which the one or more dental features of the 3D dental structure are in alignment with the axes of the 3D canonical coordinate system, the determining of the canonical representation including applying the transformation parameters to coordinates of the data points of the 3D data set.

2. The method according to claim 1 wherein the canonical pose information includes one or more 3D voxel maps for linking a voxel of a voxel representation to a prediction of a position of the voxel in the 3D canonical coordinate system.

3. The method according to claim 2 wherein determining an orientation of an axis of the canonical coordinate system further comprises:
determining for a voxel of the voxel representation a local gradient in a canonical coordinate of one of the one or more 3D voxel maps, the local gradient representing a vector in a space defined by the first 3D coordinate system, wherein the orientation of the vector represents a prediction of the orientation of a canonical axis and/or wherein a length of the vector defines a scaling factor associated with the canonical axis.

4. The method according to claim 2 wherein the one or more voxel maps including a first 3D voxel map linking a voxel to a prediction of a first x' coordinate of the canonical coordinate system, a second 3D voxel map linking a voxel to a prediction of a second y' coordinate of the canonical coordinate system and a third 3D voxel map linking a voxel to a prediction of a third z' coordinate of the canonical coordinate system.

5. A computer-implemented method for automated superimposition of a first 3D dental structure represented by a first 3D data set and a second 3D dental structure represented by a second 3D data set, the method comprising:
providing one or more first blocks of voxels of a first voxel representation of the first 3D dental structure associated with a first coordinate system and one or more second blocks of voxels of a second voxel representation of the second 3D dental structure associated with a second coordinate system to an input of a first 3D deep neural network, the first and second 3D dental structure comprising one or more dental features, the one or more dental features of the first 3D dental structure having a first orientation in a 3D space defined by axes of the first 3D coordinate system and the one or more dental features of the second 3D dental structure having a second orientation in a 3D space defined by axes of the second 3D coordinate system, the first 3D deep neural network being trained to generate canonical pose information associated with a 3D space defined by axes of a 3D canonical coordinate system relative to a position of part of the first 3D dental structure and the second 3D dental structure and associated with a canonical representation of the 3D dental structure, the orientation of the one or more dental features in the 3D space of the canonical coordinate system being in alignment with the axes of the 3D canonical coordinate system;
receiving first and second canonical pose information from an output of the first 3D deep neural network, the first canonical pose information comprising for each voxel of the one or more first blocks of voxels of the first voxel representation a prediction of a first position of the voxel in the canonical coordinate system, and the second canonical pose information comprising for each voxel of the one or more second blocks of voxels of the second voxel representation a prediction of a second position of the voxel in the canonical coordinate system, the first and second position being defined by first and second canonical coordinates respectively;
using the first canonical pose information to determine a first orientation and scale of the axes of the 3D canonical coordinate system and a first position of an origin of the axes of the 3D canonical coordinate system relative to the axes and origin of the first 3D coordinate system and using the second canonical pose information to determine a second orientation and scale of the axes of the 3D canonical coordinate system and a second position of the origin of the axes of the 3D canonical coordinate system relative to the axes and origin of the second 3D coordinate system;
using the first orientation, scale, and position to determine first transformation parameters, including first rotation, translation and/or scaling parameters, for transforming coordinates of the first 3D coordinate system into coordinates of the canonical coordinate system;
using the second orientation, scale, and position to determine second transformation parameters, including second rotation, translation, and/or scaling parameters, for transforming coordinates of the second 3D coordinate system into canonical coordinates; and determining a superimposition of the first 3D dental structure and the second 3D dental structure, the determining including using the first and second transformation parameters to determine a first canonical representation of the first 3D dental structure and a second canonical representation of the second 3D dental structure respectively wherein the one or more dental features of the first and second canonical representation of the first and second 3D dental structure are in alignment with the axes of the 3D canonical coordinate system.

6. The method according to claim 5 wherein the first and second canonical representation of the first 3D dental structure and second 3D dental structure are first and second 3D surface meshes, respectively, the determining a superimposition further including:

segmenting the first canonical representation of the first 3D dental structure into at least one 3D surface mesh of at least one 3D dental element of the first 3D dental structure and segmenting the second canonical representation of the second 3D dental structure into at least one 3D surface mesh of at least one second 3D dental element of the second 3D dental structure;

selecting at least three first and second non-collinear key-points of the first and second 3D surface mesh, a key-point defining a local or global maximum or a local or global minimum in a surface curvature of the first 3D surface mesh; and aligning the first 3D dental element and the second 3D dental element on a basis of the at least three non-collinear key-points.

7. The method according to claim 5 wherein the first and second canonical representation of the first 3D dental structure and second 3D dental structure respectively are voxel representations, the determining a superimposition further including:

providing at least part of a first canonical voxel representation of the first 3D dental structure and at least part of a second canonical voxel representation of the second 3D dental structure to the input of a second 3D deep neural network, the second 3D deep neural network being trained to determine transformation parameters, including rotation, translation and/or scaling parameters, for aligning the first and second canonical voxel representation; and aligning first and second canonical representation of the first and second 3D dental structure on a basis of the transformation parameters provided by the output of the second 3D deep neural network.

8. The method according to claim 5, wherein determining a superimposition further includes:

determining a volume of overlap between the canonical representation of the first 3D dental structure and the canonical representation of the second 3D dental structure;

determining a first volume of interest comprising first voxels of the first canonical representation in the volume of overlap; and determining a second volume of interest comprising second voxels of the second canonical representation in the volume of overlap.

9. The method according to claim 8, further comprising:

providing first voxels contained in the first volume of interest (VOI) to the input of a third 3D deep neural network, the third 3D deep neural network being trained to classify and segment voxels;

receiving activation values for each of the first voxels in the first volume of interest and/or for each of the second voxels in the second volume of interest from the output of the third 3D deep neural network, wherein an activation value of a voxel represents a probability that the voxel belongs to a 3D dental structure class; and using the activation values for determining a first and second voxel representation of first and second 3D dental elements in the first and second VOI respectively.

10. The method according to claim 9, further comprising:

selecting at least three first and second non-collinear key-points of the first and second 3D surface mesh, a key-point defining a local or global maximum or a local or global minimum in a surface curvature of the first 3D surface mesh; and aligning the first and second 3D dental element on a basis of the first and second non-collinear key-points.

11. The method of claim 10 wherein aligning includes using an iterative closest point algorithm.

12. The method according to claim 9, further comprising:

providing a first voxel representation of a first 3D dental element and a second voxel representation of a second 3D dental element to a fourth 3D deep neural network, the fourth 3D deep neural network being trained to generate an activation value for each of a plurality of candidate structure labels, an activation value associated with a candidate label representing the probability that a voxel representation received by the input of the fourth 3D deep neural network represents a structure type as indicated by the candidate structure label; and receiving from the output of the fourth 3D deep neural network a plurality of first and second activation values, selecting a first structure label with the highest activation value of the first plurality of activation values and selecting a second structure label with the highest activation value of the second plurality of activation values and assigning the first and second structure label to the first and second 3D surface mesh respectively.

13. The method according to claim 12 further comprising:

selecting at least three first and second non-collinear key-points of the first and second 3D surface meshes, a key-point defining a local or global maximum or a local or global minimum in a surface curvature of the first 3D surface mesh;

labelling the first and second non-collinear key-points based on the first structure label assigned to the first 3D surface mesh and the second structure label assigned to the second 3D surface mesh respectively; and aligning the first 3D dental element and second 3D dental element on a basis of the first and second non-collinear key-points and the first and second structure labels of the first and second 3D surface meshes respectively, using an iterative closest point algorithm.

14. The method according to claim 5 wherein the first and second 3D dental structures being of the same person.

15. A computer-implemented method for training a 3D deep neural network to automatically determine a canonical pose of a 3D dental structure represented by a 3D data set, comprising:

receiving training data and associated target data, the training data including a voxel representation of a 3D dental structure and the target data including canonical coordinate values of a canonical coordinate system for each voxel of the voxel representation, wherein the canonical coordinate system is a predetermined coordinate system defined relative to a position of part of the 3D dental structure;

selecting one or more blocks of voxels, the one or more blocks representing one or more subsamples of the voxel representation of a predetermined size and applying a random 3D rotation to the one or more subsamples;

applying the same rotation to the target data;

offering the one or more blocks to an input of the 3D deep neural network and the 3D deep neural network predicting for each voxel of the one or more blocks canonical coordinates of the canonical coordinate system; and optimising values of network parameters of the 3D deep neural network by minimizing a loss function representing a deviation between the canonical coordinate values predicted by the 3D deep neural network and the canonical coordinates associated with the target data.

16. A computer system adapted for automatically determining a canonical pose of a 3D dental structure represented by a 3D data set, comprising:

a computer readable storage medium having computer readable program code embodied therewith, the program code including at least one trained 3D deep neural network, and at least one processor coupled to the computer readable storage medium, wherein responsive to executing the computer readable program code, the at least one processor is configured to perform executable operations comprising:

providing one or more blocks of data points of the 3D data set associated with a first 3D coordinate system to an input of a first 3D deep neural network, the 3D data set representing a 3D dental structure comprising one or more dental features having a first orientation in a 3D space defined by axes of a first 3D coordinate system, the first 3D deep neural network being trained to generate canonical pose information associated with a 3D space defined by axes of a 3D canonical coordinate system relative to a position of part of the 3D dental structure, the orientation of the one or more dental features in the 3D space of the canonical coordinate system being in alignment with the axes of the 3D canonical coordinate system;

receiving canonical pose information from an output of the first 3D deep neural network, the canonical pose information comprising for each data point of the one or more blocks a prediction of a position of the data point in the canonical coordinate system, the position of the data point being defined by canonical coordinates;

using the canonical coordinates to determine an orientation and scaling of the axes of the 3D canonical coordinate system and a position of an origin of the 3D canonical coordinate system relative to the axes and an origin of the first 3D coordinate system and using the orientation, the scaling, and the position to determine transformation parameters, including rotation, translation, and/or scaling parameters, for transforming coordinates of the first 3D coordinate system into canonical coordinates of the 3D canonical coordinate system; and determining a canonical representation of the 3D dental structure in which the one or more dental features of the 3D dental structure are in alignment with the axes of the 3D canonical coordinate system, the determining of the canonical representation including applying the transformation parameters to coordinates of the data points of the 3D data set.

17. The system of claim 16 wherein the canonical representation comprises a canonical voxel representation or a canonical 3D mesh representation of the 3D dental structure.

18. A computer system adapted for automated superimposition of a first 3D dental structure represented by a first 3D data set and a second 3D dental structure a represented by a second 3D data set, comprising:

a computer readable storage medium having computer readable program code embodied therewith, the program code including at least one trained 3D deep neural network, and at least one processor coupled to the computer readable storage medium, wherein responsive to executing the computer readable program code, the at least one processor is configured to perform executable operations comprising:

providing one or more first blocks of voxels of a first voxel representation of the first 3D dental structure associated with a first coordinate system and one or more second blocks of voxels of a second voxel representation of the second 3D dental structure associated with a second coordinate system to an input of a first 3D deep neural network, the first and second 3D dental structure comprising one or more dental features, the one or more dental features of the first 3D dental structure having a first orientation in a 3D space defined by axes of the first 3D coordinate system and the one or more dental features of the second 3D dental structure having a second orientation in a 3D space defined by axes of the second 3D coordinate system, the first 3D deep neural network being trained to generate canonical pose information associated with a 3D space defined by axes of a 3D canonical coordinate system relative to a position of part of the first 3D dental structure and the second 3D dental structure and associated with a canonical representation of the 3D dental structure, the orientation of the one or more dental features in the 3D space of the canonical coordinate system being in alignment with the axes of the 3D canonical coordinate system;

receiving first and second canonical pose information from an output of the first 3D deep neural network, the first canonical pose information comprising for each voxel of the one or more first blocks of voxels of the first voxel representation a prediction of a first position of the voxel in the canonical coordinate system, and the second canonical pose information comprising for each voxel of the one or more second blocks of voxels of the second voxel representation a prediction of a second position of the voxel in the canonical coordinate system, the first and second position being defined by first and second canonical coordinates respectively;

using the first canonical pose information to determine a first orientation and scale of the axes of the 3D canonical coordinate system and a first position of an origin of the axes of the 3D canonical coordinate system relative to the axes and origin of the first 3D coordinate system and using the second canonical pose information to determine a second orientation and scale of the axes of the 3D canonical coordinate system and a second position of the origin of the axes of the 3D canonical coordinate system relative to the axes and origin of the second 3D coordinate system;

using the first orientation, scale and position to determine first transformation parameters, including first rotation, translation, and/or scaling parameters, for transforming coordinates of the first 3D coordinate system into coordinates of the canonical coordinate system;

using the second orientation, scale and position to determine second transformation parameters, including second rotation, translation, and/or scaling parameters, for transforming coordinates of the second 3D coordinate system into canonical coordinate system;

determining a superimposition of the first 3D dental structure and the second 3D dental structure, the determining including using the first and second transformation parameters to determine a first canonical representation of the first 3D dental structure and a second canonical representation of the second 3D dental structure respectively, wherein the one or more dental features of the first and second canonical representation of the first and second 3D dental structure are in alignment with the axes of the 3D canonical coordinate system.

* * * * *